United States Patent
Onozawa et al.

(10) Patent No.: US 10,596,461 B2
(45) Date of Patent: Mar. 24, 2020

(54) INFORMATION PROCESSING SYSTEM, CASE, AND CARDBOARD MEMBER

(71) Applicant: NINTENDO CO., LTD., Kyoto-shi, Kyoto (JP)

(72) Inventors: Yuki Onozawa, Kyoto (JP); Shinichi Kasuno, Kyoto (JP); Yoshiyasu Ogasawara, Kyoto (JP); Hitoshi Tsuchiya, Kyoto (JP); Kochi Kawai, Kyoto (JP)

(73) Assignee: Nintendo Co., Ltd., Kyoto (JP)

( * ) Notice: Subject to any disclaimer, the term of this patent is extended or adjusted under 35 U.S.C. 154(b) by 27 days.

(21) Appl. No.: 15/661,276

(22) Filed: Jul. 27, 2017

(65) Prior Publication Data

US 2018/0028913 A1 Feb. 1, 2018

(30) Foreign Application Priority Data

Jul. 29, 2016 (JP) .................. 2016-149869

(51) Int. Cl.
*A63F 13/40* (2014.01)
*A63F 13/23* (2014.01)
(Continued)

(52) U.S. Cl.
CPC ............ *A63F 13/40* (2014.09); *A63F 13/211* (2014.09); *A63F 13/213* (2014.09);
(Continued)

(58) Field of Classification Search
None
See application file for complete search history.

(56) References Cited

U.S. PATENT DOCUMENTS

| 6,159,099 A | 12/2000 | Chen |
| 6,167,353 A | 12/2000 | Piernot et al. |

(Continued)

FOREIGN PATENT DOCUMENTS

| EP | 1 696 300 A1 | 8/2006 |
| JP | 2006-149985 | 6/2006 |

(Continued)

OTHER PUBLICATIONS

Extended European Search Report for Application No. 18185549.5 dated Nov. 23, 2018.
(Continued)

*Primary Examiner* — James S. McClellan
*Assistant Examiner* — Peter J Iannuzzi
(74) *Attorney, Agent, or Firm* — Nixon & Vanderhye, P.C.

(57) ABSTRACT

A data transmission device that includes an image capturing unit and transmits data generated based on an image captured by the image capturing unit is allowed to be located at a case while at least a part of the data transmission device is accommodated in the case, such that an image capturing direction of the image capturing unit is directed toward an inner space of a case main body. An image capturing target member movable in the inner space of the case main body in accordance with an operation made from outside of the case main body is located at a position where an image of the image capturing target member is allowed to be captured by the image capturing unit. Based on the transmitted data, an information process is executed.

15 Claims, 22 Drawing Sheets

(51) Int. Cl.

| | |
|---|---|
| *A63F 13/98* | (2014.01) |
| *A63F 13/211* | (2014.01) |
| *A63F 13/213* | (2014.01) |
| *A63F 13/24* | (2014.01) |
| *A63F 13/25* | (2014.01) |
| *A63F 13/92* | (2014.01) |
| *A63F 13/245* | (2014.01) |
| *A63F 13/214* | (2014.01) |
| *A63F 13/30* | (2014.01) |

(52) U.S. Cl.
CPC ............ *A63F 13/214* (2014.09); *A63F 13/23* (2014.09); *A63F 13/24* (2014.09); *A63F 13/245* (2014.09); *A63F 13/25* (2014.09); *A63F 13/30* (2014.09); *A63F 13/92* (2014.09); *A63F 13/98* (2014.09)

(56) References Cited

U.S. PATENT DOCUMENTS

| | | |
|---|---|---|
| 2004/0036677 A1 | 2/2004 | Ono et al. |
| 2005/0275623 A1 | 12/2005 | Chadha |
| 2006/0256090 A1 | 11/2006 | Huppi |
| 2007/0071425 A1 | 3/2007 | Horinouchi et al. |
| 2008/0090658 A1 | 4/2008 | Kaji et al. |
| 2008/0317264 A1 | 12/2008 | Wynnychuk |
| 2009/0111580 A1* | 4/2009 | Nakajima ............ A63F 13/005 463/37 |
| 2011/0263327 A1* | 10/2011 | Hosoi ................... A63F 13/235 463/36 |
| 2012/0052934 A1* | 3/2012 | Maharbiz ............ A63F 3/00214 463/9 |
| 2012/0098837 A1* | 4/2012 | Hulbert .................. A63F 13/98 345/473 |
| 2013/0150166 A1 | 6/2013 | Urata et al. |
| 2016/0320862 A1* | 11/2016 | Schradin ................. A63F 13/00 |

FOREIGN PATENT DOCUMENTS

| | | |
|---|---|---|
| JP | 2010-017387 | 1/2010 |
| JP | 2010-118018 | 5/2010 |

OTHER PUBLICATIONS

Brewis, "How to Make Google Cardboard—Turn any Phone into a VR Headset—How-to—PC Advisor", dated Mar. 1, 2016, XPO55311844, http://www.pcadvisor.co.uk/how-to/gadget/how-make-google-cardboard-vr-headset-v2-3585298/, retrieved on Oct. 18, 2016.

Extended European Search Report dated Dec. 6, 2017 issued in European Application No. 17183339.5 (8 pgs.).

Natalie Kramer: "How to Make a Light Up Shoebox Theater", Jan. 9, 2014 (Jan. 9, 2014), XP055428048, 1 Retrieved from the Internet: URL:http://www.handmadecharlotte.com/diy-light-artic-themed-shoebox-theater/ [retrieved on Nov. 23, 2017] (18 pgs.).

Michelle Mcinerney: "MollyMooCrafts DIY Cardboard Aquarium Craft", Jun. 22, 2012 (Jun. 22, 2012), XP055428053, 2 Retrieved from the Internet: U RL:http:// mollymoocrafts.com/ diy-cardboard-aquarium-craft/ [retrieved on Nov. 23, 2017] (15 pgs.).

Brewis, "How to Make Google Cardboard—Turn any Phone into a VR Headset—How-to-PC Advisor", dated Mar. 1, 2016, XP055311844, http://www.pcadvisor.co.uk/how-to/gadget/how-make-google-cardboard-vr-headset-v2-3585298/, retrieved on Oct. 18, 2016.

Savage et al., "Sauron: Embedded Single-Camera Sensing of Printed Physical User Interfaces", UIST'13, Oct. 8-11, 2013, St. Andrews, UK (pp. 447-456).

Office Action dated Jul. 29, 2019 issued in corresponding European Patent Appln. No. 18 185 549.5.

Office Action issued in corresponding Japanese Patent Application No. 2016-149869 dated Mar. 28, 2018.

* cited by examiner

F I G. 1 1
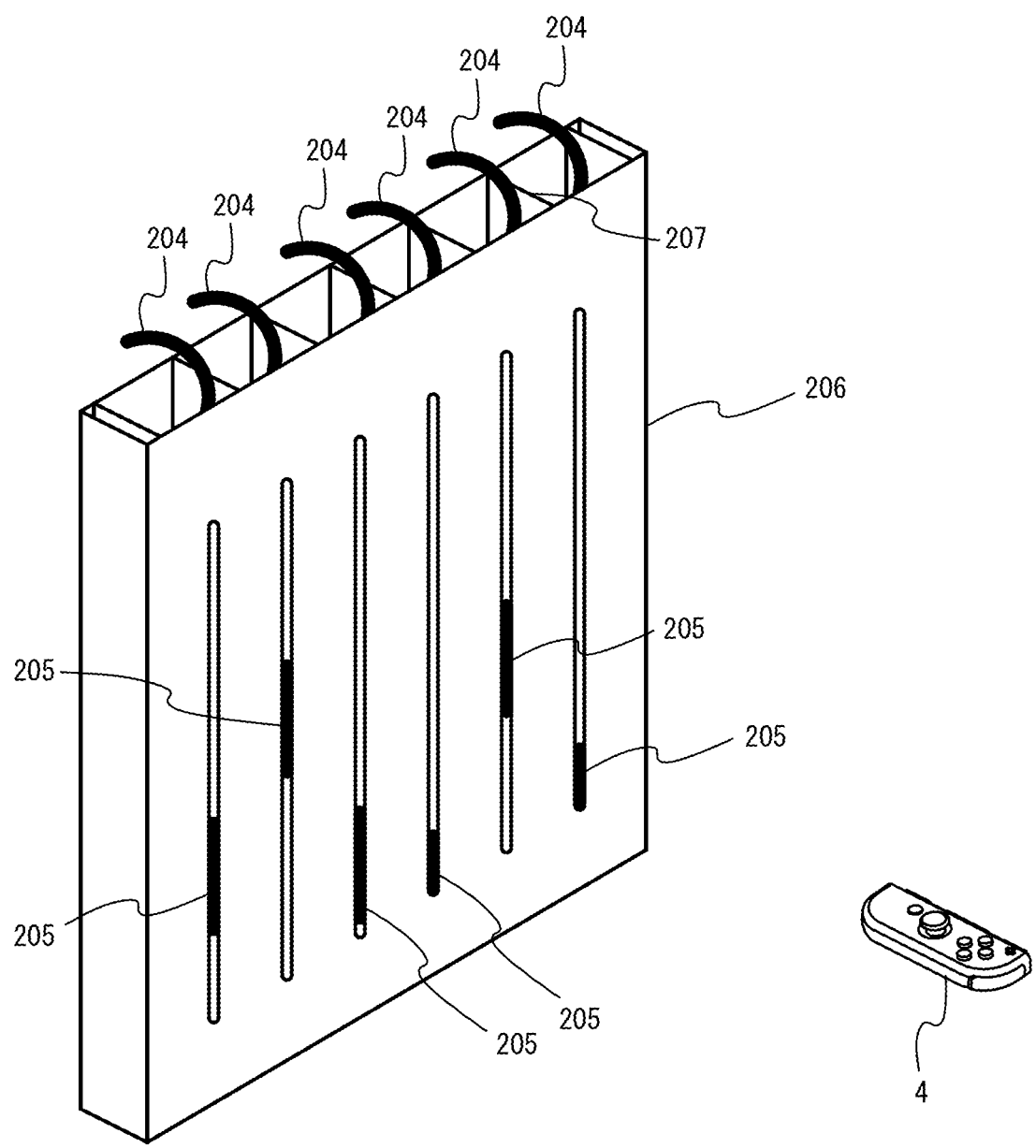

F I G. 1 3
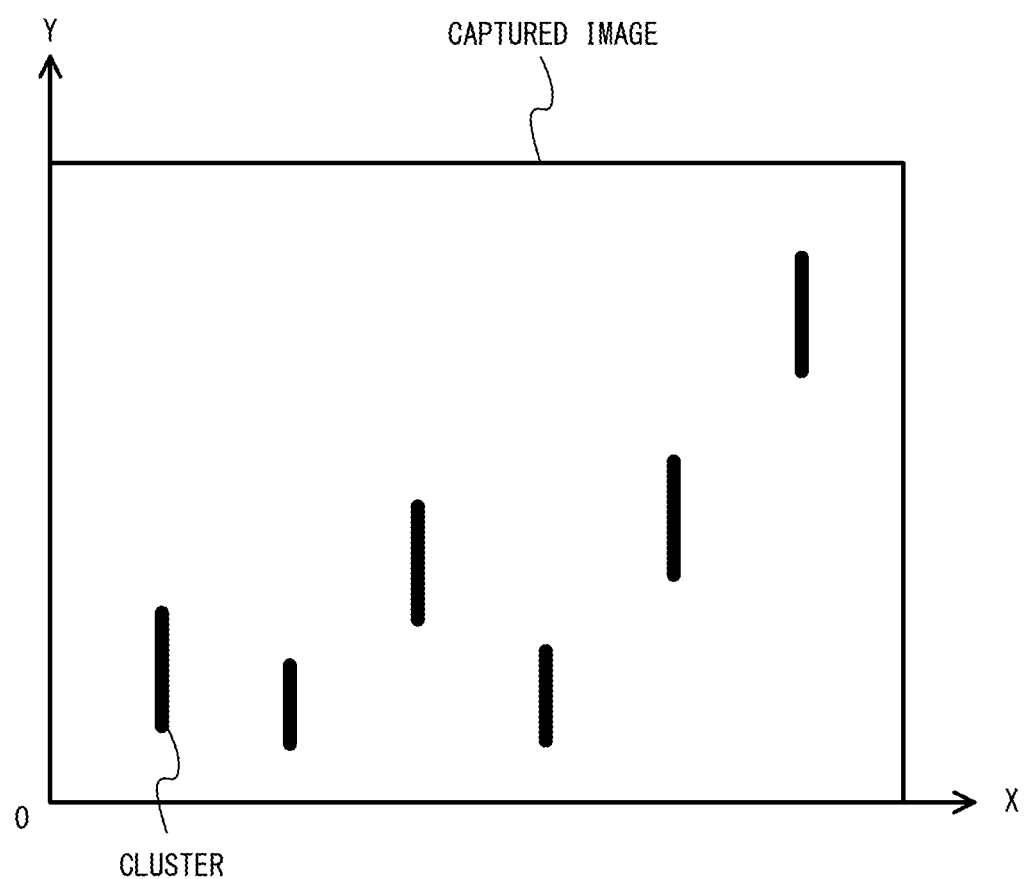

INFORMATION PROCESSING SYSTEM, CASE, AND CARDBOARD MEMBER

CROSS REFERENCE TO RELATED APPLICATION

The disclosure of Japanese Patent Application No. 2016-149869 filed on Jul. 29, 2016 is incorporated herein by reference.

FIELD

The technology shown herein relates to an information processing system including an information processing apparatus and a case to which a data transmission device is attachable, the case included in the information processing system, and a cardboard member to which the data transmission device is attachable.

BACKGROUND AND SUMMARY

Conventionally, there is an accessory device connectable to a mobile device to add a function to the mobile device. For example, there is a technology for connecting, to a connector provided in a controller of a apparatus, another controller as an accessory device. With such a technology, two controllers are usable to provide a wider variety of game operations.

However, the above-described accessory device includes a circuit usable for communicating with the mobile device and a circuit usable for an information process of generating information to be transmitted to the mobile device. Therefore, there is room for improvement, more specifically, for simplification of the structure of the accessory device.

Therefore, it is an object of an exemplary embodiment to provide an information processing apparatus realized by a simple structure, a case, and a cardboard member.

In order to achieve the above-described object, the exemplary embodiment may employ, for example, the following configurations. It is understood that, in order to interpret the claims, the scope of the claims should be interpreted only by the recitations of the claims. If there is a contradiction between the recitations of the claims and the descriptions of the specification, the recitations of the claims take precedence.

An example of information processing system in the exemplary embodiment includes an information processing apparatus, a data transmission device transmitting data to the information processing apparatus, and a case to which the data transmission device is attachable. The data transmission device includes an image capturing unit, and a transmission section. The transmission section transmits, to the information processing apparatus, data generated based on a captured image captured by the image capturing unit. The case includes a case main body, a data transmission device carrying portion, an image capturing target member, and an operation portion. The case main body has an inner space. On the data transmission device carrying portion, the data transmission device is allowed to be located while at least a part of the data transmission device is accommodated in the case main body, such that an image capturing direction of the image capturing unit is directed toward the inner space of the case main body. The image capturing target member is located at a position, in the inner space of the case main body, at which an image of the image capturing target member is allowed to be captured by the image capturing unit in the case where the data transmission device is located on the data transmission device carrying portion. The operation portion moves the image capturing target member in the inner space of the case main body in accordance with an operation made from outside of the case main body. The information processing apparatus includes a data receiving section and a processing section. The data receiving section receives the data transmitted from the transmission section. The processing section executes an information process based on the received data.

According to the above, the data transmission device capturing an image of the inner space of the case is attached to the case, and data generated based on a captured image of the image capturing target member that is moved inside the case in accordance with an operation made on the operation portion of the case may be used to execute an information process. Therefore, the case does not need to include an electric component that detects the content of operation made by the user or transmits the result of the detection to the information processing apparatus. For this reason, the case is realized with a simple structure.

The data transmission device may further include a calculation section. The calculation section at least calculates a position of the image capturing target member in the captured image captured by the image capturing unit. In this case, the data transmitted from the transmission section to the information processing apparatus includes at least the position of the image capturing target member in the captured image.

According to the above, the data transmission device transmits data representing the position of the image capturing target member included in the captured image. Therefore, the amount of data transmitted by the data transmission device is decreased.

The data transmission device may further include an infrared light emitting unit. The data transmission device carrying portion may allow the data transmission device to be located thereon such that the infrared light emitting unit emits infrared light toward the inner space of the case main body. The image capturing unit may be an infrared camera. The image capturing target member may include a retroreflective material.

According to the above, the image capturing target member is irradiated with infrared light and an image of the image capturing target member is captured by the infrared camera. Therefore, the image capturing target member is recognizable even in the captured image of the inside of the case shielded against external light. Thus, the possibility of erroneous recognition by the external light is decreased. Since the image capturing target member includes the retroreflective material reflecting infrared light, the image capturing target member is more easily recognizable in the captured image.

The case may further include a securing portion securing the case to a body of a user.

According to the above, the case acts as an expanded operation device that may be secured to the body of the user.

The securing portion may be a shoulder belt usable by the user to carry the case on his/her back.

According to the above, the case is carried by the user on the back, and thus is secured to the body of the user easily.

The operation portion may include at least one string member connected with the image capturing target member. The at least one string member may be allowed to be pulled by a hand of the user in a state where the case is secured to the body of the user by the securing portion. The operation portion may move the image capturing target member, connected with the string member, in the inner space of the case main body, in response to the user pulling the string member.

According to the above, an information process in accordance with an operation of pulling the string member included in the case is made possible.

The case may further include a slide portion. The slide portion supports the image capturing target member connected with the string member, such that the image capturing target is slidable in predetermined sliding directions in the inner space of the case main body. The operation portion may be configured to move the image capturing target member, connected with the string member, in one direction among the sliding directions when the string member is pulled.

According to the above, the image capturing target member is slidable inside the case, and thus the operation amount of pulling the string member is accurately recognized.

The operation portion may be configured to move the image capturing target member, connected with the string member, in another direction among the sliding directions that is opposite to the one direction when the string member is loosened after being pulled.

According to the above, the operation amount of loosening the string member is accurately recognized.

The information processing apparatus may be a game apparatus. The data transmission device may be a game controller usable for an operation on the game apparatus. The processing section may execute a game process of controlling a predetermined object in a virtual space in accordance with the position of the image capturing target member.

According to the above, the case may be used as an expanded operation device usable for a game operation.

The data transmission device may further include an inertia sensor. The transmission section may further transmit data based on an output of the inertia sensor to the information processing apparatus. The processing section may control the entirety of the object in accordance with the data based on the output of the inertia sensor and may control a part of the object in accordance with the position of the image capturing target member.

According to the above, a part of a virtual object is controlled in accordance with the operation made by use of the case, and the motion of the entirety of the virtual object is controlled in accordance with the motion of the entirety of the case.

An example of case in the exemplary embodiment includes at least an image capturing unit and allows a data transmission device, transmitting data generated based on a captured image captured by the image capturing unit to at least another device, to be attached thereto. The case includes a case main body, a data transmission device carrying portion, an image capturing target member, and an operation portion. The case main body has an inner space. On the data transmission device carrying portion, the data transmission device is allowed to be located while at least a part of the data transmission device is accommodated in the case main body, such that an image capturing direction of the image capturing unit is directed toward the inner space of the case main body. The image capturing target member is located at a position, in the inner space of the case main body, at which an image of the image capturing target member is allowed to be captured by the image capturing unit in the case where the data transmission device is located on the data transmission device carrying portion. The operation portion moves the image capturing target member in the inner space of the case main body in accordance with an operation made from outside of the case main body.

According to the above, the data transmission device capturing an image of the inner space of the case is attached to the case, and data generated based on a captured image of the image capturing target member that is moved inside the case in accordance with an operation made on the operation portion may be used to execute an information process. Therefore, the case does not need to include an electric component that detects the content of operation made by the user or transmits the result of the detection to the information processing apparatus. For this reason, the case is realized with a simple structure.

The case may further include a shoulder belt and a slide portion. The shoulder belt secures the case to a body of a user in a state where the case is carried by the user on his/her back. The slide portion supports the image capturing target member, such that the image capturing target is slidable in predetermined sliding directions in the inner space of the case main body. The operation portion may include at least one string member connected with the image capturing target member. The at least one string member may be allowed to be pulled by a hand of the user in a state where the case is secured to the body of the user by the shoulder belt. The operation portion may be configured to move the image capturing target member in one direction among the sliding directions when the string member is pulled and to move the image capturing target member in another direction among the sliding directions that is opposite to the one direction when the string member is loosened after being pulled.

According to the above, an information process in accordance with an operation of pulling the string member is made possible in a state where the case is carried by the user on the back and secured to the body of the user. The image capturing target member is slidable inside the case, and thus the operation amount of pulling the string member and the operation amount of loosening the string member are accurately recognized.

The case main body, the data transmission device carrying portion, the image capturing target member and the slide portion may be configured to be formed by folding at least one cardboard member.

According to the above, the cardboard members are folded and combined, and thus the case is assembled.

An example of cardboard member in the exemplary embodiment is usable to form an expanded attachment to which a data transmission device, transmitting predetermined data to another device, is attachable. The expanded attachment includes a main body, and a data transmission device carrying portion. The data transmission device carrying portion is formed in a part of the main body and allows the data transmission device to be located thereon while at least a part of the data transmission device is accommodated in the main body. The cardboard member is foldable to form the expanded attachment including the main body and the data transmission device carrying portion in an integrated manner.

According to the above, the cardboard member is folded to form an expanded attachment to which the data transmission device is attachable.

According to the exemplary embodiment, the case operable by the user is realized with a simple structure.

These and other objects, features, aspects and advantages of the exemplary embodiment will become more apparent from the following detailed description when taken in conjunction with the accompanying drawings.

BRIEF DESCRIPTION OF THE DRAWINGS

FIG. 11 shows a non-limiting example of state where the right controller 4 captures an image of image capturing target members 205 provided in the case 200;

FIG. 13 shows a non-limiting example of information on the image capturing target members 205 that is calculated in a first mode (cluster mode);

FIG. 16 shows a non-limiting example of cardboard member usable to assemble a front-side main body 201a;

DETAILED DESCRIPTION OF NON-LIMITING EXAMPLE EMBODIMENTS

A description is given below of an information processing apparatus according to an exemplary embodiment. An example of information processing system according to the exemplary embodiment includes a main body apparatus (information processing apparatus; acts as a game apparatus main body in the exemplary embodiment) 2, a left controller 3, a right controller 4, and a case 200. The left controller 3 and the right controller 4 are attachable to, and detachable from, the main body apparatus 2. The left controller 3 and the right controller 4 may be attached to the main body apparatus 2, so that the resultant assembly is used as an integrated device. Alternatively, the main body apparatus 2, the left controller 3 and the right controller 4 are usable as separate bodies (see FIG. 2). The information processing system is usable in a form in which an image is displayed on the main body apparatus 2, and in a form in which an image is displayed on another display device such as a TV or the like (e.g., a stationary monitor). In the former form, the information processing system is usable as a mobile apparatus (e.g., a mobile game apparatus). In the latter form, the information processing system is usable as a stationary apparatus (e.g., a stationary game apparatus). The case 200 in the information processing system, in a state where a controller (e.g., right controller) is attached thereto, is usable as an expanded operation device (expanded attachment).

Figure 1:
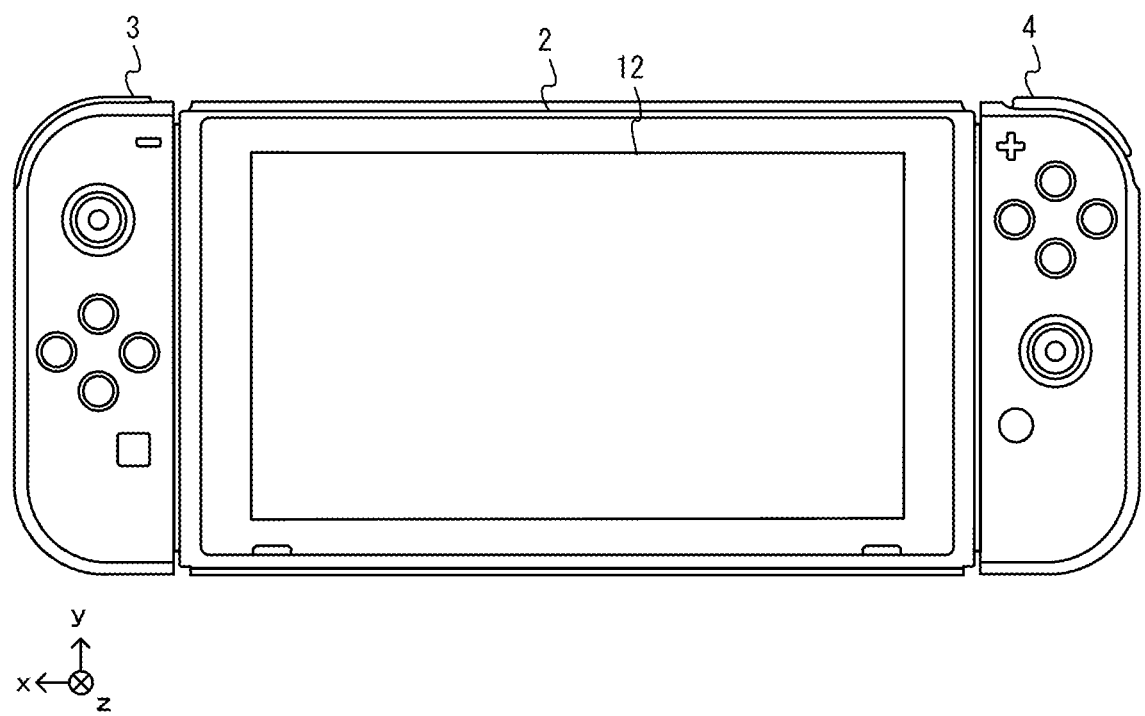
FIG. 1 shows a non-limiting example of state where a left controller 3 and a right controller 4 are attached to a main body apparatus 2.

FIG. 1 shows a state where the left controller 3 and the right controller 4 are attached to the main body apparatus 2. As shown in FIG. 1, the left controller 3 and the right controller 4 are attached to, and integrated with, the main body apparatus 2. The main body apparatus 2 is an apparatus that executes various processes (e.g., game process) in the information processing system. The main body apparatus 2 includes a display 12. The left controller 3 and the right controller 4 are each a device including an operation section allowing a user to make an input thereto.

Figure 2:
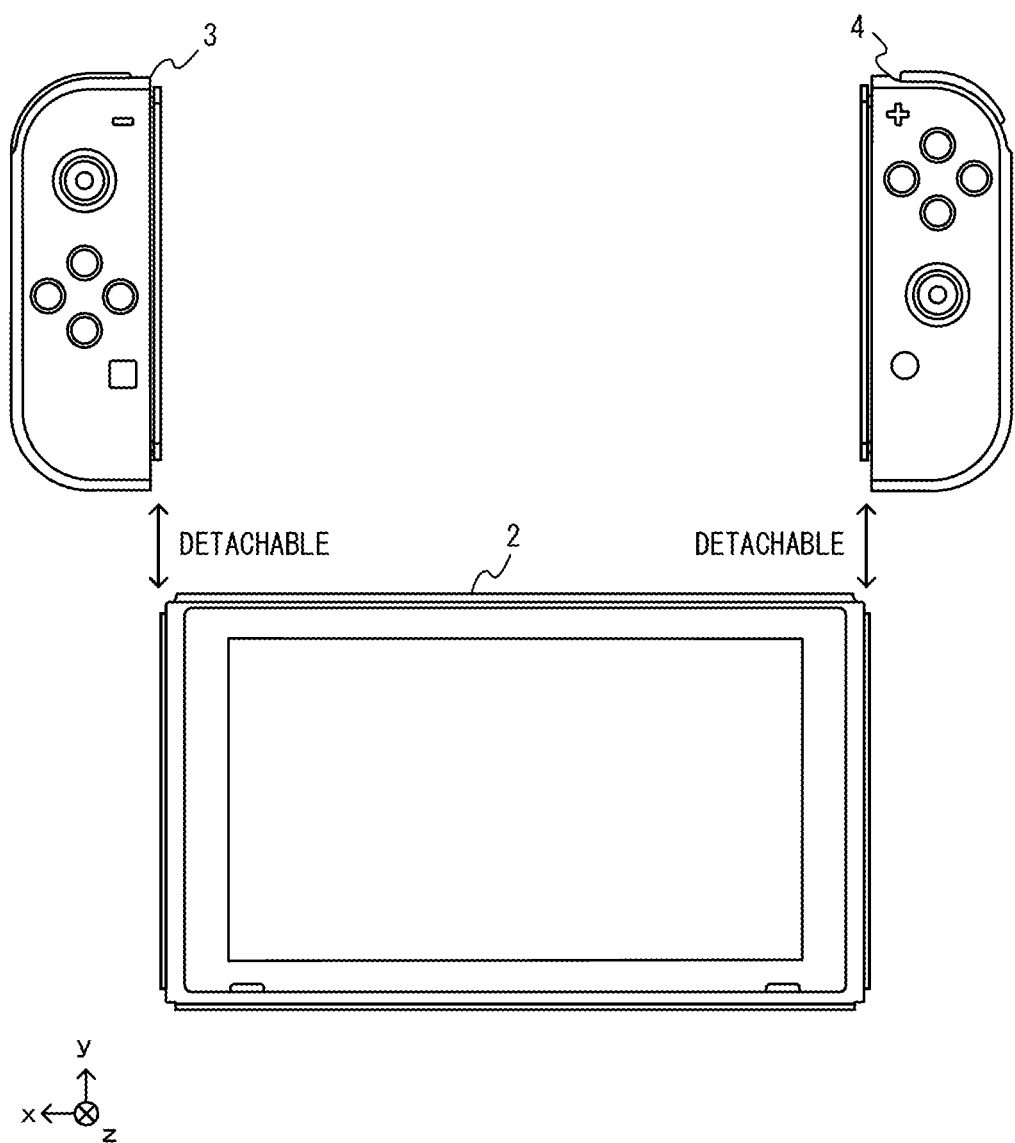
FIG. 2 shows a non-limiting example of state where the left controller 3 and the right controller 4 are detached from the main body apparatus 2.

FIG. 2 shows an example of state where the left controller 3 and the right controller 4 are detached from the main body apparatus 2. As shown in FIG. 1 and FIG. 2, the left controller 3 and the right controller 4 are attachable to, and detachable from, the main body apparatus 2. The left controller 3 is attachable to a left side surface (side surface on a positive side in an x-axis direction shown in FIG. 1) of the main body apparatus 2, and is attachable to, and detachable from, the main body apparatus 2 by being slid along the left side surface of the main body apparatus 2 in a y-axis direction shown in FIG. 1. The right controller 4 is attachable to a right side surface (side surface on a negative side in the x-axis direction shown in FIG. 1) of the main body apparatus 2, and is attachable to, and detachable from, the main body apparatus 2 by being slide along the right side surface of the main body apparatus 2 in the y-axis direction shown in FIG. 1. Hereinafter, the left controller 3 and the right controller 4 will occasionally be referred to collectively as "controllers". In the exemplary embodiment, an "operation device" operable by a single user may be a single controller (e.g., one of the left controller 3 and the right controller 4) or a plurality of controllers (e.g., both the left controller 3 and the right controller 4, or at least either the left controller 3 or the right controller 4 and another controller). The "operation device" includes at least one controller. In the exemplary embodiment, one controller (e.g., right controller) may be attached to the expanded operation device (e.g., case 200), so that the user operates the expanded operation device to control an information process (e.g., game process) which is being executed by the main body apparatus 2. Hereinafter, an example of specific configuration of the main body apparatus 2, the left controller 3, and the right controller 4 will be described.

Figure 3:
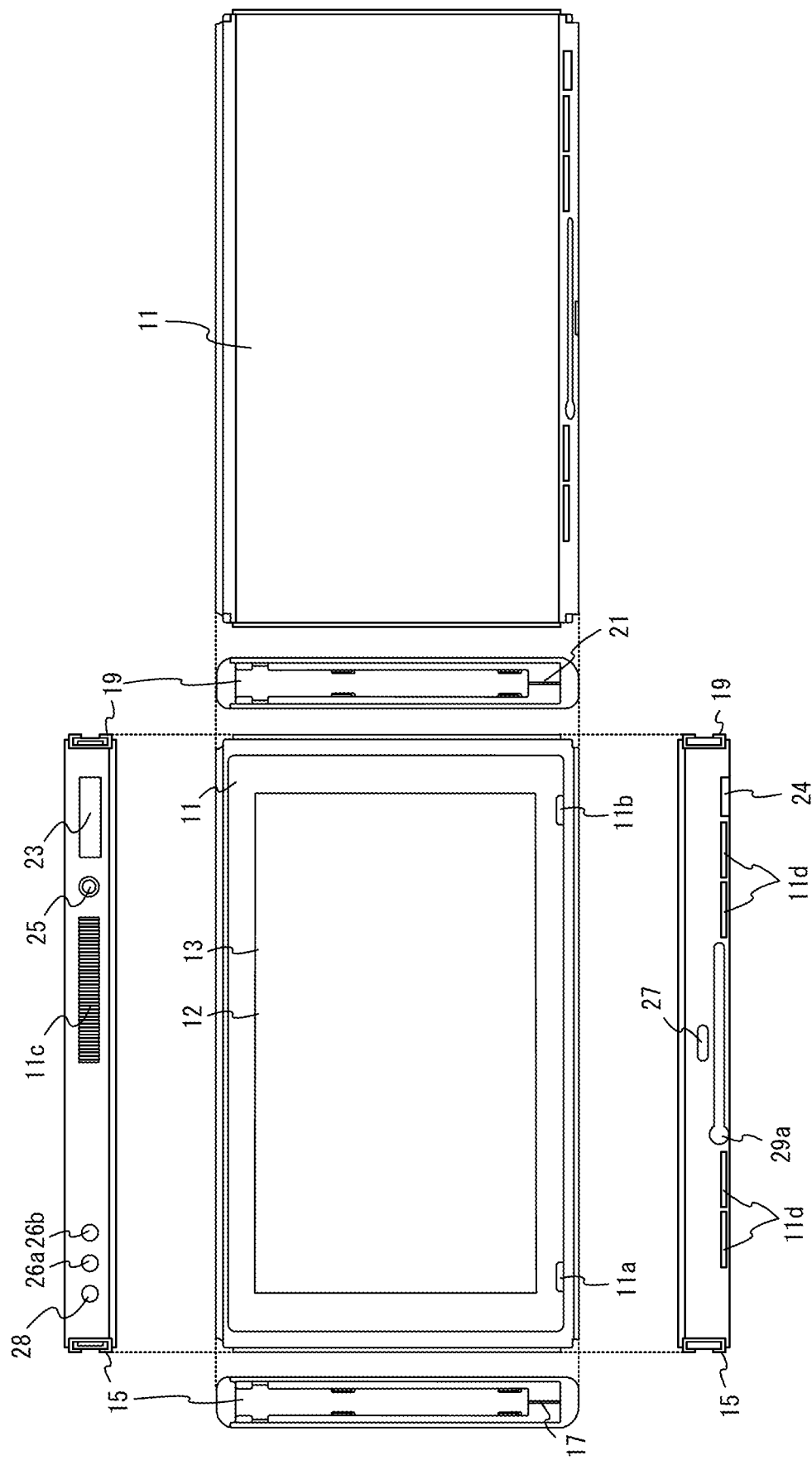
FIG. 3 provides six orthogonal views showing a non-limiting example of the main body apparatus 2.

FIG. 3 provides six orthogonal views showing an example of the main body apparatus 2. As shown in FIG. 3, the main body apparatus 2 includes a generally plate-shaped housing 11. In the exemplary embodiment, a main surface of the housing 11 (in other words, a front surface, i.e., a surface on which the display 12 is provided) has a roughly rectangular shape. In the exemplary embodiment, the housing 11 is longer in a left-right direction as described below. In the exemplary embodiment, a longer direction of the main surface of the housing 11 (i.e., x-axis direction shown in FIG. 1) will be referred to as a "width direction" (also referred to as the "left-right direction"), and a short direction of the main surface (i.e., y-axis direction shown in FIG. 1) will be referred to as a "length direction" (also referred to as an "up-down direction"). A direction perpendicular to the main surface (i.e., z-axis direction shown in FIG. 1) will be referred to as a "depth direction" (also referred to as a "front-rear direction"). The main body apparatus 2 is usable in an orientation in which the width direction extends in the horizontal direction. The main body apparatus 2 is also usable in an orientation in which the length direction extends in the horizontal direction. In this case, the housing 11 may be considered as being longer in the vertical direction.

The housing 11 may have any shape and size. For example, the housing 11 may have a mobile size. A single body of the main body apparatus 2, or an integrated apparatus including the main body apparatus 2 and the left and right controllers 3 and 4 attached thereto, may act as a mobile apparatus. Alternatively, the main body apparatus 2 or the integrated apparatus may act as a handheld apparatus. Still alternatively, the main body apparatus 2 or the integrated apparatus may act as a portable apparatus.

As shown in FIG. 3, the main body apparatus 2 includes the display 12 provided on the main surface of the housing 11. The display 12 displays an image (a still image or a moving image) acquired or generated by the main body apparatus 2. In the exemplary embodiment, the display 12 is a liquid crystal display device (LCD). Alternatively, the display 12 may be a display device of any type.

The main body apparatus 2 includes a touch panel 13 provided on a screen of the display 12. In the exemplary embodiment, the touch panel 13 is of a type that allows a multi-touch input to be made (e.g., of an electrostatic capacitance type). Alternatively, the touch panel 13 may be of any type. For example, the touch panel 13 may be of a type that allows a single-touch input to be made (e.g., of a resistive type).

The main body apparatus 2 includes speakers (speakers 88 shown in FIG. 6) accommodated in the housing 11. As shown in FIG. 3, the main surface of the housing 11 has speaker holes 11a and 11b formed therein. The speakers 88 output a sound through the speaker holes 11a and 11b.

As shown in FIG. 3, the main body apparatus 2 includes a left rail member 15 provided on the left side surface of the housing 11. The left rail member 15 is provided to allow the left controller 3 to be detachably attached to the main body apparatus 2. The left rail member 15 extends in the up-down direction on the left side surface of the housing 11. The left rail member 15 is so shaped as to be engageable with a slider in the left controller 3 (slider 40 shown in FIG. 4), and a slide mechanism includes the left rail member 15 and the slider 40. The slide mechanism allows the left controller 3 to be slidably and detachably attached to the main body apparatus 2.

The main body apparatus 2 includes a left terminal 17. The left terminal 17 allows the main body apparatus 2 to communicate with the left controller 3 in a wired manner. The left terminal 17 is provided at a position where, in the case where the left controller 3 is attached to the main body apparatus 2, the left terminal 17 comes into contact with a terminal in the left controller 3 (terminal 42 shown in FIG. 4). The specific position of the left terminal 17 is optional. In the exemplary embodiment, as shown in FIG. 3, the left terminal 17 is provided on a bottom surface of a groove in the left rail member 15. In the exemplary embodiment, the left terminal 17 is provided near a lower end on the bottom surface of the groove of the left rail member 15, more specifically, at a position where the left terminal 17 is not exposed outside by a part of the left rail member 15.

As shown in FIG. 3, components similar to the components provided on the left side surface of the housing 11 are provided on the right side of the housing 11. Specifically, the main body apparatus 2 includes a right rail member 19 provided on the right side surface of the housing 11. The right rail member 19 extends in the up-down direction on the right side surface of the housing 11. The right rail member 19 is so shaped as to be engageable with a slider in the right controller 4 (slider 62 shown in FIG. 5), and a slide mechanism includes the right rail member 19 and the slider 62. The slide mechanism allows the right controller 4 to be slidably and detachably attached to the main body apparatus 2.

The main body apparatus 2 includes a right terminal 21. The right terminal 21 is provided to allow the main body apparatus 2 to communicate with the right controller 4 in a wired manner. The right terminal 21 is provided at a position where, in the case where the right controller 4 is attached to the main body apparatus 2, the right terminal 21 comes into contact with a terminal in the right controller 4 (terminal 64 shown in FIG. 5). The specific position of the right terminal 21 is optional. In the exemplary embodiment, as shown in FIG. 3, the right terminal 21 is provided on a bottom surface of a groove in the right rail member 19. In the exemplary embodiment, the right terminal 21 is provided near a lower end of the bottom surface of the groove of the right rail member 19, more specifically, at a position where the right terminal 21 is not exposed outside by a part of the right rail member 19.

As shown in FIG. 3, the main body apparatus 2 includes a first slot 23. The first slot 23 is provided in an upper side surface of the housing 11. The first slot 23 is so shaped as to allow a first type storage medium to be attached to the first slot 23. The first type storage medium is, for example, a dedicated storage medium (e.g., dedicated memory card) for the information processing system and an information processing apparatus of the same type as that of the information processing system. The first type storage medium is used to, for example, store data usable by the main body apparatus 2 (e.g., saved data of an application or the like) and/or a program executable by the main body apparatus 2 (e.g., program for an application or the like). The main body apparatus 2 includes a power button 28. As shown in FIG. 3, the power button 28 is provided on the upper side surface of the housing 11. The power button 28 is provided to switch the power supply of the main body apparatus 2 between an on-state and an off-state.

The main body apparatus 2 includes a sound input/output terminal (specifically, earphone jack) 25. That is, the main body apparatus 2 allows a microphone or an earphone to be attached to the sound input/output terminal 25. As shown in FIG. 3, the sound input/output terminal 25 is provided on the upper side surface of the housing 11.

The main body apparatus 2 includes sound volume buttons 26a and 26b. As shown in FIG. 3, the sound volume buttons 26a and 26b are provided on the upper side surface of the housing 11. The sound volume buttons 26a and 26b are provided to give an instruction to adjust the volume of a sound output from the main body apparatus 2. The sound volume button 26a is provided to give an instruction to turn down the sound volume, and the sound volume button 26b is provided to give an instruction to turn up the sound volume.

The housing 11 includes an exhaust hole 11c formed thereon. As shown in FIG. 3, the exhaust hole 11c is formed in the upper side surface of the housing 11. The exhaust hole 11c is formed to exhaust (in other words, release) heat generated inside the housing 11 to outside the housing 11. That is, the exhaust hole 11c may be called a heat discharge hole.

The main body apparatus 2 includes a lower terminal 27. The lower terminal 27 is provided to allow the main body apparatus 2 to communicate with a cradle. As shown in FIG. 3, the lower terminal 27 is provided on a lower side surface of the housing 11. In the case where the main body apparatus 2 is attached to the cradle, the lower terminal 27 is connected to a terminal of the cradle. In the exemplary embodiment, the lower terminal 27 is a USB connector (more specifically, a female connector). Only the main body apparatus 2, with the left controller 3 and the right controller 4 being detached therefrom, may be mounted on the cradle. In another example, the integrated apparatus including the main body apparatus 2 and the left and right controllers 3 and 4 attached thereto may be mounted on the cradle. The cradle is communicable (via wired communication or wireless communication) with a stationary monitor (e.g., stationary TV), which is an example of external display device separate from the main body apparatus 2. In the case where the integrated apparatus or a single body of the main body apparatus 2 is mounted on the cradle, the information processing system displays, on the stationary monitor, an image acquired or generated by the main body apparatus 2. In the exemplary embodiment, the cradle has a function of charging the integrated apparatus or a single body of the main body apparatus 2 mounted thereon. The cradle has a function of a hub apparatus (specifically, a USB hub).

The main body apparatus 2 includes a second slot 24. In the exemplary embodiment, the second slot 24 is provided in the lower side surface of the housing 11. In another exemplary embodiment, the second slot 24 may be provided in the same surface as the first slot 23. The second slot 24 is so shaped as to allow a second type storage medium, different from the first type storage medium, to be attached to the second slot 24. The second type storage medium may be, for example, a general-purpose storage medium. For example, the second type storage medium may be an SD card. Similarly to the first type storage medium, the second type storage medium is used to, for example, store data usable by the main body apparatus 2 (e.g., saved data of an application or the like) and/or a program executable by the main body apparatus 2 (e.g., program for an application or the like).

The housing 11 includes an absorption holes 11d formed therein. As shown in FIG. 3, the air absorption holes 11d are formed in the lower side surface of the housing 11. The absorption holes 11d are formed to absorb (in other words, introduce) air outside the housing 11 into the housing 11. In the exemplary embodiment, the air absorption holes 11d are formed in the surface opposite to the surface in which the exhaust hole 11c is formed. Thus, heat in the housing 11 is released efficiently.

The shapes, the numbers, and the installation positions of the above-described components provided in the housing 11 (specifically, the buttons, the slots, the terminals, and the like) are optional. For example, in another exemplary embodiment, at least one of the power button 28 and the slots 23 and 24 may be provided on/in another side surface or a rear surface of the housing 11. Alternatively, in another exemplary embodiment, the main body apparatus 2 may not include at least one of the above-described components.

Figure 4:
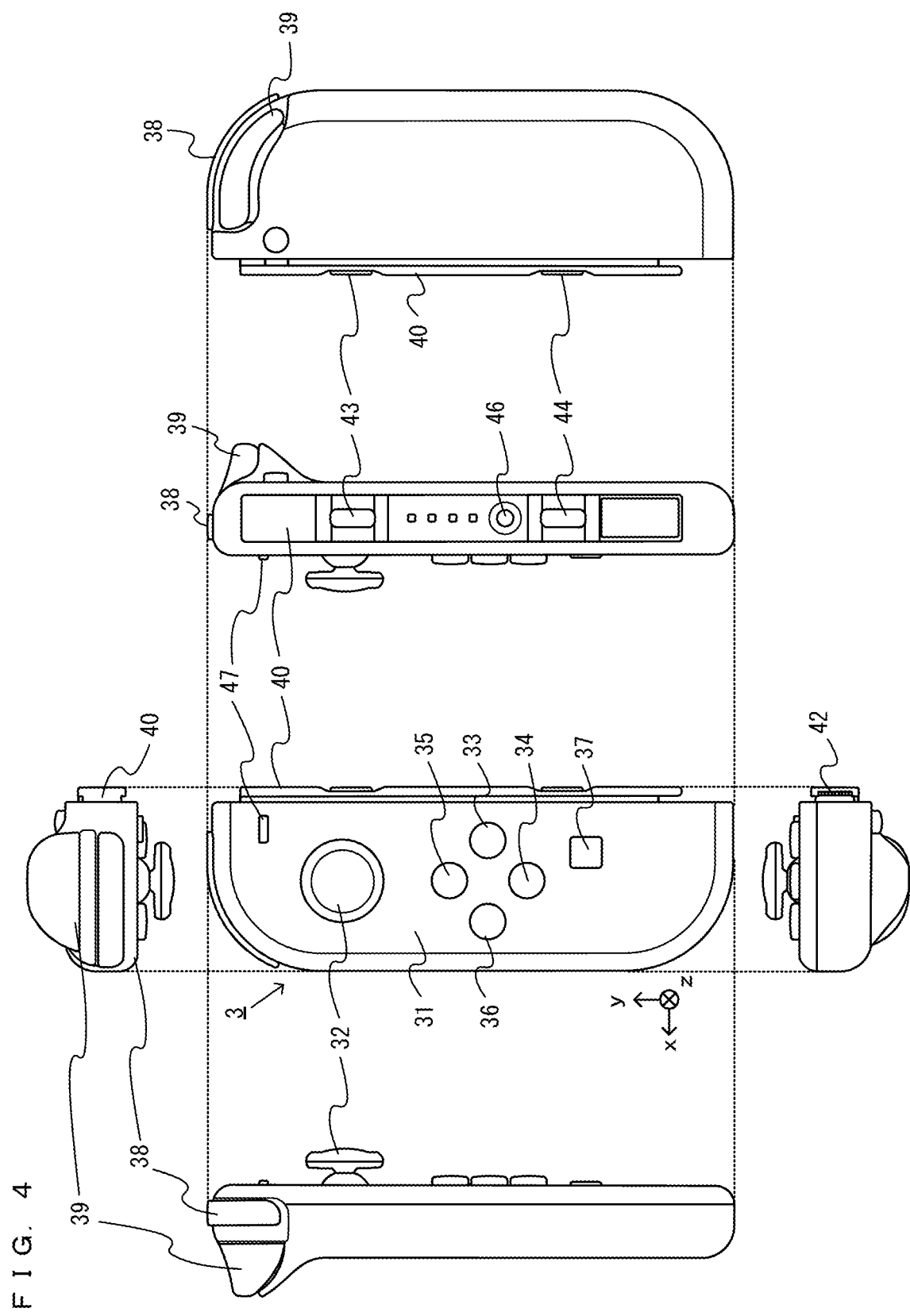
FIG. 4 provides six orthogonal views showing a non-limiting example of the left controller 3.

FIG. 4 provides six orthogonal views showing an example of the left controller 3. As shown in FIG. 4, the left controller 3 includes a housing 31. In the exemplary embodiment, the housing 31 is generally plate-shaped. A main surface of the housing 31 (in other words, a front surface. i.e., a surface on a negative side in the z-axis direction shown in FIG. 1) has a roughly rectangular shape. In the exemplary embodiment, the housing 31 is longer in the up-down direction in FIG. 1A (i.e., in the y-axis direction shown in FIG. 1). In a state of being detached from the main body apparatus 2, the left controller 3 may be held in an orientation in which the longer side extends in the vertical direction. The housing 31 has such a shape and such a size as to be held by one hand, particularly, with the left hand when being held in an orientation in which the longer side extends in the vertical direction. The left controller 3 may also be held in an orientation in which the longer side extends in the horizontal direction. In a case of being held in an orientation in which the longer side extends in the horizontal direction of, the left controller 3 may be held with both of two hands of the user. The housing 31 has any shape. In another exemplary embodiment, the housing 31 may not be generally plate-shaped. The housing 31 may not be rectangular, and may be, for example, semicircular. The housing 31 may not be vertically long.

The length in the up-down direction of the housing 31 is approximately equal to the length in the up-down direction of the housing 11 of the main body apparatus 2. The thickness of the housing 31 (i.e., length in the front-rear direction, in other words, the length in the z-axis direction shown in FIG. 1) is approximately equal to the thickness of the housing 11 of the main body apparatus 2. Thus, in the case where the left controller 3 is attached to the main body apparatus 2 (see FIG. 1), the user can hold the main body apparatus 2 and the left controller 3 with a feeling that he/she holds an integrated apparatus.

As shown in FIG. 4, the main surface of the housing 31 is shaped such that left corners thereof are more rounded than right corners thereof. Specifically, a connection portion between an upper side surface and a left side surface of the housing 31 and a connection portion between a lower side surface and the left side surface of the housing 31 are more rounded (in other words, are chamfered to have a greater roundness) than a connection portion between the upper side surface and a right side surface of the housing 31 and a connection portion between the lower side surface and the right side surface of the housing 31. Thus, in the case where the left controller 3 is attached to the main body apparatus 2 (see FIG. 1), the integrated apparatus has a rounded shape on the left side and thus is easy for the user to hold.

The left controller 3 includes an analog stick 32. As shown in FIG. 4, the analog stick 32 is provided on the main surface of the housing 31. The analog stick 32 is an example of direction input section usable to input a direction. The analog stick 32 includes a stick member that can be inclined in all directions parallel to the main surface of the housing 31 (i.e., 360° directions including up, down, left, right, and oblique directions). The user may incline the stick member to input a direction corresponding to a direction of the inclination (and to input a magnitude corresponding to an angle of the inclination). The direction input section may be a cross key, a slide stick, or the like. In the exemplary embodiment, the stick member may be pressed (in a direction perpendicular to the housing 31) to make an input operation. That is, the analog stick 32 is an input section usable to input a direction and a magnitude corresponding to the direction of inclination and the amount of inclination of the stick member, and also usable to make a press input operation on the stick member.

The left controller 3 includes four operation buttons 33 through 36 (specifically, a right direction button 33, a down direction button 34, an up direction button 35, and a left direction button 36). As shown in FIG. 4, the four operation buttons 33 through 36 are provided below the analog stick 32 on the main surface of the housing 31. In the exemplary embodiment, the four operation buttons are provided on the main surface of the left controller 3. The number of operation buttons is optional. The operation buttons 33 through 36 are used to give instructions corresponding to various programs executable by the main body apparatus 2 (e.g., an OS program and an application program). In the exemplary embodiment, the operation buttons 33 through 36 are usable to input directions, and thus are termed the right direction button 33, the down direction button 34, the up direction button 35, and the left direction button 36. Alternatively, the operation buttons 33 through 36 may be used to give instructions other than directions.

The left controller 3 includes a recording button 37. As shown in FIG. 4, the recording button 37 is provided on the main surface of the housing 31, more specifically, is provided on a lower right area of the main surface. The recording button 37 is used to give an instruction to store an image displayed on the display 12 of the main body apparatus 2. In the case where, for example, a game image is displayed on the display 12, the user may press the recording button 37 to store the game image, displayed at the time when the recording button 37 is pressed, on, for example, a storage section of the main body apparatus 2.

The left controller 3 includes a "−" (minus) button 47. As shown in FIG. 4, the "−" button 47 is provided on the main surface of the housing 31, more specifically, is provided on an upper right area of the main surface. The "−" button 47 is used to give instructions corresponding to various programs executable by the main body apparatus 2 (e.g., an OS program and an application program). The "−" button 47 is used as, for example, a select button in a game application (e.g., as a button used to switch a selectable item).

In the case where the left controller 3 is attached to the main body apparatus 2, the operation sections provided on the main surface of the left controller 3 (specifically, the analog stick 32 and the buttons 33 through 37 and 47) are operated with, for example, the thumb of the left hand of the user holding the integrated apparatus. In the case where the left controller 3 is used while being detached from the main body apparatus 2 and held in a horizontal orientation with both of two hands of the user, the above-described operation sections are operated with, for example, the thumbs of the left and right hands of the user holding the left controller 3. Specifically, in this case, the analog stick 32 is operated with the thumb of the left hand of the user, and the operation buttons 33 through 36 are operated with the thumb of the right hand of the user.

The left controller 3 includes a first L-button 38. The left controller 3 includes a ZL-button 39. Similarly to the operation buttons 33 through 36, the operation buttons 38 and 39 are used to give instructions corresponding to various programs executable by the main body apparatus 2. As shown in FIG. 4, the first L-button 38 is provided on an upper left portion of the side surface of the housing 31. The ZL-button 39 is provided on an upper left portion from the side surface to a rear surface of the housing 31 (more precisely, an upper left portion when the housing 31 is viewed from the front side thereof). That is, the ZL-button 39 is provided to the rear of the first L-button 38 (on a positive side in the z-axis direction shown in FIG. 1). In the exemplary embodiment, the upper left portion of the housing 31 has a rounded shape. Therefore, the first L-button 38 and the ZL-button 39 each have a rounded shape corresponding to the roundness of the upper left portion of the housing 31. In the case where the left controller 3 is attached to the main body apparatus 2, the first L-button 38 and the ZL-button 39 are located on an upper left portion of the integrated apparatus.

The left controller 3 includes the slider 40 described above. As shown in FIG. 4, the slider 40 extends in the up-down direction on the right side surface of the housing 31. The slider 40 is so shaped as to be engageable with the left rail member 15 of the main body apparatus 2 (more specifically, with the groove in the left rail member 15). Thus, the slider 40, when being engaged with the left rail member 15, is secured so as not to be detached in a direction perpendicular to a slide direction (the slide direction is, in other words, the direction in which the left rail member 15 extends).

The left controller 3 includes the terminal 42 usable by the left controller 3 to communicate with the main body apparatus 2 in a wired manner. The terminal 42 is provided at a position where, in the case where the left controller 3 is attached to the main body apparatus 2, the terminal 42 comes into contact with the left terminal 17 (FIG. 3) of the main body apparatus 2. The specific position of the terminal 42 is optional. In the exemplary embodiment, as shown in FIG. 4, the terminal 42 is provided at a position where the terminal 42 is not exposed outside by an attachment surface to which the slider 40 is attached. In the exemplary embodiment, the terminal 42 is provided near a lower end on the attachment surface of the slider 40.

The left controller 3 includes a second L button 43 and a second R button 44. The buttons 43 and 44 are used to give instructions corresponding to various programs executable by the main body apparatus 2, like the other operation buttons 33 through 36. As shown in FIG. 4, the second L-button 43 and the second R button 44 are provided on the attachment surface to which the slider 40 is attached. The second L button 43 is provided on the attachment surface, more specifically, at a position upper to the center in the up-down direction (y-axis direction shown in FIG. 1). The second R button 44 is provided on the attachment surface, more specifically, at a position lower to the center in the up-down direction. The second L button 43 and the second R button 44 are located at positions where the second L button 43 and the second R button 44 are not pressed in a state where the left controller 3 is attached to the main body apparatus 2. Namely, the second L button 43 and the second R button 44 are usable in a state where the left controller 3 is detached from the main body apparatus 2. The second L button 43 and the second R button 44 are operable by, for example, the index finger or the middle finger of either the left hand or the right hand of the user holding the left controller 3 detached from the main body apparatus 2.

The left controller 3 includes a paring button 46. In the exemplary embodiment, the pairing button 46 is used to give an instruction to perform a setting process on the wireless communication between the left controller 3 and the main body apparatus 2 (such a setting process is also referred to as "pairing"). The pairing button 46 is also used to give an instruction to perform a reset process on the left controller 3. In another embodiment, the pairing button 46 may have a function of giving only an instruction to perform the setting process or an instruction to perform the reset process. In the case where, for example, the pairing button 46 is short-pressed (specifically, in the case where the pairing button 46 is pressed for a time period shorter than a predetermined time period), the left controller 3 executes the above-described setting process. In the case where the pairing button 46 is long-pressed (specifically, in the case where the pairing button 46 is pressed for the predetermined time period or longer), the left controller 3 executes the above-described reset process. In the exemplary embodiment, as shown in FIG. 4, the pairing button 46 is provided on the attachment surface to which the slider 40 is attached. As can be seen, the pairing button 46 is located at a position where the pairing button 46 is not viewed in a state where the left controller 3 is attached to the main body apparatus 2. Namely, the pairing button 46 is used in a state where left controller 3 is detached from the main body apparatus 2.

In the exemplary embodiment, the buttons provided on the attachment surface to which the slider 40 is attached (specifically, the second L button 43, the second R button 44, and the pairing button 46) are provided so as not to protrude from the attachment surface. Namely, top surfaces (in other words, surfaces to be pressed) of the above-mentioned buttons are flush with, or are recessed from, the attachment surface to which the slider 40 is attached. With such a structure, in a state where the slider 40 is attached to the left rail member 15 of the main body apparatus 2, the slider 40 is smoothly slidable with respect to the left rail member 15.

Figure 5:
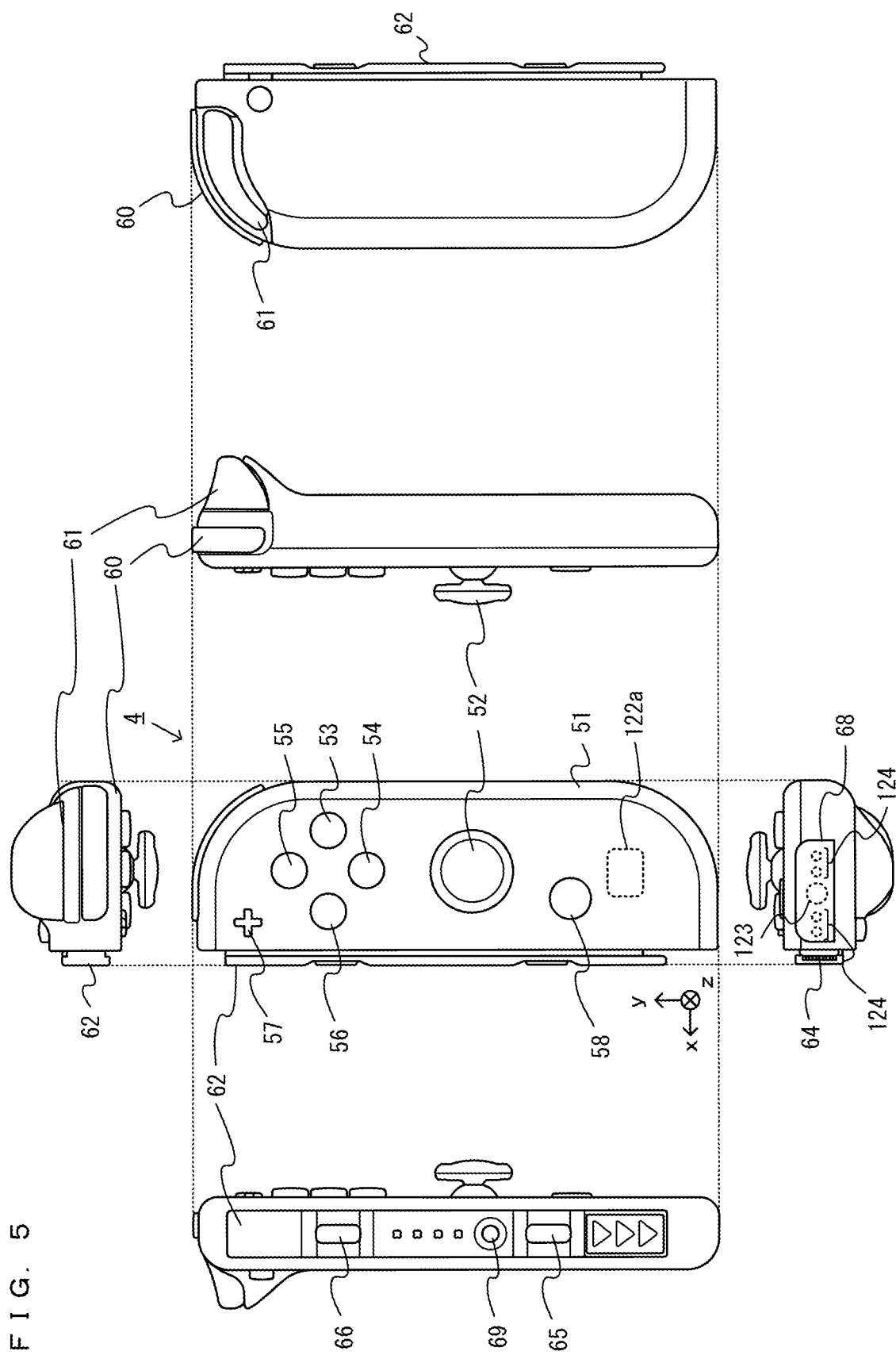
FIG. 5 provides six orthogonal views showing a non-limiting example of the right controller 4.

FIG. 5 provides six orthogonal views showing an example of the right controller 4. As shown in FIG. 5, the right controller 4 includes a housing 51. In the exemplary embodiment, the housing 51 is generally plate-shaped. A main surface of the housing 51 (in other words, a front surface, i.e., a surface on the negative side in the z-axis direction shown in FIG. 1) has a roughly rectangular shape. In the exemplary embodiment, the housing 51 is longer in the up-down direction in FIG. 1A. In a state of being detached from the main body apparatus 2, the right controller 4 may be held in an orientation in which the longer side extends in the vertical direction. The housing 51 has such a shape and such a size as to be held by one hand, particularly, with the right hand when being held in an orientation in which the longer side extends in the vertical direction. The right controller 4 may also be held in an orientation in which the longer side extends in the horizontal direction. In a case of being held in an orientation in which the longer side extends in the horizontal direction, the right controller 4 may be held with both of two hands of the user.

Similarly to the case of the housing 31 of the left controller 3, the length in the up-down direction of the housing 51 of the right controller 4 is approximately equal to the length in the up-down direction of the housing 11 of the main body apparatus 2, and the thickness of the housing 51 is approximately equal to the thickness of the housing 11 of the main body apparatus 2. Thus, in the case where the right controller 4 is attached to the main body apparatus 2 (see FIG. 1), the user can hold the main body apparatus 2 and the right controller 4 with a feeling that he/she holds an integrated apparatus.

As shown in FIG. 5, the main surface of the housing 51 is shaped such that right corners thereof are more rounded than left corners thereof. Specifically, a connection portion between an upper side surface and a right side surface of the housing 51 and a connection portion between a lower side surface and the right side surface of the housing 51 are more rounded (in other words, are chamfered to have a greater roundness) than a connection portion between the upper side surface and a left side surface of the housing 51 and a connection portion between the lower side surface and the left side surface of the housing 51. Thus, in the case where the right controller 4 is attached to the main body apparatus 2 (see FIG. 1), the integrated apparatus has a rounded shape on the right side and thus is easy for the user to hold.

Similarly to the left controller 3, the right controller 4 includes an analog stick 52 as a direction input section. In the exemplary embodiment, the analog stick 52 has the same configuration as that of the analog stick 32 of the left controller 3. Similarly to the left controller 3, the right controller 4 includes four operation buttons 53 through 56 (specifically, an A-button 53, a B-button 54, an X-button 55, and a Y-button 56). In the exemplary embodiment, the four operation buttons 53 through 56 have the same mechanism as that of the four operation buttons 33 through 36 of the left controller 3. As shown in FIG. 5, the analog stick 52 and the operation buttons 53 through 56 are provided on the main surface of the housing 51. In the exemplary embodiment, the four operation buttons are provided on the main surface of the right controller 4. The number of operation buttons is optional.

Now, in the exemplary embodiment, the positional relationship between the two types of operation sections (the analog stick and the operation buttons) of the right controller 4 is opposite to the positional relationship between the corresponding two types of operation sections of the left controller 3. That is, in the right controller 4, the analog stick 52 is located below the operation buttons 53 through 56, whereas in the left controller 3, the analog stick 32 is located above the operation buttons 33 through 36. With such a positional arrangement, the left controller 3 and the right controller 4 are usable with similar operation feelings to each other when being detached from the main body apparatus 2.

The right controller 4 includes a "+" (plus) button 57. As shown in FIG. 5, the "+" button 57 is provided on the main surface of the housing 51, more specifically, is provided on an upper left area of the main surface. Similarly to the other operation buttons 53 through 56, the "+" button 57 is used to give instructions corresponding to various programs executable by the main body apparatus 2 (e.g., an OS program and an application program). The "+" button 57 is used as, for example, a start button in a game application (e.g., as a button used to give an instruction to start a game).

The right controller 4 includes a home button 58. As shown in FIG. 5, the home button 58 is provided on the main surface of the housing 51, more specifically, is provided on a lower left area of the main surface. The home button 58 is used to display a predetermined menu screen on the display 12 of the main body apparatus 2. The menu screen, for example, allows an application, specified by the user from one or more applications executable by the main body apparatus 2, to be started. The menu screen may be displayed, for example, when the main body apparatus 2 is started. In the exemplary embodiment, when the home button 58 is pressed in the state where an application is being executed by the main body apparatus 2 (i.e., in the state where an image of the application is displayed on the display 12), a predetermined operation screen may be displayed on the display 12 (at this point, the menu screen may be displayed instead of the operation screen). The operation screen, for example, allows an instruction to finish the application and display the menu screen on the display 12, an instruction to resume the application, or the like, to be given.

In the case where the right controller 4 is attached to the main body apparatus 2, the operation sections (specifically, the analog stick 52 and the buttons 53 through 58) provided on the main surface of the right controller 4 are operated with, for example, the thumb of the right hand of the user holding the integrated apparatus. In the case where the right controller 4 is used while being detached from the main body apparatus 2 and held in a horizontal orientation with both of two hands of the user, the above-described operation sections are operated with, for example, the thumbs of the left and right hands of the user holding the right controller 4. Specifically, in this case, the analog stick 52 is operated with the thumb of the left hand of the user, and the operation buttons 53 through 56 are operated with the thumb of the right hand of the user.

The right controller 4 includes a first R-button 60. The right controller 4 includes a ZR-button 61. As shown in FIG. 5, the first R-button 60 is provided on an upper right portion of the side surface of the housing 51. The ZR-button 61 is provided on an upper right portion from the side surface to a rear surface of the housing 51 (more precisely, an upper right portion when the housing 51 is viewed from the front side thereof). That is, the ZR-button 61 is provided to the rear of the first R-button 60 (on the positive side in the z-axis direction shown in FIG. 1). In the exemplary embodiment, the upper right portion of the housing 51 has a rounded shape. Therefore, the first R-button 60 and the ZR-button 61 each have a rounded shapes corresponding to the roundness of the upper right portion of the housing 51. In the case where the right controller 4 is attached to the main body apparatus 2, the first R-button 60 and the ZR-button 61 are located on an upper right portion of the integrated apparatus.

The left controller 3 includes a slider mechanism similar to that of the left controller 3. That is, the right controller 4 includes the slider 62 described above. As shown in FIG. 5, the slider 62 extends in the up-down direction on the left side surface of the housing 51. The slider 62 is so shaped as to be engageable with the right rail member 19 of the main body apparatus 2 (more specifically, with the groove in the right rail member 19). Thus, the slider 62, when being engaged with the right rail member 19, is secured so as not to be detached in a direction perpendicular to the slide direction (the slide direction is, in other words, the direction in which the right rail member 19 extends).

The right controller 4 includes the terminal 64 usable by the right controller 4 to communicate with the main body apparatus 2 in a wired manner. The terminal 64 is provided at a position where, in the case where the right controller 4 is attached to the main body apparatus 2, the terminal 64 comes into contact with the right terminal 21 (FIG. 3) of the main body apparatus 2. The specific position of the terminal 64 is optional. In the exemplary embodiment, as shown in FIG. 5, the terminal 64 is provided at a position where the terminal 64 is not exposed outside by an attachment surface to which the slider 62 is attached. In the exemplary embodiment, the terminal 64 is provided near a lower end on the attachment surface of the slider 62.

Like the left controller 3, the right controller 4 includes a second L button 65 and a second R button 66. The buttons 65 and 66 are used to give instructions corresponding to various programs executable by the main body apparatus 2, like the other operation buttons 53 through 56. As shown in FIG. 5, the second L-button 65 and the second R button 66 are provided on the attachment surface to which the slider 62 is attached. The second L button 65 is provided on the attachment surface, more specifically, at a position lower to the center in the up-down direction (y-axis direction shown in FIG. 1). The second R button 66 is provided on the attachment surface, more specifically, at a position upper to the center in the up-down direction. The second L button 65 and the second R button 66 are located at positions where the second L button 65 and the second R button 66 are not pressed in a state where the right controller 4 is attached to the main body apparatus 2, like the second L button 43 and the second R button 44 of the left controller 3. Namely, the second L button 65 and the second R button 66 are usable in a state where the right controller 4 is detached from the main body apparatus 2. The second L button 65 and the second R 66 are operable by, for example, the index finger or the middle finger of either the left hand or the right hand of the user holding the right controller 4 detached from the main body apparatus 2.

The right controller 4 includes a paring button 69. Like the pairing button 46 of the left controller 3, the pairing button 69 is used to give an instruction to perform a setting process on the wireless communication between the right controller 4 and the main body apparatus 2 (such a setting process is also referred to as "pairing"), and also to give an instruction to perform a reset process on the right controller 4. The setting process and the reset process are substantially the same as those executable by the left controller 3, and will not be described in detail. In the exemplary embodiment, as shown in FIG. 5, the pairing button 69 is provided on the attachment surface to which the slider 62 is attached. As can be seen, the pairing button 69 is located at a position where the pairing button 69 is not viewed in a state where the right controller 4 is attached to the main body apparatus 2, for the same reason as described above regarding the left controller 3.

In the right controller 4, like in the left controller 3, the buttons provided on the attachment surface to which the slider 62 is attached (specifically, the second L button 65, the second R button 66, and the pairing button 69) are provided so as not to protrude from the attachment surface. With such a structure, in a state where the slider 62 is attached to the right rail member 19 of the main body apparatus 2, the slider 62 is smoothly slidable with respect to the right rail member 19.

A window 68 is provided in a bottom surface of the housing 51. As described below in detail, the right controller 4 includes an infrared image capturing section 123 and an infrared light emitting section 124 located in the housing 31. The infrared image capturing section 123 captures an image of a region around the right controller 4 via the window 68, with a downward direction with respect to the right controller 4 (negative y-axis direction shown in FIG. 5) being an image capturing direction. The infrared light emitting section 124 irradiates an image capturing target member that is to be captured by the infrared image capturing section 123 and is in a predetermined irradiation range centered around the downward direction with respect to the right controller 4 (negative y-axis direction shown in FIG. 5), with infrared light via the window 68. In the example shown in FIG. 5, a plurality of the infrared light emitting sections 124 having different irradiation directions are provided in order to expand the irradiation range to be irradiated by the infrared light emitting section 124. The window 68 is provided to protect the lens of a camera of the infrared image capturing section 123, a light emitting body of the infrared light emitting section 124, and the like, and is formed of a material transmitting light of a wavelength detected by the camera or light emitted by the light emitting body (e.g., formed of a transparent material). The window 68 may be a hole formed in the housing 51. In the exemplary embodiment, the infrared image capturing section 123 itself includes a filter member suppressing transmission of light of a wavelength other than the wavelength of the light detected by the camera (in the exemplary embodiment, infrared light). In another embodiment, the window 68 may have a function of a filter.

As described below in detail, the right controller 4 includes an NFC communication section 122. The NFC communication section 122 performs near field communication based on the NFC (Near Field Communication) protocols. The NFC communication section 122 includes an antenna 122a usable for the near field communication and a circuit generating a signal (radio wave) to be transmitted from the antenna 122a (the circuit is, for example, an NFC chip). In the case where, for example, another wireless communication device (e.g., NFC tag) that becomes a target of the near field communication is located in another device close to, or in contact with, an area below the main surface of the housing 51, the antenna 122a is located in the housing 51, more specifically, at a position where the antenna 122a is capable of performing near field communication with the wireless communication device. The near field communication is not limited to being based on the NFC protocols, and may any type of near field communication (contactless communication). The near field communication encompasses, for example, a communication system by which a radio wave from one device generates an electromotive force in another device (the electromotive force is generated by, for example, electromagnetic induction).

Regarding the left controller 3 and the right controller 4, the shapes, the numbers, and the installation positions of the above-described components provided in the housings 31 and 51 (specifically, the sliders, the sticks, the buttons, and the like) are optional. For example, in another exemplary embodiment, the left controller 3 and the right controller 4 may each include a direction input section of a type different from that of the analog stick. The slider 40 or 62 may be located at a position corresponding to the position of the rail member 15 or 19 provided in the main body apparatus 2, for example, on the main surface or the rear surface of the housing 31 or 51. In still another exemplary embodiment, the left controller 3 and the right controller 4 may not include at least one of the above-described components.

Figure 6:
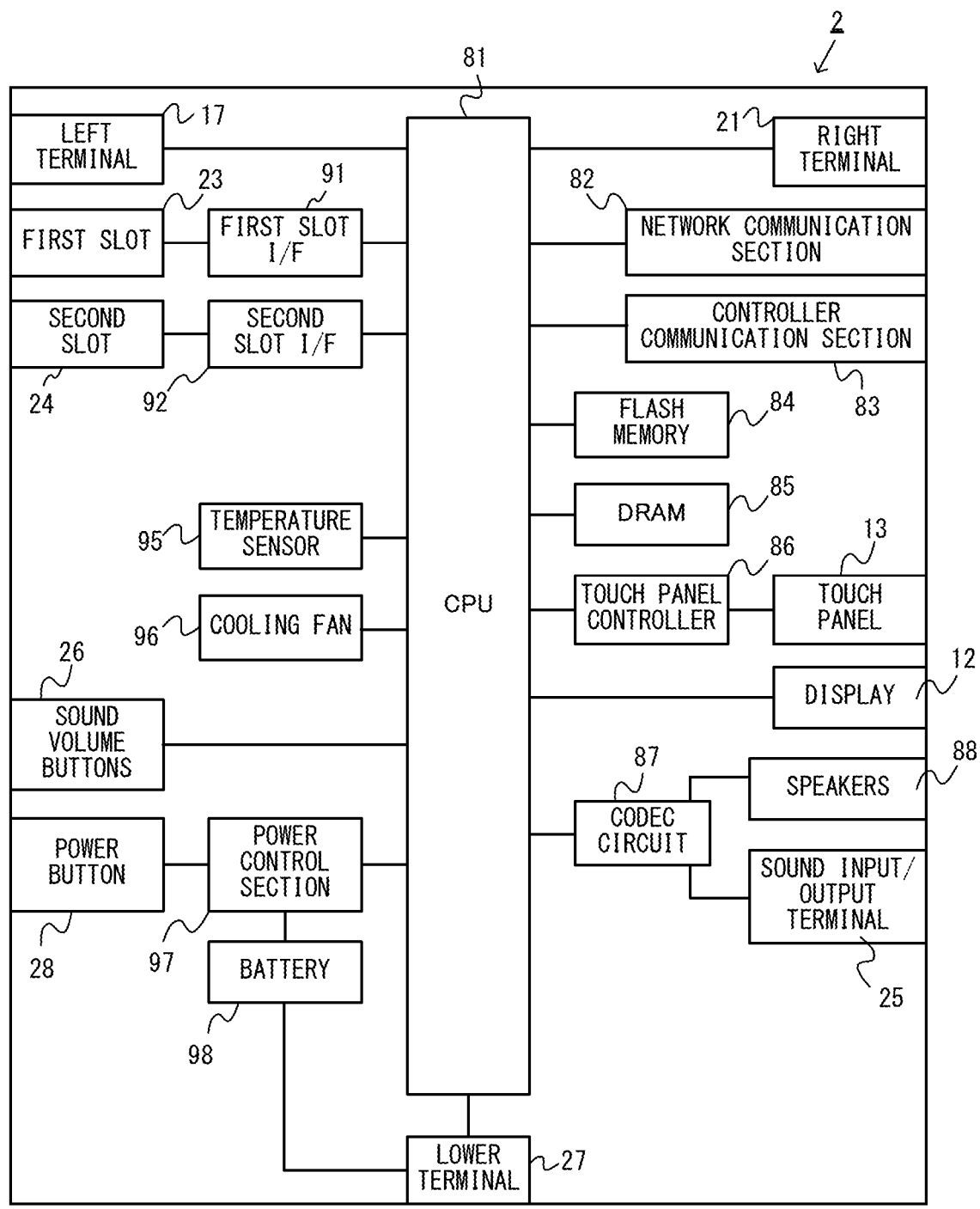
FIG. 6 is a block diagram showing a non-limiting example of internal structure of the main body apparatus 2.

FIG. 6 is a block diagram showing an example of internal configuration of the main body apparatus 2. The main body apparatus 2 includes components 81 through 98 shown in FIG. 6 in addition to the components shown in FIG. 3. At least one of the components 81 through 98 may be mounted as an electronic component on an electronic circuit board and accommodated in the housing 11.

The main body apparatus 2 includes a CPU (Central Processing Unit) 81. The CPU 81 is an information processing section that executes various types of information process executable by the main body apparatus 2. The CPU 81 executes an information processing program (e.g., game program) stored on a storage section (specifically, an internal storage medium such as a flash memory 84 or the like, an external storage medium attached to each of the slots 23 and 24, or the like) to execute various types of information process.

The main body apparatus 2 includes the flash memory 84 and the DRAM (Dynamic Random Access Memory) 85 as examples of internal storage medium built in the main body apparatus 2. The flash memory 84 and the DRAM 85 are connected with the CPU 81. The flash memory 84 is mainly usable to store various pieces of data (or programs) to be saved on the main body apparatus 2. The DRAM 85 is usable to temporarily store various pieces of data used for the information process.

The main body apparatus 2 includes a first slot interface (hereinafter, the "interface" will be abbreviated as "I/F") 91. The main body apparatus 2 includes a second slot I/F 92. The first slot I/F 91 and the second slot I/F 92 are connected with the CPU 81. The first slot I/F 91 is connected with the first slot 23, and follows an instruction from the CPU 81 to read and write data from and to the first type storage medium (e.g., SD card) attached to the first slot 23. The second slot I/F 92 is connected with the second slot 24, and follows an instruction from the CPU 81 to read and write data from and to the second type storage medium (e.g., dedicated memory card) attached to the second slot 24.

The CPU 81 appropriately transfers data between the flash memory 84/the DRAM 85 and the above-described storage mediums to execute the above-described information process.

The main body apparatus 2 includes a network communication section 82. The network communication section 82 is connected with the CPU 81. The network communication section 82 communicates (specifically, via wireless communication) with an external apparatus via a network. In the exemplary embodiment, in a first communication form, the network communication section 82 is connected with a wireless LAN by a system compliant with the Wi-Fi standards to communicate with an external apparatus. In a second communication form, the network communication section 82 wirelessly communicates with another main body apparatus 2 of the same type by a predetermined communication system (e.g., communication based on an original protocol or infrared light communication). The wireless communication in the second communication form may be performed with another main body apparatus 2 located in a closed local network area and thus realizes a so-called "local communication", in which a plurality of the main body apparatuses 2 are communicated directly to each other to transmit and receive data.

The main body apparatus 2 includes a controller communication section 83. The controller communication section 83 is connected with the CPU 81. The controller communication section 83 wirelessly communicates with the left controller 3 and/or the right controller 4. The communication system between the main body apparatus 2 and the left controller 3 or the right controller 4 is optional. In the exemplary embodiment, the controller communication section 83 performs communication compliant with the Bluetooth (registered trademark) standards with the left controller 3 and with the right controller 4.

The CPU 81 is connected with the left terminal 17, the right terminal 21, and the lower terminal 27. When communicating with the left controller 3 in a wired manner, the CPU 81 transmits data to the left controller 3 via the left terminal 17 and also receives operation data from the left controller 3 via the left terminal 17. When communicating with the right controller 4 in a wired manner, the CPU 81 transmits data to the right controller 4 via the right terminal 21 and also receives operation data from the right controller 4 via the right terminal 21. When communicating with the cradle, the CPU 81 transmits data to the cradle via the lower terminal 27. As described above, in the exemplary embodiment, the main body apparatus 2 can perform both wired communication and wireless communication with each of the left controller 3 and the right controller 4. In the case where the integrated apparatus including the main body apparatus 2 and the left and right controllers 3 and 4 attached thereto, or a single body of the main body apparatus 2, is attached to the cradle, the main body apparatus 2 outputs data (e.g., image data or sound data) to the stationary monitor or the like by the cradle.

The main body apparatus 2 can communicate with a plurality of the left controllers 3 simultaneously (in other words, in parallel). The main body apparatus 2 can communicate with a plurality of the right controllers 4 simultaneously (in other words, in parallel). Thus, the user can input data to the main body apparatus 2 using the plurality of left controllers 3 and the plurality of right controllers 4.

The main body apparatus 2 includes a touch panel controller 86, which is a circuit that controls the touch panel 13. The touch panel controller 86 is connected between the touch panel 13 and the CPU 81. Based on a signal from the touch panel 13, the touch panel controller 86 generates data indicating, for example, the position where a touch input has been provided. Then, the touch panel controller 86 outputs the data to the CPU 81.

The display 12 is connected with the CPU 81. The CPU 81 displays, on the display 12, an generated image (e.g., image generated by executing the above-described information process) and/or an externally acquired image.

The main body apparatus 2 includes a codec circuit 87 and the speakers (specifically, a left speaker and a right speaker) 88. The codec circuit 87 is connected with the speakers 88 and the sound input/output terminal 25 and also connected with the CPU 81. The codec circuit 87 controls the input and output of sound data to and from the speakers 88 and the sound input/output terminal 25. Specifically, when receiving sound data from the CPU 81, the codec circuit 87 performs D/A conversion on the sound data and outputs a resultant sound signal to the speakers 88 or the sound input/output terminal 25. As a result, a sound is output from the speakers 88 or a sound output section (e.g., earphone) connected with the sound input/output terminal 25. When receiving a sound signal from the sound input/output terminal 25, the codec circuit 87 performs A/D conversion on the sound signal and outputs resultant sound data in a predetermined format to the CPU 81. The sound volume buttons 26 are connected with the CPU 81. Based on an input to the sound volume buttons 26, the CPU 81 controls the volume of the sound to be output from the speakers 88 or the sound output section.

The main body apparatus 2 includes a power control section 97 and a battery 98. The power control section 97 is connected with the battery 98 and the CPU 81. Although not shown in FIG. 8, the power control section 97 is connected with various components of the main body apparatus 2 (specifically, components that receive power supplied from the battery 98, the left terminal 17, and the right terminal 21). Based on a command from the CPU 81, the power control section 97 controls the supply of power from the battery 98 to the above-mentioned components. The power control section 97 is connected with the power button 28. Based on an input to the power button 28, the power control section 97 controls the supply of power to the above-mentioned components. Specifically, in the case where an operation of turning off the power supply is performed on the power button 28, the power control section 97 stops the supply of power to all or a part of the above-mentioned components. In the case where an operation of turning on the power supply is performed on the power button 28, the power control section 97 starts the supply of power to all or a part of the above-mentioned components. The power control section 97 outputs, to the CPU 81, information indicating an input to the power button 28 (specifically, information indicating whether or not the power button 28 has been pressed).

The battery 98 is connected with the lower terminal 27. In the case where an external charging apparatus (e.g., cradle) is connected with the lower terminal 27 and power is supplied to the main body apparatus 2 via the lower terminal 27, the battery 98 is charged with the supplied power.

The main body apparatus 2 includes a cooling fan 96 usable to release heat inside the main body apparatus 2. The cooling fan 96 is operated to introduce air outside the housing 11 through the absorption holes 11d and also to release air inside the housing 11 through the exhaust hole 11c, so that heat inside the housing 11 is released. The cooling fan 96 is connected with the CPU 81, and the operation of the cooling fan 96 is controlled by the CPU 81. The main body apparatus 2 includes a temperature sensor 95, which detects the temperature inside the main body apparatus 2. The temperature sensor 95 is connected with the CPU 81, and a detection result provided by the temperature sensor 95 is output to the CPU 81. Based on the detection result provided by the temperature sensor 95, the CPU 81 controls the operation of the cooling fan 96.

Figure 7:
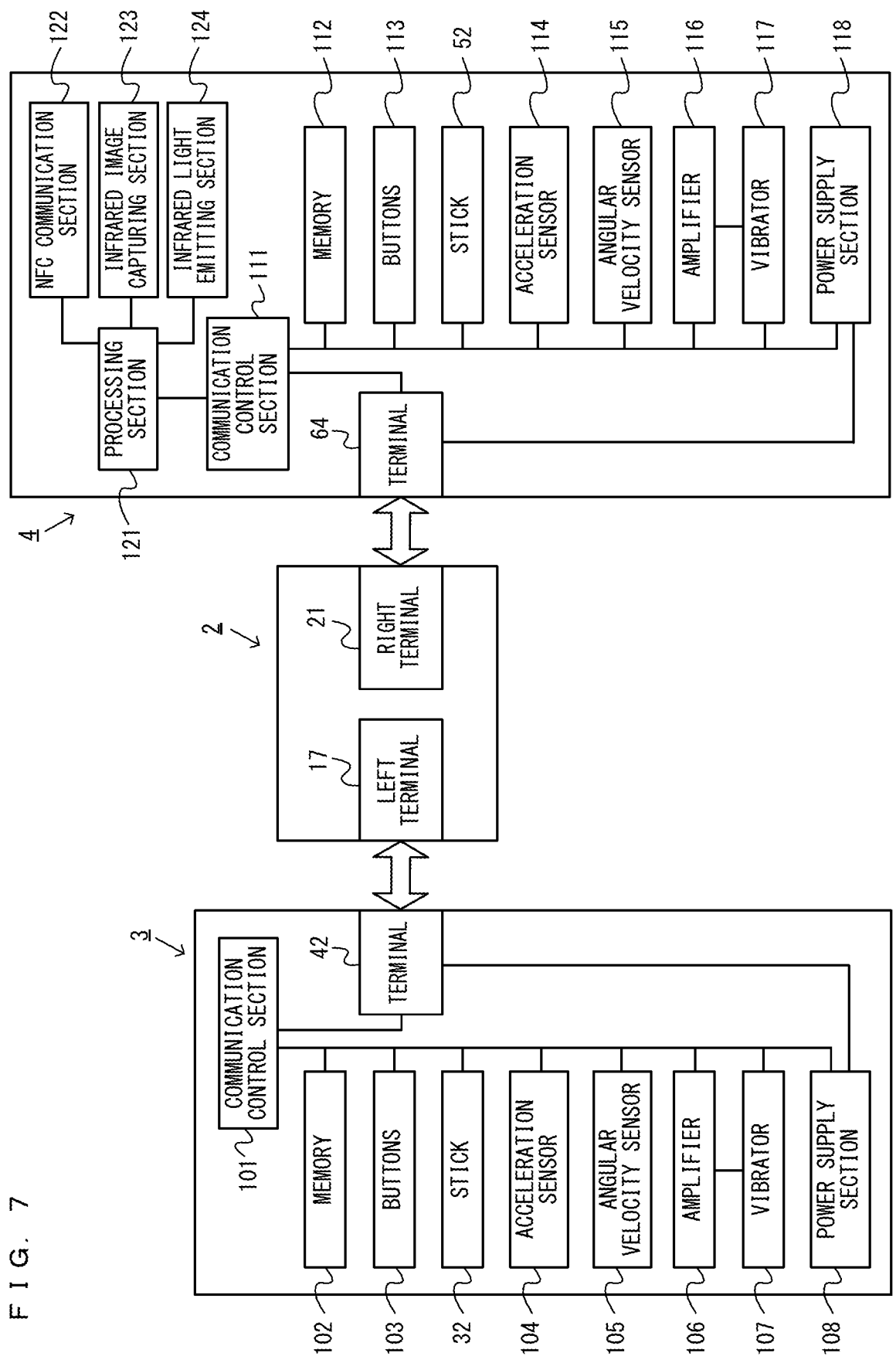
FIG. 7 is a block diagram showing a non-limiting example of internal structure of the main body apparatus 2, the left controller 3 and the right controller 4.

FIG. 7 is a block diagram showing an example of internal configuration of the main body apparatus 2, the left controller 3 and the right controller 4. The components of the main body apparatus 2 are shown in detail in FIG. 6 and thus are omitted in FIG. 7.

The left controller 3 includes a communication control section 101, which communicates with the main body apparatus 2. As shown in FIG. 7, the communication control section 101 is connected with components including the terminal 42. In the exemplary embodiment, the communication control section 101 can communicate with the main body apparatus 2 by wired communication via the terminal 42 and also by wireless communication with no use of the terminal 42. The communication control section 101 controls a method of communication performed by the left controller 3 with the main body apparatus 2. In the case where the left controller 3 is attached to the main body apparatus 2, the communication control section 101 communicates with the main body apparatus 2 via the terminal 42. In the case where the left controller 3 is detached from the main body apparatus 2, the communication control section 101 wirelessly communicates with the main body apparatus 2 (specifically, the controller communication section 83). The wireless communication between the controller communication section 83 and the communication control section 101 is performed in conformity to, for example, the Bluetooth (registered trademark) standards.

The left controller 3 includes a memory 102 such as, for example, a flash memory or the like. The communication control section 101 includes, for example, a microcomputer (or a microprocessor) and executes firmware stored on the memory 102 to perform various types of process.

The left controller 3 includes buttons 103 (specifically, the buttons 33 through 39, 43, 44 and 46). The left controller 3 includes the analog stick ("stick" in FIG. 7) 32. The buttons 103 and the analog stick 32 each output information regarding an operation performed thereon to the communication control section 101 repeatedly at appropriate timing.

The left controller 3 includes an acceleration sensor 104. In the exemplary embodiment, the acceleration sensor 104 detects magnitudes of linear accelerations in predetermined three axis directions (e.g., x-, y- and z-axis directions shown in FIG. 4). The acceleration sensor 104 may detect an acceleration in one axis direction or accelerations in two axis directions. The left controller 3 includes an angular velocity sensor 105. In the exemplary embodiment, the angular velocity sensor 105 detects angular velocities about predetermined three axes (e.g., x-, y- and z-axes shown in FIG. 4). The angular velocity sensor 105 may detect an angular velocity about one axis or angular velocities about two axes. The acceleration sensor 104 and the angular velocity sensor 105 are connected with the communication control section 101. Detection results provided by the acceleration sensor 104 and the angular velocity sensor 105 are each output to the communication control section 101 repeatedly at appropriate timing.

The communication control section 101 acquires information regarding an input (specifically, information regarding an operation or a detection result provided by any of the sensors) from each of the input sections (specifically, the buttons 103, the analog stick 32, and the sensors 104 and 105). The communication control section 101 transmits, to the main body apparatus 2, operation data including the acquired information (or information obtained by performing a predetermined process on the acquired information). The operation data is transmitted repeatedly at a rate of once every predetermined time period. The interval at which information regarding an input is transmitted to the main body apparatus 2 may or may not be the same among the input sections.

The above-mentioned operation data is transmitted to the main body apparatus 2, so that the main body apparatus 2 obtains the inputs provided to the left controller 3. That is, the main body apparatus 2 distinguishes operations made on the buttons 103 and the analog stick 32 from each other, based on the operation data. The main body apparatus 2 computes information regarding the motion and/or the attitude of the left controller 3 based on the operation data (specifically, the detection results provided by the acceleration sensor 104 and the angular velocity sensor 105).

The left controller 3 includes a vibrator 107 usable to give notification to the user by a vibration. In the exemplary embodiment, the vibrator 107 is controlled by a command from the main body apparatus 2. Specifically, upon receipt of the above-mentioned command from the main body apparatus 2, the communication control section 101 drives the vibrator 107 in accordance with the command. The left controller 3 includes an amplifier 106. Upon receipt of the above-mentioned command, the communication control section 101 outputs a control signal corresponding to the command to the amplifier 106. The amplifier 106 amplifies the control signal from the communication control section 101, generates a driving signal for driving the vibrator 107, and outputs the driving signal to the vibrator 107. As a result, the vibrator 107 is operated.

The left controller 3 includes a power supply section 108. In the exemplary embodiment, the power supply section 108 includes a battery and a power control circuit. Although not shown in FIG. 9, the power control circuit is connected with the battery and also connected with components of the left controller 3 (specifically, components that receive power supplied from the battery). The power control circuit controls the supply of power from the battery to the above-mentioned components. The battery is connected with the terminal 42. In the exemplary embodiment, in the case where the left controller 3 is attached to the main body apparatus 2, the battery is charged via the terminal 42 with power supplied from the main body apparatus 2 under a predetermined condition.

As shown in FIG. 7, the right controller 4 includes a communication control section 111, which communicates with the main body apparatus 2. The right controller 4 includes a memory 112, which is connected with the communication control section 111. The communication control section 111 is connected with components including the terminal 64. The communication control section 111 and the memory 112 have functions similar to those of the communication control section 101 and the memory 102, respectively, of the left controller 3. Thus, the communication control section 111 can communicate with the main body apparatus 2 by wired communication via the terminal 64 and also by wireless communication with no use of the terminal 64 (specifically, communication compliant with the Bluetooth (registered trademark) standards). The communication control section 111 controls a method of communication performed by the right controller 4 with the main body apparatus 2.

The right controller 4 includes input sections similar to the input sections of the left controller 3 (specifically, buttons 113, the analog stick 52, an acceleration sensor 114, and an angular velocity sensor 115). These input sections have functions similar to those of the input sections of the left controller 3 and operate similarly to the input sections of the left controller 3.

The right controller 4 includes a vibrator 117 and an amplifier 116. The vibrator 117 and the amplifier 116 operate similarly to the vibrator 107 and the amplifier 106, respectively, of the left controller 3. Specifically, the communication control section 111, in accordance with a command from the main body apparatus 2, uses the amplifier 116 to cause the vibrator 117 to operate.

The right controller 4 includes a power supply section 118. The power supply section 118 has a function similar to that of the power supply section 108 of the left controller 3, and operates similarly to the power supply section 108. That is, the power supply section 118 controls the supply of power to components that receive power supplied from a battery. In the case where the right controller 4 is attached to the main body apparatus 2, the battery is charged via the terminal 64 with power supplied from the main body apparatus 2 under a predetermined condition.

The right controller 4 includes the NFC communication section 122 performing near field communication based on the NFC protocols. The NFC communication section 122 has a so-called NFC reader/writer function. In this specification, the term "near field communication" encompasses a communication system by which a radio wave from one device (herein, the right controller 4) generates an electromotive force in another device (herein, device close to the antenna 122a) (the electromotive force is generated by, for example, electromagnetic induction). The another device is capable of operating by the electromotive force, and may or may not include a power source. In the case where the right controller 4 (antenna 122a) and a communication target become close to each other (typically, in the case where the distance between the right controller 4 (antenna 122a) and the communication target becomes several ten centimeter or shorter), the NFC communication section 122 becomes communicable with the communication target. The communication target is any device capable of performing near field communication with the NFC communication section 122, and is, for example, an NFC tag or a storage medium having a function of an NFC tag. It should be noted that the communication target may be another device having an NFC card emulation function. For example, in the exemplary embodiment, the NFC communication section 122 may perform wireless communication with the communication target attached to the case 200 (e.g., NFC tag) to acquire type information, identification information or the like on the case 200.

The right controller 4 includes the infrared image capturing section 123. The infrared image capturing section 123 includes an infrared camera capturing an image of a region around the right controller 4. In the exemplary embodiment, the infrared image capturing section 123 is used to capture an image of an image capturing target member located in the expanded operation device (e.g., case 200). The main body apparatus 2 and/or the right controller 4 calculates information on the captured image capturing target member (e.g., average luminance, area size, center-of-gravity coordinate, etc. of the image capturing target member), and distinguishes the content of operation made on the expanded operation device based on the information. The infrared image capturing section 123 may capture an image with environmental light, but in the exemplary embodiment, includes the infrared light emitting section 124 emitting infrared light. The infrared light emitting section 124 directs infrared light in synchronization with, for example, the timing when the infrared camera captures an image. The infrared light emitted by the infrared light emitting section 124 is reflected by the image capturing target member, and the reflected infrared light is received by the infrared camera. Thus, an infrared image is acquired. In this manner, a clearer infrared image is acquired. The infrared image capturing section 123 and the infrared light emitting section 124 may provided in the right controller 4 as separate components, or may be provided in the right controller 4 as a single device in one package. In the exemplary embodiment, the image capturing section 123 includes the infrared camera. In another embodiment, a visible light camera (camera including a visible light image sensor) may be used as an image capturing element instead of the infrared camera.

The right controller 4 includes a processing section 121. The processing section 121 is connected with the communication control section 111 and is also connected with the NFC communication section 122. The processing section 121, in accordance with a command from the main body apparatus 2, performs a process of managing the NFC communication section 122. For example, the processing section 121 controls an operation of the NFC communication section 122 in accordance with a command from the main body apparatus 2. The processing section 121 controls the start of the NFC communication section 122 or controls an operation of the NFC communication section 122 (specifically, reading, writing, or the like) made on a communication target thereof (e.g., NFC tag). The processing section 121 receives, from the main body apparatus 2 via the communication control section 111, information to be transmitted to the communication target and passes the information to the NFC communication section 122. The processing section 121 also acquires, via the NFC communication section 122, information received from the communication target and transmits the information to the main body apparatus 2 via the communication control section 111.

The processing section 121 includes a CPU, a memory and the like, and executes a management process on the infrared image capturing section 123 in response to an instruction from the main body apparatus 2, based on a predetermined program (e.g., application program for executing an image process or various computations) stored on a storage device (not shown; e.g., nonvolatile memory, hard disc, etc.) included in the right controller 4. For example, the processing section 121 causes the infrared image capturing section 123 to perform an image capturing operation, or acquires and/or calculates information based on the image capturing result (information on the captured image, information calculated from the information, etc.) and transmits the information based on the image capturing result to the main body apparatus 2 via the communication control section 111. The processing section 121 also executes a management process on the infrared light emitting section 124 in response to an instruction from the main body apparatus 2. For example, the processing section 121 controls the light emission of the infrared light emitting section 124 in response to an instruction from the main body apparatus 2. The memory used by the processing section 121 for performing processes may be provided in the processing section 121 or may be the memory 112.

Figure 8:
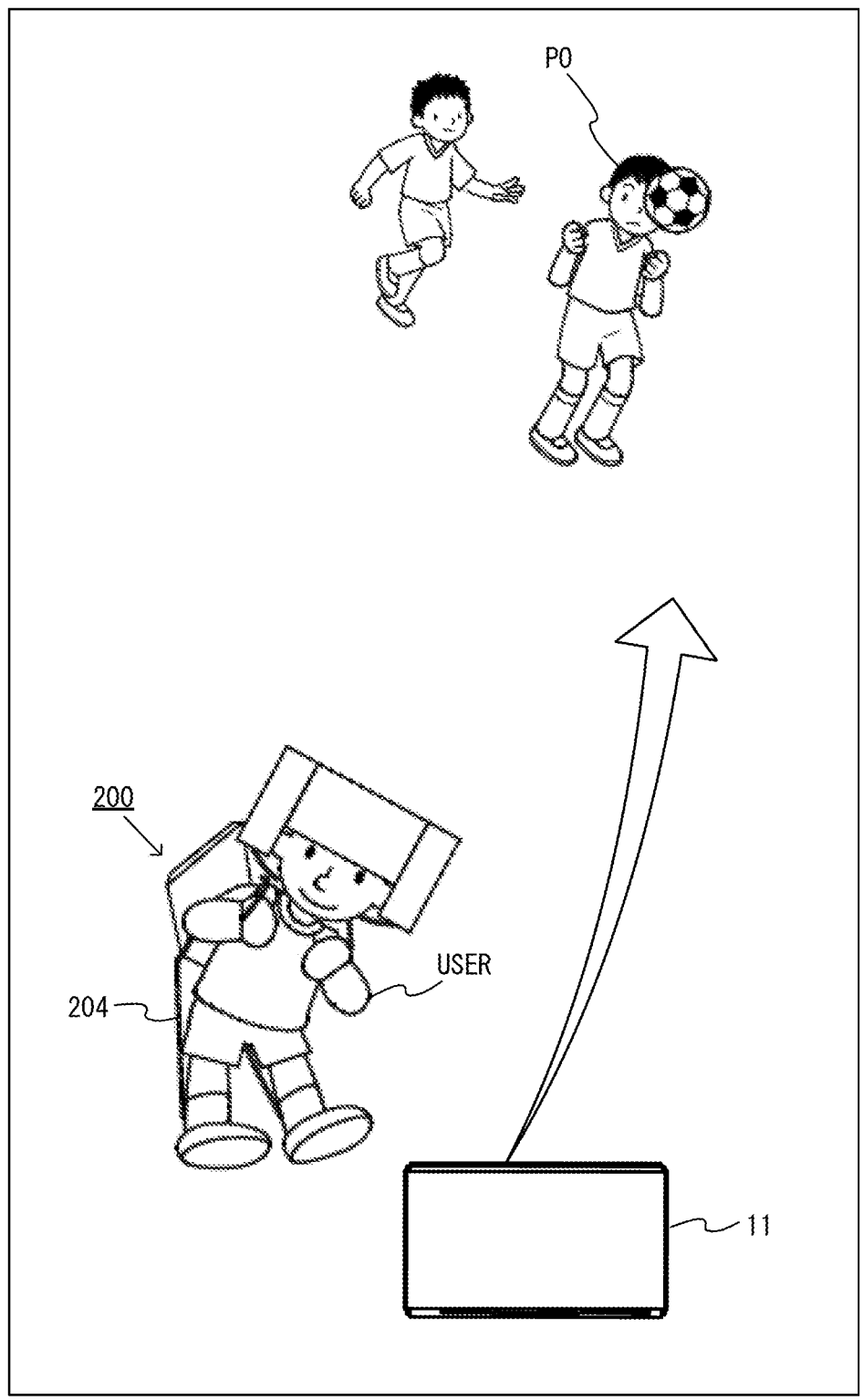
FIG. 8 shows a non-limiting example of state where a user makes game operation while a case 200 is attached to the user.

Now, with reference to FIG. 8, an operation made by use of the case 200, which is an example of expanded operation device, will be described. FIG. 8 shows an example of state where a user has the case 200 attached to his/her body to make a game operation. In the exemplary embodiment, the right controller 4 is attachable to the case 200. Based on data transmitted from the right controller 4 attached to the case 200, a process in accordance with the content of operation made on the case 200 is executed. As described below in detail, the content of operation made on the case 200 is detected based on a captured image that is captured by the infrared image capturing section 123. Therefore, the case 200 does not need to include an electric component such as an electric circuit or the like that detects the content of operation made by the user or transmits the result of the detection to the main body apparatus 2. For this reason, in the exemplary embodiment, the structure of the case 200, which is an example of expanded operation device is simplified.

For example, in the exemplary embodiment, as shown in FIG. 8, the user carries the case 200 on his/her back and pulls or loosens a plurality of string members 204 included in the case 200 to make an operation by use of the case 200. For example, the user attaches ends of the string members 204 to both of the legs, both of the arms, and the head (right side and left side of the head). In this state, when the user moves his/her left leg, the string member 204 attached to the left leg is pulled or loosened. When the user moves his/her right leg, the string member 204 attached to the right leg is pulled or loosened. When the user moves his/her left arm, the string member 204 attached to the left arm is pulled or loosened. When the user moves his/her right arm, the string member 204 attached to the right arm is pulled or loosened. When the user moves his/her head forward, rearward, leftward or rightward, the string members 204 attached to the left side and the right side of the head are pulled or loosened. In the example shown in FIG. 8, the user carries a head member on his/her head, and ends of different string members 204 are connected to a lower left portion and a lower right portion of the head member. With this arrangement, when the user moves his/her head leftward or rightward, one of the two string members 204 is pulled while the other of the string members 204 is loosened. In this manner, different string members 204 are pulled or loosened in accordance with the manner in which the user moves his/her arms, legs or head.

The head member shown in FIG. 8 may be assembled by folding a cardboard member, like the case 200 described below. In this case, the head member may be made commercially available as a set with the case 200, so that the head member may be assembled by the user. For example, the head member in an assembled state may be a helmet or a hat wearable by the user. Such a member that is connected with the ends of the string members 204 and is attachable to the user is not limited to being put on the head, and may be provided as a member to be held by the hand, a member to be wound around the arm, a member to be worn by the foot, or a member to be wound around the leg.

In accordance with the operation made by use of the case 200, a player object PO located in a virtual space makes a motion, and an image of the virtual space reflecting the motion of the player object PO is displayed on a display device (e.g., display 12 of the main body apparatus 2). When, for example, the user makes a motion such that his/her left arm to which the string member 204 is attached is extended from a folded state, the string member 204 attached to the left arm is pulled. This operation of pulling the string member 204 causes the string member 204 to make a motion of being pulled out from a case main body 201 of the case 200 (see FIG. 9). Such a motion of the string member 204 is detected in the case 200, so that it is estimated that the user carrying the case 200 made a motion of extending his/her left arm. The player object PO also makes a motion of extending the left arm in the virtual space. Namely, when the user makes a motion of a part of his/her body to which the string member 204 is attached, a part of the player object PO corresponding to the part of the user's body (e.g., part of the player object PO that is the same as the part of the user's body moved by the user) makes a motion. Instead of the player object PO located in the virtual space making a motion in accordance with the operation made by use of the case 200, the player object PO may be changed in a different manner in the virtual space. For example, when a predetermined operation is made by use of the case 200, the manner of display of the player object PO may be changed (e.g., the color of the player object PO may be changed, the player object PO may be changed into another object, the size of the player object PO may be changed, the capability of the player object PO may be changed, etc.).

The right controller 4 attached to the case 200 includes an inertia sensor (acceleration sensor 114 and angular velocity sensor 115). The result of the detection of the inertia sensor may be used to calculate the attitude and/or the motion of the right controller 4 (i.e., attitude and/or the motion of the case 200). In the exemplary embodiment, the motion of the player object PO is controllable in accordance with the attitude and/or the motion of the case 200. When, for example, the user carrying the case 200 makes a motion of having the entirety of his/her body fall rightward, the case 200 also makes a motion of falling rightward. Such a motion of the case 200 is detected by the inertia sensor of the right controller 4, so that it is estimated that the user carrying the case 200 made a motion of falling rightward. When it is estimated that the user made a motion of falling rightward, the player object PO also makes a motion of falling rightward in the virtual space. When the user carrying the case 200 jumps, the case 200 also moves up and down. Such a motion of the case 200 is detected by the inertia sensor of the right controller 4, so that it is estimated that the user carrying the case 200 jumped. When it is estimated that the user jumped, the player object PO also jumps or flies in the virtual space. Namely, when the user moves the entirety of the case 200, the entirety of the player object PO makes a motion in accordance with the motion or the attitude of the case 200.

As described above, the player object PO making a motion in accordance with the operation made by use of the case 200 is displayed on the display device (e.g., display 12 of the main body apparatus 2). Therefore, the user making an operation while carrying the case 200 on his/her back enjoys the game by viewing the display device displaying the player object PO. A point of view at which the player object PO is displayed on the display device may be set at any position in the virtual space. In a first example, a virtual space image in which the player object PO is seen from behind the player object PO may be displayed on the display device. In a second example, a virtual space image as seen from the first person's point of view of the player object PO may be displayed on the display device. In a third example, a virtual space image in which the player object PO is seen from the front of the player object PO may be displayed on the display device. It is considered to be difficult for the user to grasp the motion of the player object PO with respect to the motion of the user himself/herself depending on the point of view or the direction of line of sight set in the virtual space. Nevertheless, the part or the moving direction of the player object PO making a motion in correspondence with the operation made by use of the case 200 may be set in accordance with the point of view or the moving direction, so that a game play presenting a realistic sensation is provided.

Figure 9:
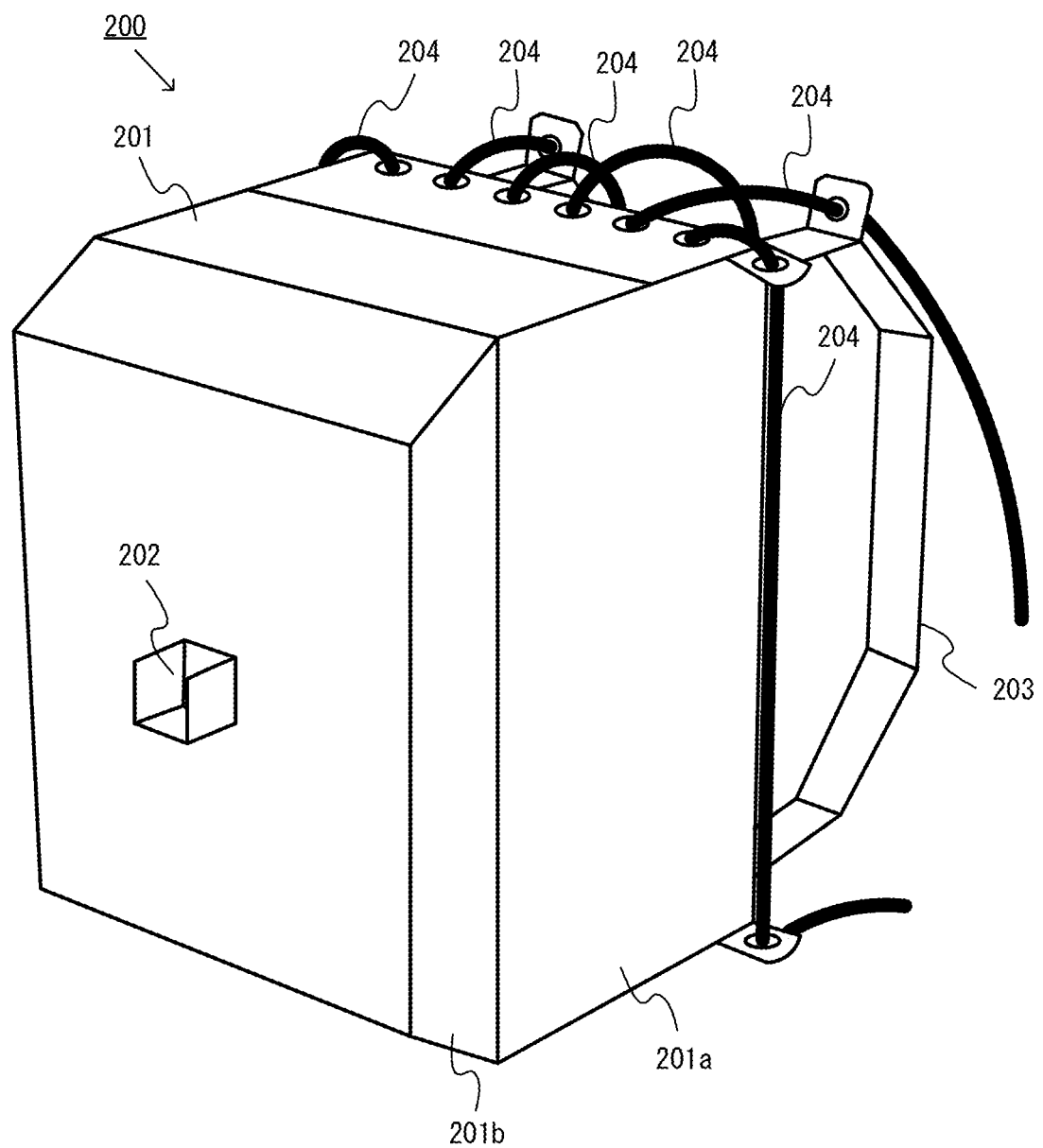
FIG. 9 shows a non-limiting example of external appearance of the case 200.
Figure 10:
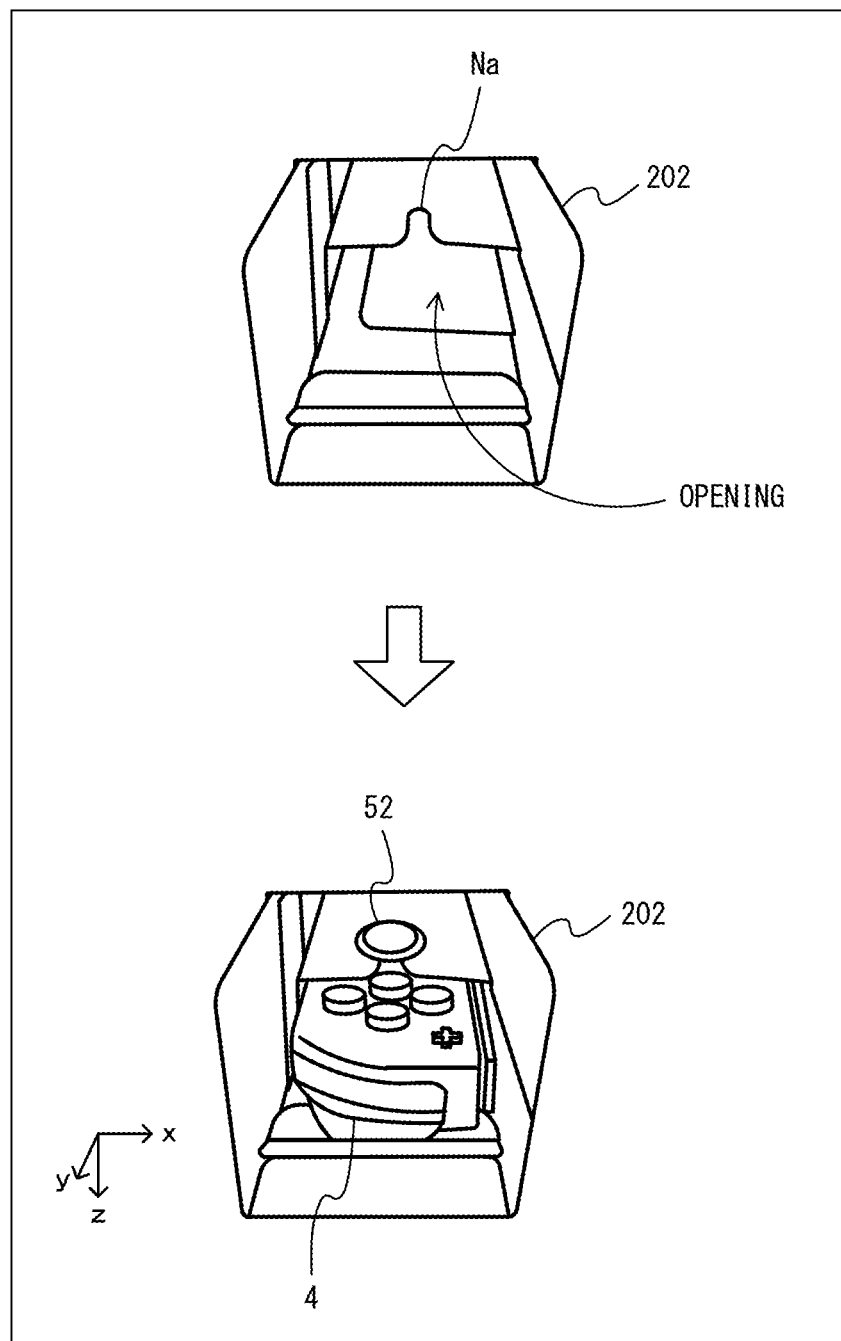
FIG. 10 shows a non-limiting example of state where the right controller 4 is attached to a controller carrying portion 202 of the case 200.
Figure 12:
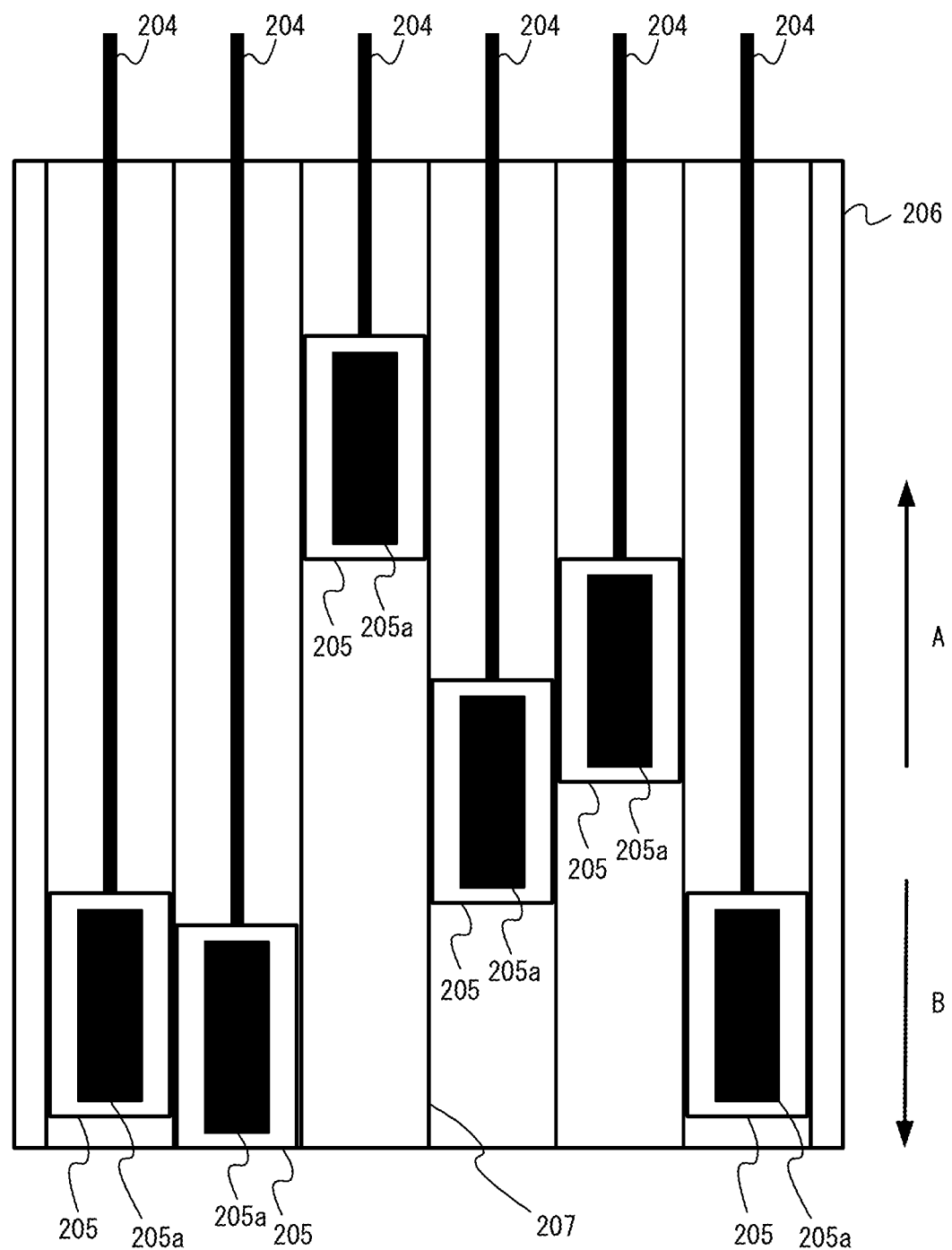
FIG. 12 shows a non-limiting example of state where the image capturing target members 205 move in a slidable manner in accordance with motions of string members 204.

Now, with reference to FIG. 9 through FIG. 12, the case 200, which is an example of expanded operation device, will be described. FIG. 9 shows an example of external appearance of the case 200. FIG. 10 shows an example of state where the right controller 4 is attached to a controller carrying portion 202 of the case 200. FIG. 11 shows an example of state where the right controller 4 captures an image of a plurality of the image capturing target members 205 provided in the case 200. FIG. 12 shows an example in which the image capturing target members 205 slide in accordance with motions of the string members 204.

As shown in FIG. 9, the case 200 includes the case main body 201, the controller carrying portion 202, shoulder belts 203, and the string members 204. The case 200 has an overall shape of a backpack. Two shoulder belts 203 are attached to the case main body 201, so that the user may carry the case 200 on his/her back. The case main body 201 has the two shoulder belts 203 attached thereto, and includes a front-side main body 201a and a rear-side main body 201b. In a state where the user carries the case 200 on his/her back, the front-side main body 201a is in contact with the back of the user, whereas the rear-side main body 201b is away from the back of the user. In a state where the front-side main body 201a and the rear-side main body 201b are assembled together, the case main body 201 includes an inner space shielded against external light.

The front-side main body 201a has a plurality of (six in FIG. 9) string members 204 attached thereto. The plurality of string members 204 may be pulled from, or returned to, the case main body 201. Specifically, one ends of the string members 204 are located as being pulled out from a plurality of insertion holes (Ha shown in FIG. 16) formed in a top surface of the front-side main body 201a, and the other ends of the string members 204 are respectively connected with the plurality of image capturing target members 205 (see FIG. 11 and FIG. 12) provided in the front-side main body 201a. As described above with reference to FIG. 8, in a state where the user carries the case 200 on his/her back, the one ends of the string members 204 are attached to both of his/her arms, both of his/her legs, his/her head or the like. Thus, an operation is made by use of the case 200.

The rear-side main body 201b includes the controller carrying portion 202 provided at approximately the center of a rear surface thereof. The controller carrying portion 202 includes an opening that communicates the inner space of the case main body 201, including the front-side main body 201a and the rear-side main body 201a, to the outside of the rear surface of the rear-side main body 201b (i.e., the outside of the case main body 201). As shown in FIG. 10, the opening of the controller carrying portion 202 has a length in the up-down direction that is approximately the same as the thickness of the housing 51 of the right controller 4 (length in the z-axis direction shown in FIG. 1) and has a length in the left-right direction that is approximately the same as the length, in the left-right direction, of the housing 51 of the right controller 4 (length in the x-axis direction shown in FIG. 1). Therefore, in a state where the right controller 4 is located as being inserted into the opening of the controller carrying portion 202 such that the bottom surface of the right controller 4 enters the inside of the case main body 201, the housing 51 closes the opening. A top edge of the opening of the controller carrying portion 202 has a cut-off portion Na. With this arrangement, in a state where the right controller 4 is inserted into the opening while the top surface of the right controller 4 is directed upward and the negative y-axis direction of the right controller 4 is directed in a forward direction for the case 200, an operation shaft of the analog stick 52 of the right controller 4 is in engagement with the cut-off portion Na. Thus, the right controller 4 is located on the controller carrying portion 202 (see the lower part of FIG. 10). As described above, in the case where the right controller 4 is located on the controller carrying portion 202 and thus is attached to the case 200, a part of the right controller 4 is accommodated in the inner space of the case 200 and the infrared image capturing section 123 is capable of capturing an image of the inner space. In the example shown in FIG. 10, the right controller 4 is partially accommodated in the inner space of the case 200. Alternatively, the right controller 4 may be entirely accommodated in the inner space of the case 200, or the right controller 4 may be attached such that only the bottom surface thereof (surface having the window 68 formed therein) faces the inner space of the case 200.

The rear-side main body 201b may have a communication target of the NFC communication section 122 (e.g., NFC tag) provided in the vicinity of the controller carrying portion 202. For example, in a state where the right controller 4 is located on the controller carrying portion 202, the communication target may be located at a position of the rear-side main body 201b at which the communication target is close to the antenna 122a of the right controller 4. In this case, the right controller 4 becomes capable of performing near field communication with the communication target at the same time when the right controller 4 is attached to the controller carrying portion 202. The type of the expanded operation device (herein, case 200), inherent identification information on the expanded operation device or the like may be stored on the communication target, so that the right controller 4 confirms the reliability of the expanded operation device to which the controller 4 is attached.

As shown in FIG. 11 and FIG. 12, the plurality of image capturing target members 205 are located in the inner space of the case main body 201. The plurality of image capturing target members 205 are located in a slide portion 206, in which the plurality of image capturing target members 205 are slidably movable in the up-down direction (directions A and B shown in FIG. 12). The slide portion 206 include a partition member 207 dividing an inner space of the slide portion 206 into a plurality of lanes in which the plurality of image capturing target members 205 are movable in the slidable directions. The slide portion 206 is fixed in the front-side main body 201a defining the inner space of the case main body 201, such that upper openings of the lanes are located below the plurality of insertion holes formed in the upper surface of the front-side main body 201a.

The plurality of image capturing target members 205 each have a predetermined weight and are respectively connected with the other ends of the string members 204. The string members 204 connected with the image capturing target members 205 pass through the lanes of the slide portion 206 and the holes formed in the upper surface of the front-side main body 201a, namely, formed above the lanes, and are pulled out of the case main body 201. Therefore, when one of string members 204 connected with the corresponding image capturing target member 205 is pulled out of the case main body 201 by a force larger than the weight of the image capturing target member 205, the image capturing target member 205 is raised upward (direction A in FIG. 12) in the lane of the slide portion 206. When the string member 204 used to raise the image capturing target member 205 is loosened, the image capturing target member 205 is lowered downward (direction B in FIG. 12) in the lane of the slide portion 206 by the weight of the image capturing target member 205 itself. In this manner, the plurality of image capturing target members 205 slide up or down in the inner space of the case main body 201 in accordance with the operation of pulling or loosening the string members 204 connected therewith.

As shown in FIG. 11, the slide portion 206 is located to face the infrared image capturing section 123 of the right controller 4 attached to the controller carrying portion 202. Therefore, in a state where the right controller 4 is attached to the controller carrying portion 202, the infrared image capturing section 123 is capable of capturing an image of the slide portion 206. In this state, the infrared light emitting section 124 is capable of irradiating the slide portion 206 with infrared light. Therefore, the inner space of the case main body 201 is shielded against external light but the slide portion 206 is irradiated with infrared light by the infrared light emitting section 124. Thus, the infrared image capturing section 123 is capable of capturing an image of the slide portion 206.

The slide portion 206 has a plurality of slits formed on a surface facing the right controller 4 attached to the controller carrying portion 202 (i.e., formed on a rear surface of the slide portion 206). The slits are formed in correspondence with the lanes, with the sliding directions corresponding to a longitudinal direction of the slits, such that the positions of the image capturing target members 205 located in the slide portion 206 are viewed from the right controller 4. Therefore, in the captured image captured by the infrared image capturing section 123, the positions of the image capturing target members 205 in the slide portion 206 are recognized through the slits.

At least a part of each image capturing target member 205 (typically, a part including a part viewable from the infrared image capturing section 123 through the slit) is a recognizable portion 205a formed of a material distinguishable from the remaining part in the captured image captured by the infrared image capturing section 123. For example, the recognizable portion 205a may be formed of a retroreflective material. In this case, a greater part of the infrared light emitted by the infrared light emitting section 124 is reflected, and thus the recognizable portions 205a, namely, the image capturing target members 205, are more easily recognizable in the captured image captured by the infrared image capturing section 123.

In the above-described example, the string members 204 provided in the case 200 are pulled or loosened to make an operation on the case 200. There may be another operation element moving the image capturing target members 205 in the case main body 201 by another method. For example, a part of a rod-like member inserted into the case 200 may be used as an image capturing target member, and the position of the image capturing target member or presence/absence of the image capturing target member in the case 200 may be detected. In this case, the depth by which the rod-like member is inserted into the case 200 may be changed, or the rod-like member is pulled out of, or is inserted back to, the case 200, so that an operation is made the case 200.

Figure 14:
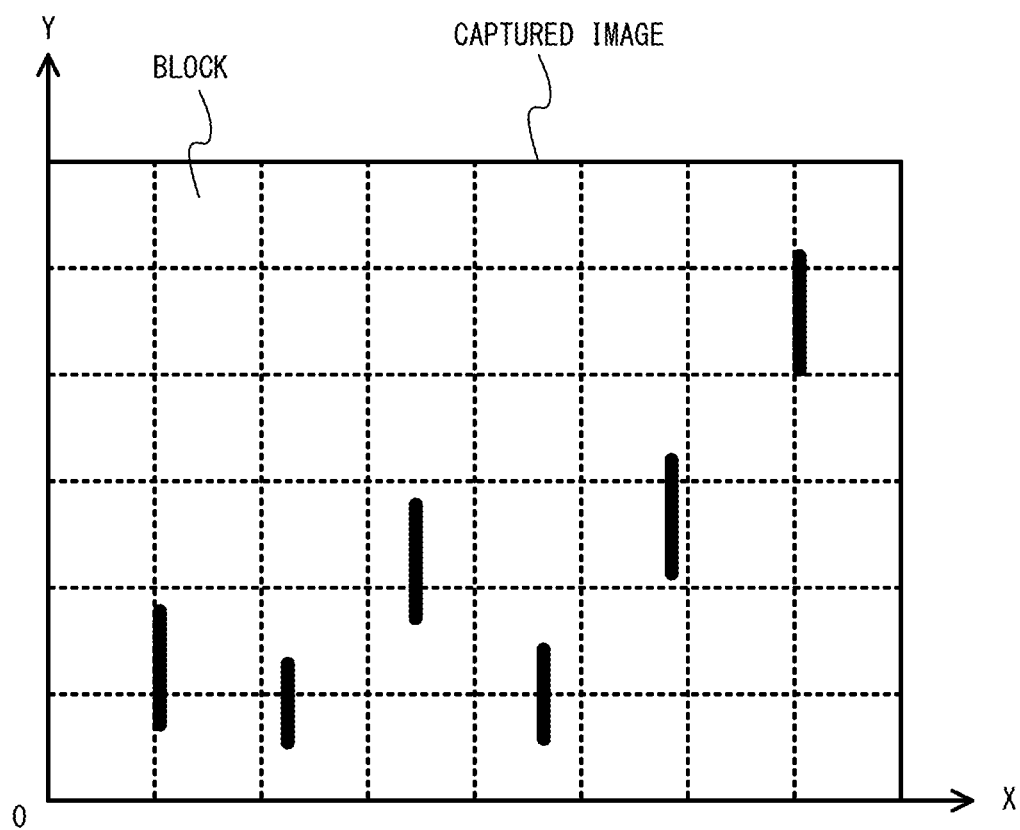
FIG. 14 shows a non-limiting example of information on the image capturing target members 205 that is calculated in a second mode (moment mode)

Now, with reference to FIG. 13 and FIG. 14, information on an image capturing target member that is calculated from the captured image captured by the infrared image capturing section 123 will be described. FIG. 13 shows an example of information on the image capturing target member that is calculated in a first mode (clustering mode). FIG. 14 shows an example of information on the image capturing target member that is calculated in a second mode (moment mode).

Referring to FIG. 13, the above-mentioned information is calculated in the first mode as follows. From the captured image captured by the infrared image capturing section 123, a cluster of high-luminance pixels is detected, and the position or the size of the cluster in the captured image is calculated. For example, as shown in FIG. 13, for the entirety of the captured image captured by the infrared image capturing section 123 or for a partial region of the captured image from which the information is to be calculated (for an analysis window described below), predetermined coordinate axes (e.g., X axis for the horizontal direction and Y axis for the vertical direction) are set. From the image for which the coordinate axes are set, a pixel group of pixels that are adjacent to each other is extracted, the pixels having a predetermined threshold level or higher. In the case where the pixel group has a predetermined size (first predetermined level or larger and second predetermined level or smaller), the pixel group is determined to be a cluster. In the case of, for example, a captured image of the slide portion 206 in the case 200, the recognizable portions 205*a* reflecting a greater part of the infrared light emitted by the infrared light emitting section 124 are extracted as high-luminance pixels. Therefore, the recognizable portions 205*a* captured through the slits are each determined to be a cluster. In the first mode, a total number of the clusters thus extracted is calculated, and also the average luminance, the area size (number of pixels), the center-of-gravity coordinate, and the circumscribed rectangle of each cluster are calculated. The results of the calculations are calculated as information on the image capturing target member.

In the first mode, the position of each cluster (position of the center-of-gravity coordinate or the circumscribed rectangle) may be calculated with respect to a reference position set in the captured image. For example, the reference position may be set at a position of a predetermined item captured and included in the captured image. Specifically, separately from the above-described image capturing target member 205 (recognizable portion 205*a*), a reference marker formed of a retroreflective material and having a predefined shape is located at a position that is near the slide portion 206 (position at which the infrared image capturing section 123 is capable of capturing an image of the reference marker) and that has a predefined positional relationship with another image capturing target member 205. The position of the reference marker acts as the reference position. For analyzing the captured image captured by the infrared image capturing section 123, an image process or the like is performed on the captured image by use of pattern matching, so that the position at which the image of the reference marker is captured is calculated from the captured image. The position of each cluster is calculated with respect to the position at which the image of the reference marker is captured, so that the position, the orientation, the shape or the like of each cluster is detected with high precision. The positional relationship between the reference marker and the another image capturing target member 205 or the shape of the reference marker in the captured image may be used, so that each of the image capturing target members 205 is easily specified. The above-described positional relationship or the shape of the reference marker may be made inherent to the expanded operation device, so that the type or the like of the expanded operation device is distinguished from the captured image captured by the infrared image capturing section 123.

Referring to FIG. 14, in the second mode, the captured image captured by the infrared image capturing section 123 is divided into a plurality of blocks, and the average luminance and the position of the center of gravity of each of the blocks are calculated. For example, as shown in FIG. 14, for the entirety of the captured image captured by the infrared image capturing section 123 or for a partial region of the captured image from which the information is to be calculated (for an analysis window described below), predetermined coordinate axes (e.g., X axis for the horizontal direction and Y axis for the vertical direction) are set. The image for which the coordinate axes are set is divided into predetermined blocks (e.g., 8×6=48 blocks). For each block, pixels having a predetermined threshold level or higher are used as processing targets to calculate a total luminance of each block, a primary moment in the horizontal direction of each block, and a primary moment in the vertical direction of each block. The results of the calculations are calculated as information on the image capturing target member. For example, the total luminance of each block is a sum of luminance of all the pixels included in each block, and is a parameter. More specifically, the total luminance of the block is divided by the number of the pixels in the block to find the average luminance of the block. The primary moment in the horizontal direction of each block is found as follows. The luminance of each pixel included in the block is multiplied by the position of the pixel in the X-axis direction of the block, and such resultant values of all the pixels included in the block are added together. The primary moment in the horizontal direction of each block is a parameter. More specifically, the primary moment in the horizontal direction of the block is divided by the total luminance of the block to find the position of the center of gravity of the luminance in the horizontal direction of the block. The primary moment in the vertical direction of each block is found as follows. The luminance of each pixel included in the block is multiplied by the position of the pixel in the Y-axis direction of the block, and such resultant values of all the pixels included in the block are added together. The primary moment in the vertical direction of each block is a parameter. More specifically, the primary moment in the vertical direction of the block is divided by the total luminance of the block to find the position of the center of gravity of the luminance in the vertical direction of the block.

The information on the image capturing target member found in the first mode and the information on the image capturing target member found in the second mode are calculated in the right controller 4 and transmitted to the main body apparatus 2. Therefore, as compared with the case where the data itself representing the captured image captured by the infrared image capturing section 123 is transmitted, the amount of data to be transmitted to the main body apparatus 2 is decreased, and the processing load on the main body apparatus 2 is also decreased. Since the data amount of the information on the image capturing target member is small, the information on the image capturing target member may be transmitted to the main body apparatus 2 as being included in another operation data to be transmitted from the right controller 4. Thus, the communication process between the right controller 4 and the main body apparatus 2 is simplified.

Figure 15:
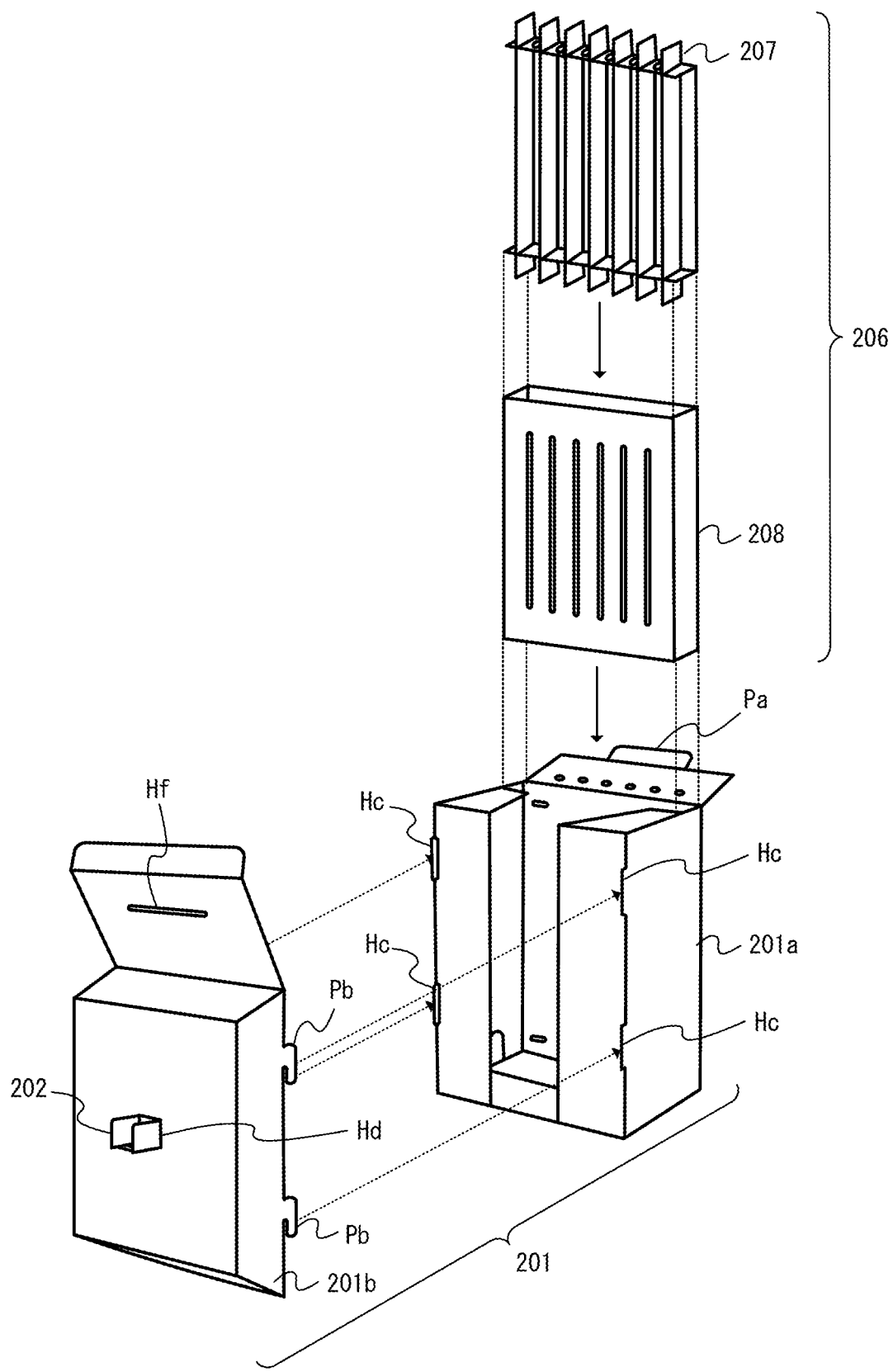
FIG. 15 shows a non-limiting example of combining main components to assemble the case 200.
Figure 16:
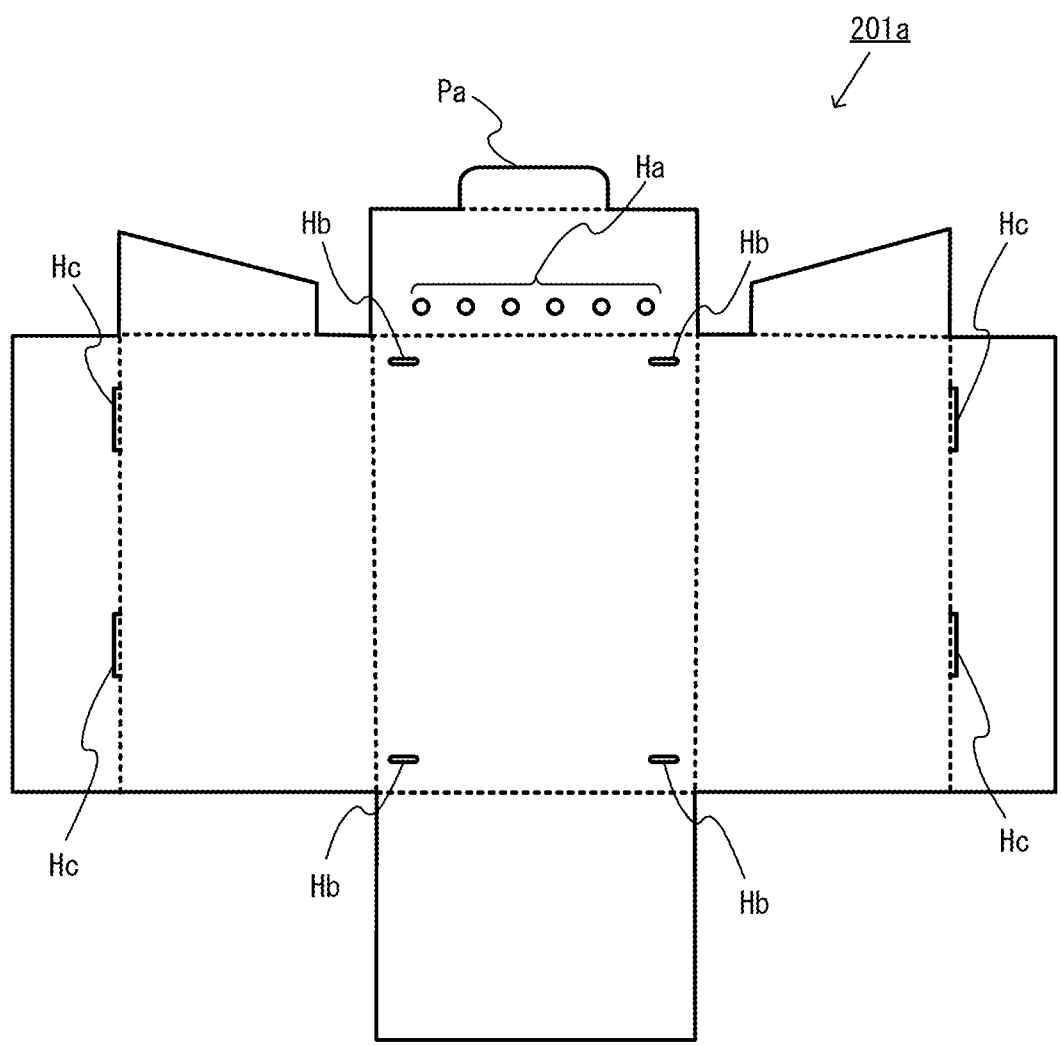
Figure 17:
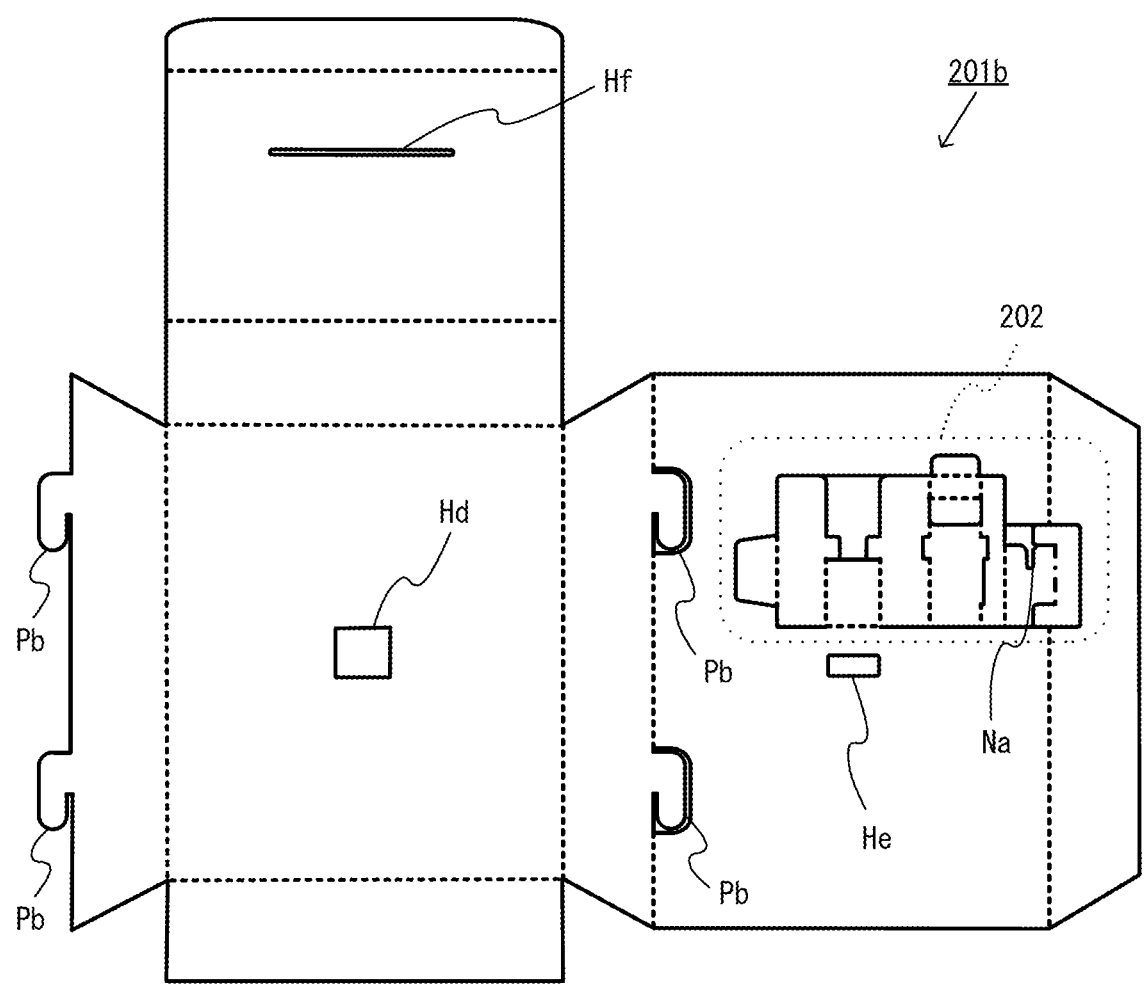
FIG. 17 shows a non-limiting example of cardboard member usable to assemble a rear-side main body 201b.

Now, with reference to FIG. 15 through FIG. 17, a method for assembling the case 200 will be described. FIG. 15 shows an example of combining main components for assembling the case 200. FIG. 16 shows an example of a cardboard member used to assemble the front-side main body 201*a*. FIG. 17 shows an example of a cardboard member used to assemble the rear-side main body 201*b*. In FIG. 16 and FIG. 17, the solid lines represent the lines along which the cardboard member is to be cut out. The dotted lines represent the lines along which the cardboard member is to be mountain-folded. The one-dot chain line represents the line along which the cardboard member is to be valley-folded.

As shown in FIG. 15, the components of the case 200 are each formed by folding a cardboard member. For example, the slide portion 206 is assembled as follows. The plurality of image capturing target members 205 connected with the string members 204 are respectively located in the lanes formed by the partition member 207 (FIG. 15 does not show the string members 204 or the image capturing target members 205). The partition member 207 in this state is inserted into a rectangular tube member 208. Thus, the slide portion 206 is assembled. Specifically, the partition member 207 is assembled as follows. A plurality of partitioning plate members are inserted into a substrate plate member having cut-off portions in correspondence with the lanes. The partitioning plate members and the substrate plate member are each formed of a cardboard member. The rectangular tube member 208 is assembled as follows. A plate member having the above-described slits is folded into a rectangular tube shape having a top opening and a bottom opening in the sliding direction. The plate member is formed of a cardboard member.

In the exemplary embodiment, the cardboard members may each be a single plate member having a stack structure or a plurality of plate members bonded together. For example, the cardboard members may each be a so-called corrugated cardboard member, which is formed by bonding a plate-like paper sheet to one surface or both of two surfaces of a corrugated plate-like paper sheet.

The case main body 201 is assembled as follows before the slide portion 206 is set. Four insertion tabs Pb of the rear-side main body 201*b* are inserted into four insertion holes Hc formed in the front-side main body 201*a*.

As shown in FIG. 16, the front-side main body 201*a* is assembled by folding a plate member having the plurality of insertion holes Ha through which the string members 204 are to pass, four attachment holes Hb usable to attach the shoulder belts 203, the four insertion holes Hc into which the four insertion tabs Pb of the rear-side main body 201*b* are to be inserted, an insertion tab Pa to be inserted into an insertion hole Hf of the rear-side main body 201*b*, and the like. The plate member is formed of a cardboard member. The cardboard member is folded into a generally hexahedron shape having a part of a rear surface opened. Thus, the front-side main body 201*a* is assembled.

As shown in FIG. 17, the rear-side main body 201*b* is assembled by folding a plate member having the four insertion tabs Pb to be inserted into the four insertion holes Hc formed in the front-side main body 201*a*, the insertion hole Hf into which the insertion tab Pa of the front-side main body 201*a* is to be inserted, a hole Hd at which the controller carrying portion 202 is attached, a securing hole He into which a part of the right controller 4 is inserted and secured in order to attach the right controller 4 to the case 200, and the like. The plate member is formed of a cardboard member. The cardboard member includes a cut-out region, which is to be cut-out and folded to form the controller carrying portion 202. The cut-out region of the cardboard member is inserted into the hole Hd in a state of being folded into a rectangular tube shape, so that the controller carrying portion 202 is formed at the rear-side main body 201*b*. In the state where the controller carrying portion 202 is formed, the cardboard member is folded into a generally hexahedron shape. Thus, the rear-side main body 201*b* is assembled.

The shoulder belts 203 (not shown in FIG. 15) are attached to the four attachment holes Hb of the case main body 201 assembled as described above. In a state where a top lid of the case main body 201 is opened, the slide portion 206 is inserted into a front portion of the inner space of the case main body 201. In a state where the string members 204 are inserted through the insertion holes Ha, the top lid of the case main body 201 is closed such that the insertion tab Pa of the front-side main body 201*a* is inserted into the insertion hole Hf of the rear-side main body 201*b*. Thus, the case 200 is assembled.

As described above, the case 200 is formed of a combination of components that are each assembled by folding a cardboard member. Therefore, an expanded operation device that may be assembled by a user by combining a group of plate members, as a commercial product, is provided. As described above, the expanded operation device does not need an electric component such as an electric circuit or the like that detects the content of operation made by the user or transmits the detection result to the main body apparatus 2. Therefore, the expanded operation device may be realized as a commercial product that may be assembled by the user.

For folding the cardboard member to form a polyhedron shape, the surfaces may be bonded together by any method. For example, the sides of the surfaces may be bonded together by an adhesive tape. An insertion tab may be formed on one of the sides, and an insertion hole may be formed in the other side, so that the insertion tab may be inserted into the insertion hole. The sides of the surfaces may be bonded together by an adhesive agent. In the above-described embodiment, the components of the case 200 are each formed of a cardboard member. Alternatively, at least a part of these components may be a thin paper sheet or another type of plate member. For example, at least a part of these components may be assembled by folding a resinous, wooden or metallic thin or thick plate member. The shoulder belts 203 may be strip-like fiber members. A part of these components may be combined with a component of a different material. For example, areas around the insertion holes Ha through which the string members 204 are to pass may be possibly shaven by the movement of the string members 204. Therefore, rings of a resin or the like may be fit into areas near the insertion holes Ha that are to contact the string members 204. At least a part of the components may be provided in advance as a polyhedron component.

Figure 18:
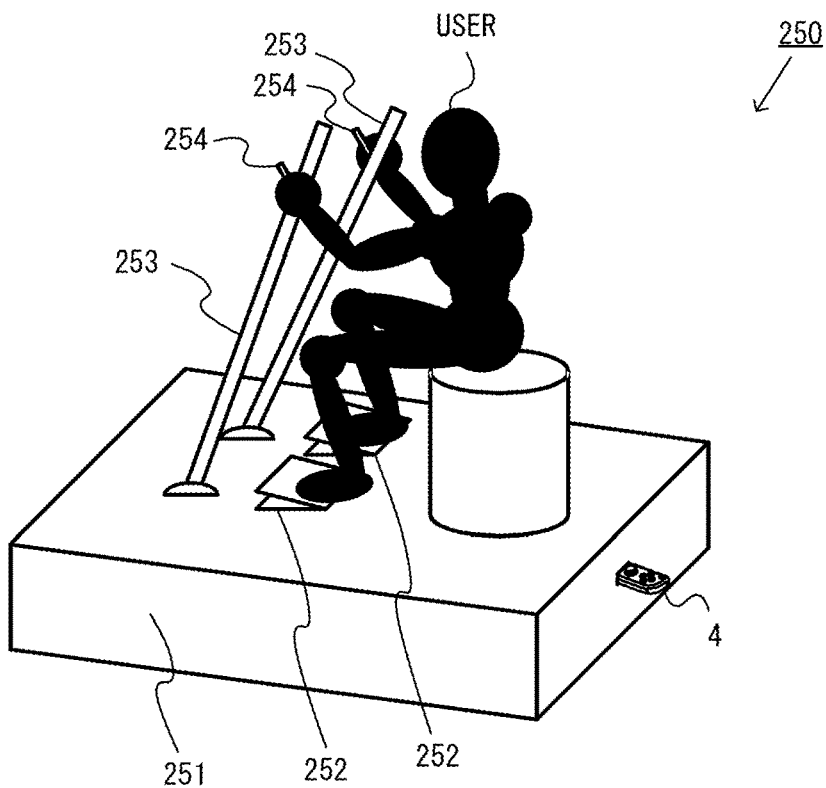
FIG. 18 shows a non-limiting example of state where the user makes a game operation by use of a steering device 250.
Figure 19:
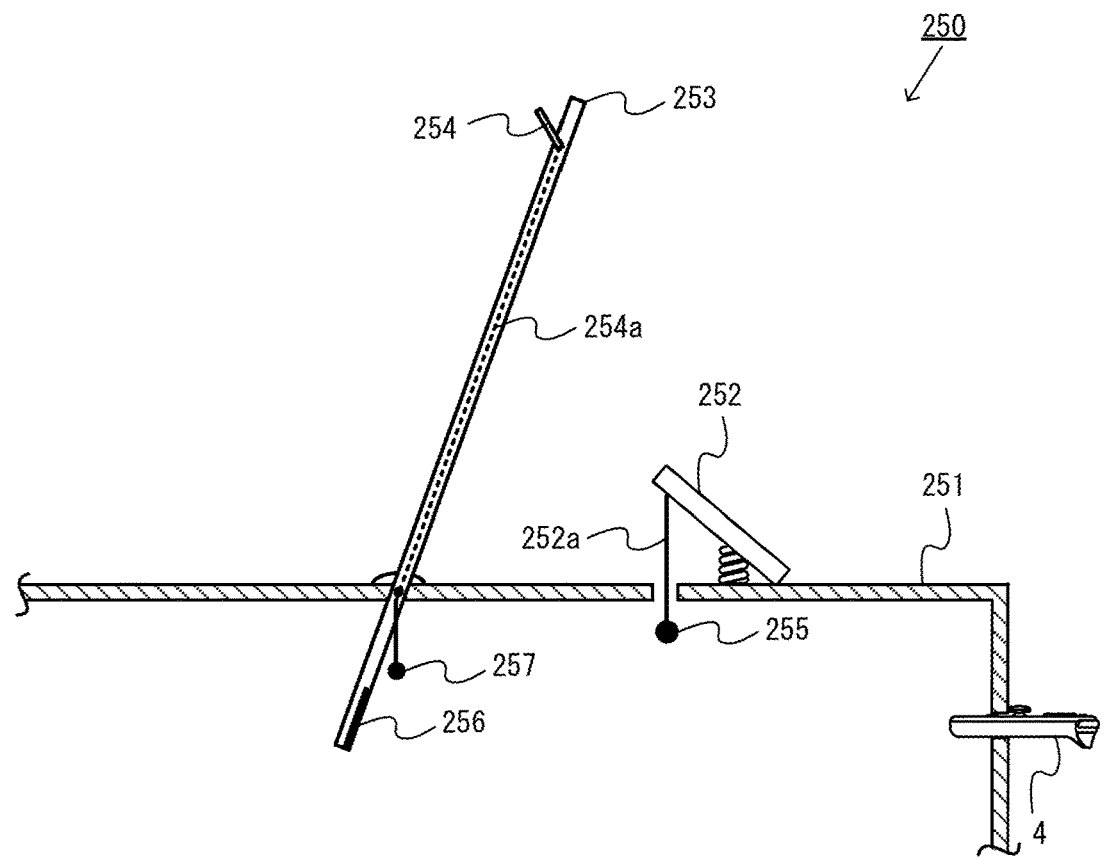
FIG. 19 shows a non-limiting example of internal structure of the steering device 250.

In the above-described example, the case 200 is described as an example of expanded operation device. The expanded operation device may be in another form. Hereinafter, with reference to FIG. 18 and FIG. 19, an operation made by use of a steering device 250, which is another example of expanded operation device, will be described. FIG. 18 shows an example of state where the user uses the steering device 250 to make a game operation. FIG. 19 shows an example of internal structure of the steering device 250. The right controller 4 is attachable to the steering device 250. Based on data transmitted from the right controller 4 attached to the steering device 250, a process in accordance with the content of operation made on the steering device 250 is executed. The content of operation made on the steering device 250 is detected based on the captured image captured by the infrared image capturing section 123. Therefore, the steering device 250 does not need an electric component such as an electric circuit or the like that detects the content of operation made by the user or transmits the detection result to the main body apparatus 2. Therefore, the structure of the steering device 250, which is another example of expanded operation device, is simplified.

As shown in FIG. 18, the user rides on the steering device 250 and operates a plurality of operation pedals 252 and a plurality of control sticks 253 included in the steering device 250 to make an operation on the steering device 250. In the example shown in FIG. 18, the steering device 250 includes the plurality of operation pedals 252 and the plurality of control sticks 253 provided on a device main body 251.

For example, the user sits on the device main body 251 and steps, with both of his/her feet, on the plurality of operation pedals 252 located on a top surface of the device main body 251 to make an operation. The operation pedals 252 are urged in a direction in which penal surfaces to be stepped by the user are raised. The user steps on the pedal surfaces with a force larger than the urging force, so that the pedal surfaces are lowered toward the top surface of the device main body 251. The user also operates, with both of his/her hand, the plurality of control sticks 253 located on the top surface of the device main body 251. Specifically, the user makes an operation by inclining each of the control sticks 253 forward, rearward, leftward or rightward as centered around a support portion on the device main body 251 that supports the corresponding control stick 253. The user also makes an operation by holding, with both of his/her hands, an operation lever 254 provided in the vicinity of a top end of each of the control sticks 253. The operation lever 254 is urged in a direction in which the opening angle of the operation lever 254 is enlarged. The user holds the operation lever 254 with a force larger than the urging force, so that the opening angle of the operation lever 254 is decreased. In order to detect the content of operation made on the operation pedals 252 and the control sticks 253, the right controller 4 is attached to a controller carrying portion provided at the device main body 251.

As shown in FIG. 19, in the case where the right controller 4 is attached to the controller carrying portion provided at the device main body 251, a part of the right controller 4 is accommodated in an inner space of the display device 251 and the infrared image capturing section 123 is capable of capturing an image of the inner space. Image capturing target members 255 through 257 are located in an image capturing range of the infrared image capturing section 123 and in an infrared light irradiation range of the infrared light emitting section 124. The image capturing range and the infrared light irradiation range are in the inner space of the device main body 251.

A plurality of image capturing target members 255 are provided in the inner space of the device main body 251, in correspondence with the plurality of operation pedals 252. One ends of string members 252a are respectively connected with the pedal surfaces of the operation pedals 252, and the image capturing target members 255 are respectively connected with the other ends of the string members 252a. As shown in FIG. 19, the string members 252a each move up and down in accordance with the rising/lowering motion of the pedal surface of the corresponding operation pedal 252. Therefore, the corresponding image capturing target member 255 also moves in the inner space of the device main body 251 in accordance with the upward and downward movement of the string member 252a. Thus, the content of operation made on each operation pedal 252 is grasped based on the position of the image capturing target member 255 calculated by use of the captured image captured by the infrared image capturing section 123.

A plurality of image capturing target members 256 are respectively provided in the vicinity of bottom ends of the plurality of control sticks 253, which protrude into the inner space of the device main body 251. As shown in FIG. 19, when each of the control sticks 253 is inclined as centered around the support portion on the top surface of the device main body 251 at which the control stick 253 is supported, the bottom end of the control stick 253 is also inclined in the inner space of the device main body 251. Therefore, the corresponding image capturing target member 256 provided at the bottom end of the control stick 253 also moves in the inner space of the device main body 251. Thus, the content of inclining operation made on each control stick 253 is grasped based on the position or the like of the image capturing target member 256 calculated by use of the captured image captured by the infrared image capturing section 123. When the control stick 253 is inclined forward or rearward with respect to the image capturing direction of the infrared image capturing section 123, the image capturing target member 256 is also inclined forward or rearward with respect to the infrared image capturing section 123. In this case, a change in the luminance of the image capturing target member 256 or a change in the size of the image capturing target member 256 in the captured image captured by the infrared image capturing section 123 is calculated, so that the position of the image capturing target member 256 in the front-rear direction with respect to the infrared image capturing section 123 is calculated.

A plurality of image capturing target members 257 are respectively provided in the inner space of the device main body 251, in correspondence with the plurality of operation levers 254. One ends of string member 254a are respectively connected with the operation levers 254, and the image capturing target members 257 are respectively connected with the other ends of the string member 254a. The string members 254a each move up and down in accordance with the opening angle of the corresponding operation lever 254. Therefore, the corresponding image capturing target member 257 also moves in the inner space of the device main body 251 in accordance with the upward and downward movement of the string member 254a. Thus, the content of operation made on each operation lever 254 is grasped based on the position of the image capturing target member 257 calculated by use of the captured image captured by the infrared image capturing section 123.

In accordance with such an operation made by use of the steering device 250, the player object PO located in the virtual space makes a motion, and an image of the virtual space reflecting the motion of the player object PO is displayed on the display device (e.g., display 12 of the main body apparatus 2). When, for example, the user makes a motion of stepping on the operation pedal 252, the speed at which the player object PO moves is increased or decreased. When the user makes an operation of inclining the control stick 253 forward, rearward, leftward or rightward, the moving direction of the player object PO is changed in accordance with the direction in which the control stick 253 is inclined. When the user makes an operation of holding the operation lever 254, the player object PO makes a predetermined motion (e.g., attack, defense, etc.).

In the above-described example, a set of the control sticks 253 is provided as an example of operation element included in the steering device 250. The control sticks 253 may each be an operation portion capable of indicating a direction, such as an analog stick or the like. For example, an image capturing target member moving in association with an inclining operation made on the analog stick may be provided in a space below the analog stick, and an image of the motion of the image capturing target member may be captured by the infrared image capturing section 123. In this case, the inclining direction or the inclining amount of the analog stick is calculated, like the inclining direction or the inclining angle of the control stick 253.

Figure 20:
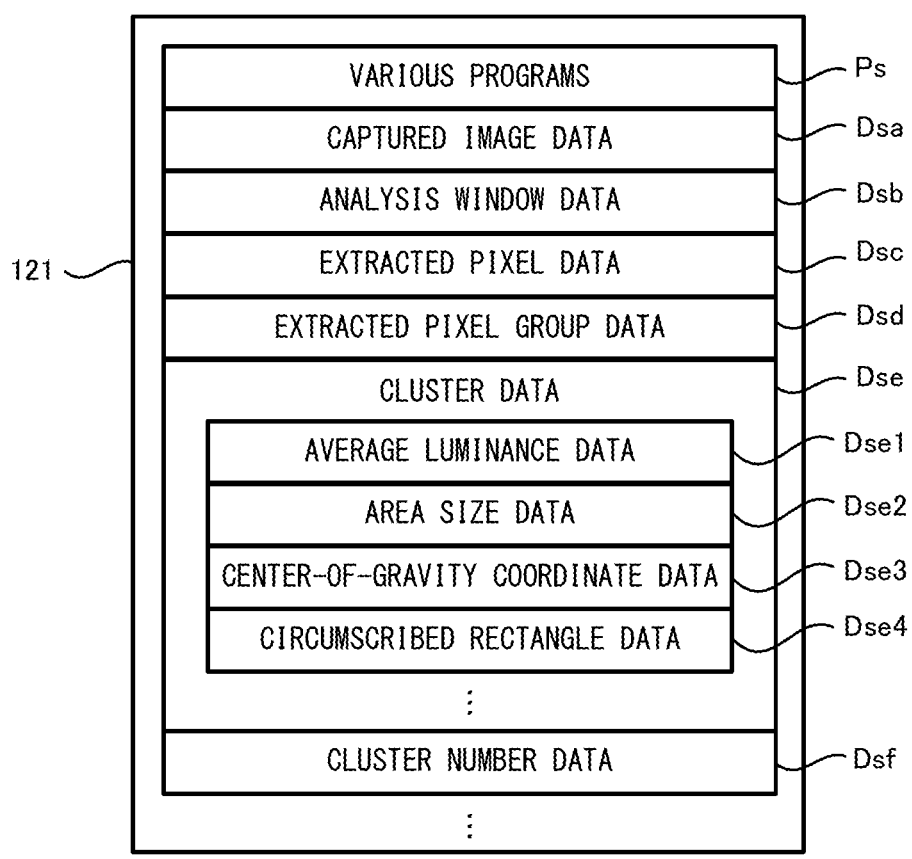
FIG. 20 shows a non-limiting example of data storage area set in a memory of the right controller 4 in the exemplary embodiment.

Now, with reference to FIG. 20 and FIG. 21, an example of specific process executable by the right controller 4 in the exemplary embodiment will be described. FIG. 20 shows an example of data storage area that is set in a memory of the right controller 4 (e.g., memory included in the processing section 121) in the exemplary embodiment. The memory of the right controller 4 stores data shown in FIG. 20 and also data used for another process, which will not be described herein in detail. In an information calculation process executable by the right controller 4 (described below), information on an image capturing target member is calculated in the first mode (clustering mode).

A program storage region of the memory of the right controller 4 has various programs Ps executable by the processing section 121 stored thereon. In the exemplary embodiment, the various programs Ps include an information calculation program usable to acquire and calculate information based on the result of the above-described image capturing, a program usable to transmit the calculated information to the main body apparatus 2, and the like. The various programs Pa may be stored on the right controller 4 in advance, may be acquired from a storage medium attachable to, or detachable from, the main body apparatus 2 (e.g., a first type of storage medium attached to the first slot 23, a second type of storage medium attached to the second slot 24, etc.) and stored on the memory of the right controller 4, or may be acquired from another device via a network such as the Internet or the like and stored on the memory of the right controller 4. The processing section 121 executes the various programs Ps stored on the memory of the right controller 4.

In the data storage area of the memory of the right controller 4, various types of data usable for processes executable by the processing section 121 are stored. In the exemplary embodiment, the data storage area of the memory of the right controller 4 has, stored thereon, captured image data Dsa, analysis window data Dsb, extracted pixel data Dsc, extracted pixel group data Dsd, cluster data Dse, cluster number data Dsf and the like.

The captured image data Dsa represents a captured image captured by the infrared image capturing section 123. In the exemplary embodiment, the infrared image capturing section 123 executes an image capturing process at a cycle based on an instruction from the processing section 121. Such a captured image is used to update the captured image data Dsa when necessary. The captured image data Dsa may be updated at a cycle of process executed by the processing section 121 (described below) and/or at a cycle of process executed by the CPU 81, or may be updated at a cycle of the above-described image capturing.

The analysis window data Dsb represents an image in a range (analysis windows) to be analyzed to calculate information based on the image capturing result, the range being a part of the captured image stored in the captured image data Dsa.

The extracted pixel data Dsc represents pixels having a luminance of a threshold level or higher that are extracted from the image in the analysis window. The extracted pixel group data Dsd represents a pixel group of the extracted pixels adjacent to each other, the extracted pixels being extracted from the image in the analysis window.

The cluster data Dse represents information on each pixel group determined to be a cluster based on the image in the analysis window. The cluster data Dse includes average luminance data Dse1, area size data Dse2, center-of-gravity coordinate data Dse3, circumscribed rectangle data Dse4 and the like. The average luminance data Dse1 represents an average luminance of each cluster. The area size data Dse2 represents an area size (number of pixels) of each cluster. The center-of-gravity coordinate data Dse3 represents a center-of-gravity coordinate of each cluster. The circumscribed rectangle data Dse4 represents the position and the size of a circumscribed rectangle of each cluster in a predetermined direction.

The cluster number data Dsf represents the number of clusters extracted from the image in the analysis window.

Now, an example of process of calculating information based on the image capturing result (hereinafter, the process will be referred to simply as the "information calculation process") in the exemplary embodiment will be described in detail. FIG. 21 is a flowchart showing an example of information calculation process executable by the CPU in the processing section 121. In the exemplary embodiment, a series of processes shown in FIG. 21 are performed by the CPU in the processing section 121 executing the information calculation program or the like included in the various program Ps. The timing to start the information calculation process shown in FIG. 21 is optional.

Figure 21:
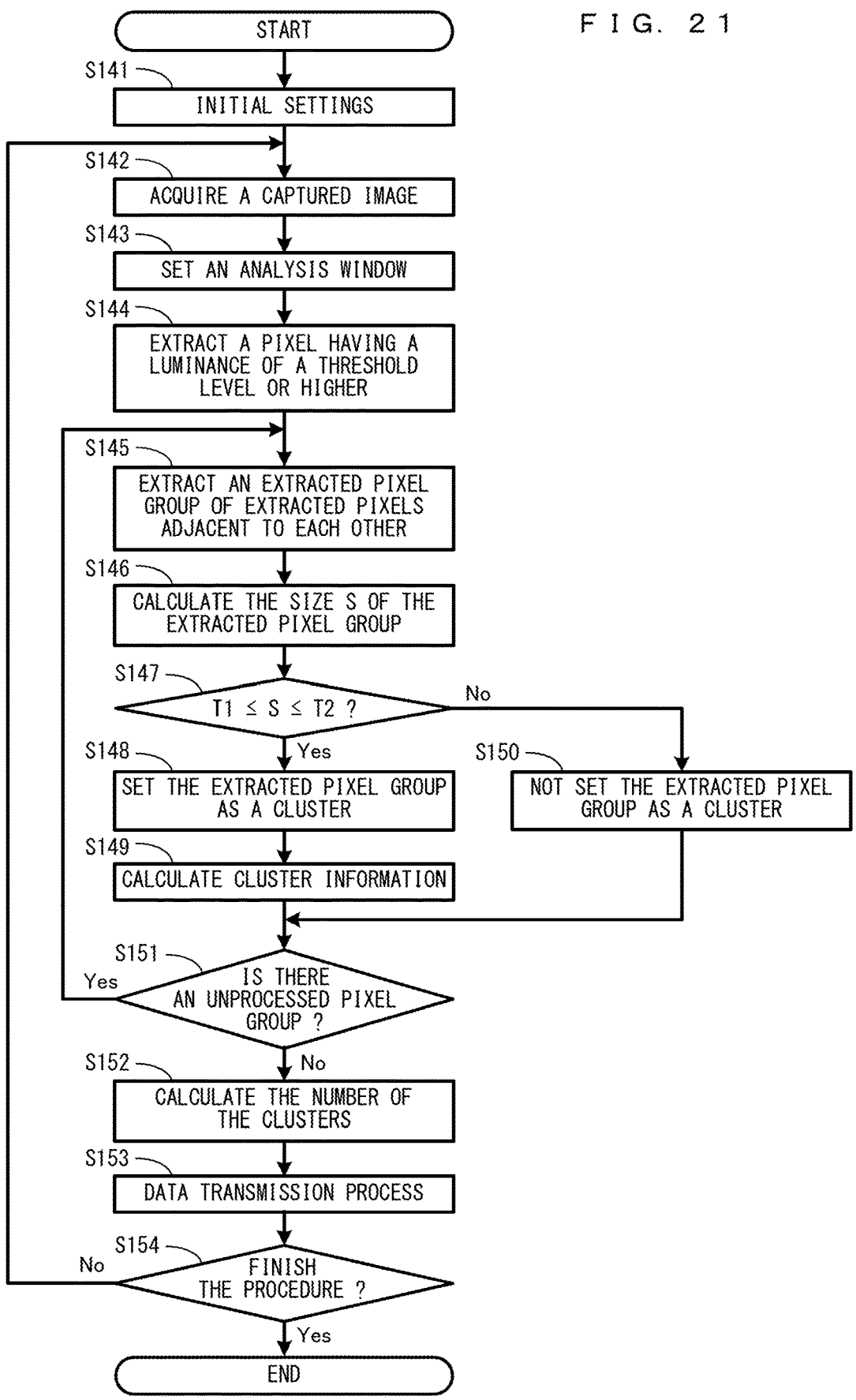
FIG. 21 is a flowchart showing a non-limiting example of information calculation process executable by a CPU of a processing section 121.

The process in each of the steps shown in FIG. 21 is merely illustrative, and the order of the processes executed in the steps may be changed as long as substantially the same result is obtained. Another process may be executed in addition to (or instead of) the processes executed in the steps. In the exemplary embodiment, the process in each of the steps will be described as being executed by the CPU in the processing section 121. A part of the processes in the steps may be executed by a processor other than the CPU in the processing section 121 or by a dedicated circuit. A part of the processes executable by the right controller 4 may be executed by another information processing apparatus communicable with the right controller 4 (e.g., main body apparatus 2, or server communicable with the main body apparatus 2). Namely, the processes shown in FIG. 21 may be executed by a cooperation of a plurality of information processing apparatuses including the right controller 4.

As shown in FIG. 21, the CPU in the processing section 121 performs initial settings in the information calculation process (step S141), and advances the process to the next step. For example, in the initial settings, the CPU in the processing section 121 initializes parameters usable to perform the processes described below. In the initial settings, the CPU in the processing section 121 sets, when necessary, the type of, or identification information on, the expanded operation device to which the right controller 4 is attached. For example, the user may make an operation of selecting the type of the expanded operation device by use of the main body apparatus 2, the left controller 3 or the right controller 4, so that the initial setting of the type of the expanded operation device may be made. In another example, in the case where the right controller 4 is capable of performing near field communication with a communication target provided at the expanded operation device via the NFC communication section 122, the type of, or the identification information on, the expanded operation device may be acquired from the communication target, so that the initial setting of the type of, or the identification information on, the expanded operation device is made. In the case where an image of the above-described reference marker is included in the captured image captured by the infrared image capturing section 123, the initial setting of the type of the expanded operation device may be made based on the shape of the captured image of the reference marker or the relationship between the image capturing position of the reference marker and the image capturing position of another image capturing target member. In the initial settings, the CPU in the processing section 121 sets a range (analysis windows) to be analyzed to calculate information based on the image capturing result, the range being a part of the captured image. The range of the analysis windows may be set based on an instruction from the main body apparatus 2 or may be predefined in accordance with the type of the expanded operation device. A plurality of analysis windows may be set. In this case, information based on the image capturing results on different analysis windows are calculated in a time-series manner.

Next, the CPU in the processing section 121 acquires the captured image captured by the infrared image capturing section 123 (step S142), and advances the process to the next step. For example, the CPU in the processing section 121 acquires a captured image from the infrared image capturing section 123, and updates the captured image data Dsa.

Next, the CPU in the processing section 121 sets an analysis window (step S143), and advances the process to the next step. For example, the CPU in the processing section 121 cuts an image in the analysis window out of the captured image stored in the captured image data Dsa, based on the range of the analysis window initially set, and uses the cut-out image to update the analysis window data Dsb.

Next, the CPU in the processing section 121 extracts pixels having a luminance of a predetermined threshold level or higher from the image in the analysis window (step S144), and advances the process to the next step. For example, the CPU in the processing section 121 extracts, as extracted pixels, pixels having a luminance of a predetermined threshold level or higher from the image stored in the analysis window data Dsb, and uses the extracted pixels to update the extracted pixel data Dsc.

Next, the CPU in the processing section 121 extracts, from the image in the analysis window, a pixel group of the extracted pixels adjacent to each other, the pixels being extracted in step S144 (step S145), and advances the process to the next step. For example, the CPU in the processing section 121 selects, from the extracted pixel groups extracted from image in the analysis window, one of the extracted groups on which the processes in steps S146 through S150 described below have not been performed as a processing target of the processes to be executed later, and uses data representing the selected extracted pixel group to update the extracted pixel group data Dsd.

Next, the CPU in the processing section 121 calculates a size S of the extracted pixel group that is the current processing target (step S146), and advances the process to the next step. For example, the CPU in the processing section 121 calculates the size S of the extracted pixel group (e.g., the number S of pixels) represented by the extracted pixel group data Dsd.

Next, the CPU in the processing section 121 determines whether or not the size S calculated in step S146 is in the range of the first threshold level T1 or larger and the second threshold level T2 or smaller (T2>T1) (step S147). The first threshold level T1 is a value representing the minimum size by which the image capturing target member is recognized as a cluster of high-luminance pixels captured and included in the image in the analysis window. The second threshold level T2 is a value representing the minimum size by which the image capturing target member is recognized as a cluster captured and included in the image in the analysis window. In the case where the size S is in the range of the first threshold level T1 or larger and the second threshold level T2 or smaller, the CPU in the processing section 121 advances the process to the next step. By contrast, in the case where the size S is not in the range of the first threshold level T1 or larger and the second threshold level T2 or smaller, the CPU in the processing section 121 advances the process to step S150.

In step S148, the CPU in the processing section 121 sets the extracted pixel group that is the current processing target as a cluster. The CPU in the processing section 121 calculates cluster information on the cluster that is set in step S148 (step S149), and advances the process to step S151. For example, in step S149, the CPU in the processing section 121 calculates the average luminance of the extracted pixel group represented by the extracted pixel group data Dsd, and uses the calculated average luminance to update the average luminance data Dse1 in the cluster data Dse corresponding to the cluster that is set in step S148. The CPU in the processing section 121 uses the size S calculated in step S146 to update the area size data Dse2 in the cluster data Dse corresponding to the cluster that is set in step S148. The CPU in the processing section 121 calculates the position of the center of gravity of the extracted pixel group represented by the extracted pixel group data Dsd, and uses the coordinate position representing the position center of gravity in the image in the analysis window (e.g., XY coordinate value shown in FIG. 13) to update the center-of-gravity coordinate data Dse3 in the cluster data Dse corresponding to the cluster that is set in step S148. The CPU in the processing section 121 sets a circumscribed rectangle of the extracted pixel group represented by the extracted pixel group data Dsd and having a side extending in a predetermined direction in the image in the analysis window (e.g., side parallel to the X axis or the Y axis shown in FIG. 13), and uses coordinate values representing the positions of two apexes facing each other in the rectangle (e.g., the XY coordinate values shown in FIG. 13) to update the circumscribed rectangle data Dse4 in the cluster data Dse corresponding to the cluster that is set in step S148. In the case where an image of the above-described reference marker is included in the captured image captured by the infrared image capturing section 123, the position of the center of gravity of the extracted pixel group or the position of the circumscribed rectangle may be calculated with respect to the position at which the image of the reference marker is captured.

In step S150, the CPU in the processing section 121 does not set the extracted pixel group that is the current processing target as a cluster and advances the process to step S151.

In step S151, the CPU in the processing section 121 determines whether or not there is still an extracted pixel group on which the processes in steps S145 through S150 have not been performed in the image in the analysis window. In the case where there is still such an extracted pixel group, the CPU in the processing section 121 returns the process to step S145 and repeats the processes. By contrast, in the case where there is no such extracted pixel group, the CPU in the processing section 121 deletes the cluster data Dse in which the cluster information was not updated in step S149 and advances the process to step S152.

In step S152, the CPU in the processing section 121 calculates the number of the clusters set from the image in the analysis window in step S148, and advances the process to the next step. For example, the CPU in the processing section 121 uses the number of the clusters set from the image in the analysis window to update the cluster number data Dsf.

Next, the CPU in the processing section 121 executes a process of transmitting data representing information based on the image capturing result to the main body apparatus 2 (step S153), and advances the process to the next step. For example, the CPU in the processing section 121 uses the cluster data Dse and the cluster number data Dsf to generate data to be transmitted to the main body apparatus 2, and outputs the data to the communication control section 111. As a result, the communication control section 111 generates, as operation data, information based on the image capturing result as well as other operation data (button operation data, acceleration data, angular velocity data, etc.), and transmits the operation data to the main body apparatus 2 at a predetermined transmission cycle.

Next, the CPU in the processing section 121 determines whether or not to finish the information calculation process (step S154). A condition under which the information calculation process is to be finished in step S154 is, for example, that an instruction to finish the information calculation process is received from the main body apparatus 2, that the user made an operation of finishing the information calculation process, or the like. When determining not to finish the information calculation process, the CPU in the processing section 121 returns the process to step S142 to repeat the above-described processes. When determining to finish the information calculation process, the CPU in the processing section 121 finishes the information calculation process shown in the flowchart. The series of processes in steps S142 through S154 are repeated until it is determined to finish the information calculation process in step S154.

Figure 22:
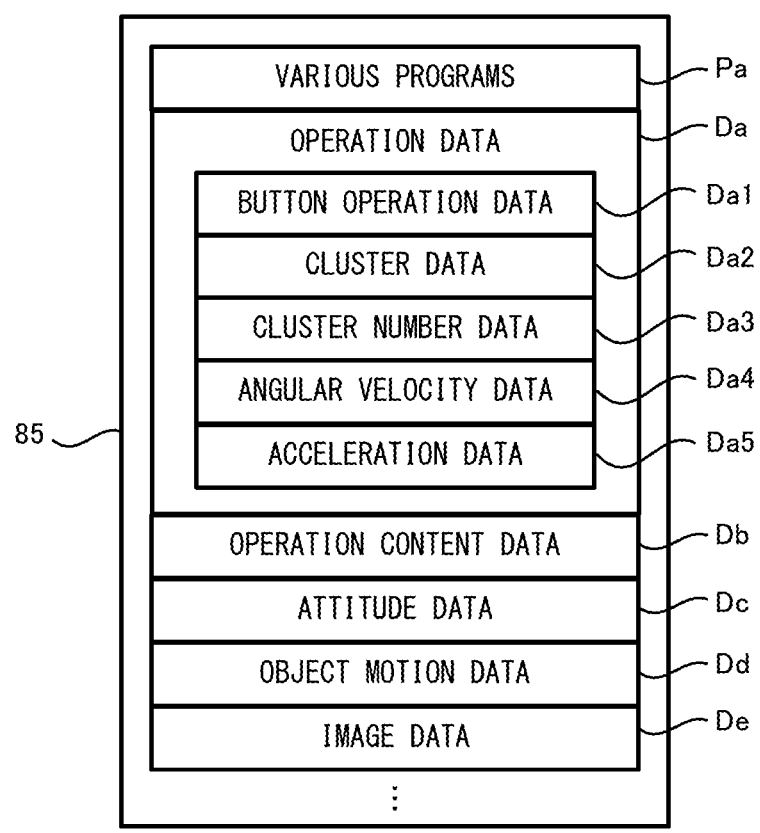
FIG. 22 shows a non-limiting example of data storage area set for a DRAM 85 in the main body apparatus 2 in the exemplary embodiment.

Now, with reference to FIG. 22 and FIG. 23, an example of specific process executable by the main body apparatus 2 in the exemplary embodiment will be described. FIG. 22 shows an example of data storage area set in the DRAM 85 of the main body apparatus 2 in the exemplary embodiment. The DRAM 85 stores to the data shown in FIG. 22 and also data usable in other processes, which will not be described herein in detail. In the information process executed by the main body apparatus 2 described below, information on the image capturing target member calculated in the first mode (clustering mode) is used, for example.

In a program storage area of the DRAM 85, various programs Pa executable by the main body apparatus 2 is stored. In the exemplary embodiment, the various programs Pa include a communication program usable for wireless communication with the left controller 3 and/or the right controller 4 described above, an application program usable to perform an information process (e.g., game process) based on data acquired from the left controller 3 and/or the right controller 4, and the like. The various programs Pa may be stored on the flash memory 84 in advance, may be acquired from a storage medium attachable to, or detachable from, the main body apparatus 2 (e.g., the first type storage medium attached to the first slot 23 or the second type storage medium attached to the second slot 24) and stored on the DRAM 85, or may be acquired from another apparatus via a network such as the Internet or the like and stored on the DRAM 85. The CPU 81 executes the various programs Pa stored on the DRAM 85.

In a data storage area of the DRAM 85, various types of data usable for a communication process, an information process or the like executable by the main body apparatus 2 are stored. In the exemplary embodiment, the DRAM 85 has, stored thereon, operation data Da, operation content data Db, attitude data Dc, object motion data Dd, image data De, and the like.

The operation data Da is operation data acquired from the right controller 4 when necessary. As described above, the operation data transmitted from the right controller 4 includes information regarding inputs from the input sections (specifically, the buttons, the analog sticks, and the sensors) (the information regarding the inputs specifically include information on the operations and detection results provided by the sensors) and information based on the result of the image capturing performed by the infrared image capturing section 123. In the exemplary embodiment, the operation data is transmitted from the right controller 4 at a predetermined cycle via wireless communication, and the received operation data is used to update the operation data Da when necessary. The operation data Da may be updated every frame, which is a cycle of the process executed by the main body apparatus 2 as described below, or may be updated at a cycle by which the operation data is transmitted via the above-described wireless communication. The operation data Da includes button operation data Da1, cluster data Da2, cluster number data Da3, angular velocity data Da4 and acceleration data Da5. The button operation data Da1 represents information on inputs from the buttons 53 through 56 and the analog stick 52 of the right controller 4. The cluster data Da2 represents information on each cluster calculated by the processing section 121 of the right controller 4. The cluster number data Da3 represents the number of the clusters extracted by the processing section 121 of the right controller 4. The angular velocity data Da4 represents information on an angular velocity caused in the right controller 4 and detected by the angular velocity sensor 115 in the right controller 4. For example, the angular velocity data Da4 includes data representing the angular velocity caused in the right controller 4 about each of the x-, y- and z-axes. The acceleration data De5 represents information on an acceleration caused in the right controller 4 and detected by the acceleration sensor 114 in the right controller 4. For example, the acceleration data De5 includes data representing the acceleration caused in the right controller 4 in each of the x-, y- and z-axis directions.

The operation content data Db represents the content of operation made by use of the case 200 and is calculated based on the cluster data Da2 and the cluster number data Da3.

The attitude data Dc represents an attitude of the right controller 4 with respect to the direction of the gravitational acceleration in an actual space. For example, the attitude data Dc includes data representing a direction of the gravitational acceleration acting on the right controller 4, data representing the x-, y- and z-axis directions with respect to the gravitational acceleration direction, and the like.

The object motion data Dd is regarding a motion of the player object located in the virtual space. The image data Dc is data usable to display an image (e.g., image of the player object, image of another object, image of the background, etc.) on the display device (display 12 of the main body apparatus 2) for a game.

Now, an example of information process (e.g., game process) in the exemplary embodiment will be described in detail. FIG. 23 is a flowchart showing an example of information process executable by the main body apparatus 2. In the exemplary embodiment, the series of processes shown in FIG. 23 are executed by the CPU 81 executing a communication program or a predetermined application program (e.g., game program) included in the various programs Pa. The timing to start the information process shown in FIG. 23 is optional.

Figure 23:
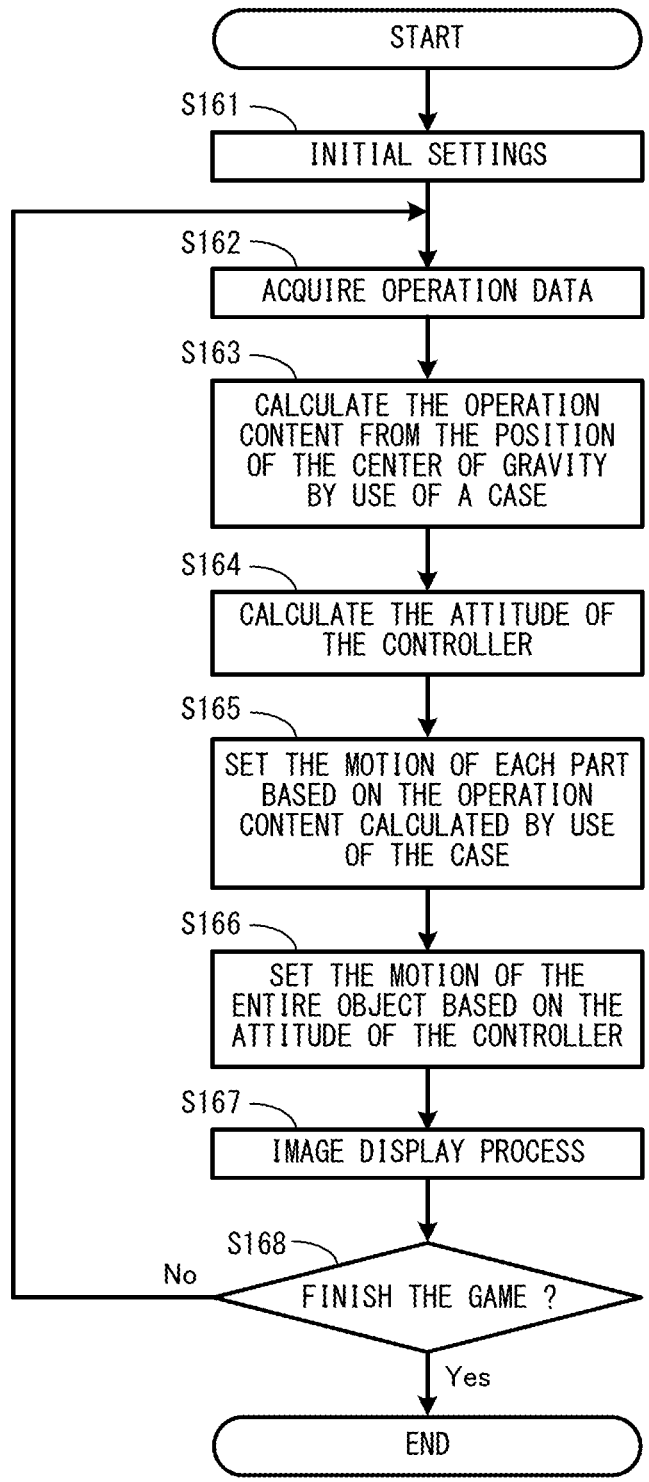
FIG. 23 is a flowchart showing a non-limiting example of information process executable by the main body apparatus 2.

The process in each of the steps shown in FIG. 23 is merely illustrative, and the order of the processes executed in the steps may be changed as long as substantially the same result is obtained. Another process may be executed in addition to (or instead of) the processes executed in the steps. In the exemplary embodiment, the process in each of the steps will be described as being executed by the CPU 81. A part of the processes in the steps may be executed by a processor other than the CPU 81 or a dedicated circuit. A part of the processes executable by the main body apparatus 2 may be executed by another information processing apparatus communicable with the main body apparatus 2 (e.g., server communicable with the main body apparatus 2 via a network). Namely, the processes shown in FIG. 23 may be executed by cooperation of a plurality of information processing apparatuses including the main body apparatus 2.

Referring to FIG. 23, the CPU 81 performs initial settings for the information process (step S161) and advances the game process to the next step. For example, in the initial settings, the CPU 81 initializes parameters usable to perform the processes described below. Also in the initial settings, the CPU 81 sets, when necessary, the type of, or identification information on, the expanded operation device to which the right controller 4 is attached. For example, the user may make an operation of selecting the type of the expanded operation device by use of the main body apparatus 2, the left controller 3 or the right controller 4, so that the initial setting of the type of the expanded operation device may be made. In another example, in the case where the right controller 4 is capable of performing near field communication with a communication target provided at the expanded operation device via the NFC communication section 122, the type of, or the identification information on, the expanded operation device may be acquired from the communication target, so that the initial setting of the type of, or the identification information on, the expanded operation device is made. In the case where an image of the above-described reference marker is included in the captured image captured by the infrared image capturing section 123, the type of the expanded operation device specified based on the shape of the captured image of the reference marker, or the relationship between the image capturing position of the reference marker and the image capturing position of another image capturing target member, may be acquired, so that the initial setting of the type of the expanded operation device is made. In the initial settings, the CPU 81 may set a range (analysis windows) to be analyzed to calculate information based on the image capturing result, the range being a part of the captured image, and thus may indicate the content of the setting to the right controller 4.

Next, the CPU 81 acquires operation data from the right controller 4 to update the operation data Da (step S162), and advances the process to the next step. For example, the CPU 81 updates the button operation data Da1, the cluster data Da2, the cluster number data Da3, the angular velocity data Da4 and the acceleration data Da5 in accordance with the operation data acquired from the right controller 4.

Next, the CPU 81 calculates the content of operation made by use of the case 200, based on the center-of-gravity coordinate of each of clusters extracted from the captured image captured by the infrared image capturing section 123 (step S163), and advances the process to the next step. For example, the CPU 81 calculates the content of operation made by use of the case 200, based on the center-of-gravity coordinate data of each of the clusters and the number of the clusters in the cluster data Da2 and the cluster number data Da3 updated in step S162. Specifically, when the position of the image capturing target member 205 connected with the string member 204 attached to the right arm of the user is raised, namely, when the position of the cluster corresponding to the image capturing target member 205 is raised, it is determined that the user made a motion of extending his/her arm. When the positions of the image capturing target members 205 connected with the string members 204 attached to both of the legs of the user are lowered, namely, when the positions of the clusters corresponding to the image capturing target members 205 are lowered, it is determined that the user made a motion of crouching.

Next, the CPU 81 calculates the attitude of the right controller 4 (step S164), and advances the process to the next step. For example, the CPU 81 acquires, from the acceleration data Da5, data representing the acceleration caused in the right controller 4, calculates the direction of the gravitational acceleration acting on the right controller 4, and uses the data representing the direction to update the attitude data Dc. The gravitational acceleration may be extracted by any method. For example, an acceleration component caused, on average, in the right controller 4 may be calculated and extracted as the gravitational acceleration. The CPU 81 acquires, from the angular velocity data Da4, data representing the angular velocity caused in the right controller 4, calculates the angular velocity caused in the right controller 4 about each of the x-, y- and z-axes, and uses the data representing the angular velocity to calculate the x-, y- and z-axis directions of the right controller 4 with respect to the direction of the gravitational acceleration. Thus, the attitude data Dc is updated.

After the x-, y- and z-axis directions with respect to the gravitational acceleration are calculated, the attitude of the right controller 4 may be updated in accordance with only the angular velocity about each of the x-, y- and z-axes. Alternatively, in order to prevent a situation where the relationship between the attitude of the right controller 4 and the gravitational acceleration direction is shifted as a result of errors being accumulated, the x-, y- and z-axis directions with respect to the gravitational acceleration direction may be calculated at each predetermined cycle to correct the attitude of the right controller 4.

Next, the CPU 81 sets a motion of each of parts of the player object PO based on the content of operation made by use of the case 200 (step S165), and advances the process to the next step. For example, based on the content of operation calculated in step S163, the CPU 81 sets a motion of the parts of the player object PO similar to the motion of the content of operation made by the user, and uses the motion to update the player object motion data Dd. Specifically, in the case where it is determined in step S163 that the user made a motion of extending his/her left arm by use of the case 200, the CPU 81 sets the player object PO such that the player object PO also makes a motion of extending the left arm in the virtual space, and uses the motion to update the player object motion data Dd. In this manner, when the user makes an operation of moving a part of the user by use of the case 200, a motion of moving a part of the player object PO corresponding to the part of the user (e.g., the same part as the part moved by the user) is set. The motion of the player object PO set in step S165 is not limited to the motion of moving a part of the player object PO corresponding to the part moved by the user, and may be another motion. For example, when the user makes a predetermined operation (e.g., operation of crouching) by use of the case 200, a motion of the player object PO that is not related to the moved part of the user may be set, or a motion of changing the player object PO into another form in the virtual space may be set.

Next, the CPU 81 sets a motion of the entirety of the player object PO based on the attitude of the right controller 4 (step S166), and advances the process to the next step. For example, when the attitude of the right controller 4 represented by the attitude data Dc is an attitude of inclining so as to make the case 200 to fall rightward, the CPU 81 sets a motion of the player object PO of falling rightward is set, and uses the motion to update the player object motion data Dd.

Next, the CPU 81 executes a process of displaying, on the display device, an image of the virtual space in which the player object PO is located (step S167), and advances the process to the next step. For example, the CPU 81 changes the attitude or the position of the player object PO based on the player object motion data Dd, and locates the player object PO in the virtual space based on the post-change attitude or position. The CPU 81 executes a process of generating a virtual space image of the virtual space accommodating the player object PO, as seen from a virtual camera located at a predetermined position (e.g., point of view behind the player object PO, or first person's point of view), and displaying the virtual space image on the display device (e.g., display 12 of the main body apparatus 2).

Next, the CPU 81 determines whether or not to finish the game (step S168). A condition under which the game is to be finished in step S168 is, for example, that the conditions for finishing the game are satisfied, or that the user made an operation of finishing the game. When determining not to finish the game, the CPU 81 returns the process to step S162 to repeat the above-described processes. When determining to finish the game, the CPU 81 finishes the information process in this flowchart. The series of processes in steps S162 through S168 are repeated until it is determined to finish the game in step S168.

As can be seen, in the exemplary embodiment, the content of operation made on the case 200, which is an example of expanded operation device, is detected based on the captured image captured by the infrared image capturing section 123. Therefore, the case 200 does not need an electric component such as an electric circuit or the like that detects the content of operation made by the user or transmits the detection result to the main body apparatus 2. Thus, in the exemplary embodiment, the structure of the case 200, which is an example of expanded operation device, is simplified. In the exemplary embodiment, the data transmitted from the right controller 4 to the main body apparatus 2 is, for example, data on the position of the cluster included in the captured image captured by the infrared image capturing section 123, and is not the captured image captured by the infrared image capturing section 123. Therefore, the amount of the data transmitted from the right controller 4 to the main body apparatus 2 is decreased. In the exemplary embodiment, the content of operation, made on the expanded operation device, that is detectable by the main body apparatus 2 is calculated based on the portion at which an image of the image capturing target member is captured. Therefore, whether or not an operation has been made on the operation element, and also the amount of operation made on the operation element (amount of analog input), are calculated.

In the above-described example, the data based on the captured image that is transmitted from the right controller 4 to the main body apparatus 2 may represent the captured image itself captured by the infrared image capturing section 123. In this case, the amount of data transmitted from the right controller 4 to the main body apparatus 2 may be increased. Nevertheless, various analysis processes may be executed on the captured image by the main body apparatus 2.

In the above-described expanded operation device, the image capturing target member provided in the expanded operation device is at least moved in either one of the up-down direction, the left-right direction and the front-rear direction, and the content of operation made on the expanded operation device is calculated based on the position of the image capturing target member. Alternatively, the image capturing target member may be moved in another direction in accordance with the operation made on the expanded operation device. For example, the image capturing target member provided in the expanded operation device may be rotated in accordance with the operation made on the expanded operation device. In a first example, in the case where the image capturing target member is rotated as centered around a rotation shaft parallel to the image capturing direction of the infrared image capturing section 123, a marker that indicates a predetermined direction is pasted on a surface, of the image capturing target member, facing the infrared image capturing section 123. The direction indicated by the marker is detected in the image captured by the infrared image capturing section 123, so that the rotation angle of the image capturing target member is calculated. Based on the rotation angle, the content of operation made on the expanded operation device is calculated. In a second example, in the case where the image capturing target member is rotated as centered around a rotation shaft perpendicular the image capturing direction of the infrared image capturing section 123, a marker having a different length at a position facing the infrared image capturing section 123, or a different pattern, in accordance with the rotation angle is pasted on a side surface of the image capturing target member. The length or pattern of the marker is detected in the image captured by the infrared image capturing section 123, so that the rotation angle of the image capturing target member is calculated. Based on the rotation angle, the content of operation made on the expanded operation device is calculated.

In the above-described example, the method for detecting the motion or the attitude of the right controller 4 is merely an example. The motion or the attitude of the right controller 4 may be detected by another method or by use of another data. For example, in the above-described example, the attitude of the right controller 4 is detected by use of only the angular velocity caused in the right controller 4 or a combination of the angular velocity and the acceleration caused in the right controller 4. Alternatively, the attitude of the right controller 4 may be detected by use of only the acceleration caused in the right controller 4. Even in the case where only the acceleration caused in the right controller 4 is detected, the direction of the gravitational acceleration caused in the right controller 4 is calculated. Needless to say, the x-, y- and z-axis directions with respect to the gravitational acceleration direction may be calculated each time, so that substantially the same process as in the above-described example is made possible. In the above-described example, a game image in accordance with the operation made by use of the expanded operation device to which the right controller 4 is attached is displayed on the display 12 of the main body apparatus 2. Alternatively, the game image may be displayed on a stationary monitor via a cradle.

The main body apparatus 2, the left controller 3 and the right controller 4 may each be any apparatus, for example, a mobile game apparatus, a mobile electronic device (a PDA (personal digital assistant), a mobile phone, a personal computer, a camera, a tablet, etc.) or the like.

An example of executing the information process (game process) by the main body apparatus 2 is described above. Alternatively, at least a part of the above-described processing steps may be executed by another apparatus. For example, in the case where the main body apparatus 2 is configured to be communicable with another apparatus (e.g., another server, another image display device, another game apparatus, another mobile terminal, etc.), at least a part of the above-described processing steps may be executed by cooperation of the main body apparatus 2 and the another apparatus. In the case where at least a part of the above-described processing steps is executed by another apparatus as described above, substantially the same processes as the above-described processes may be executed. The above-described information process (game process) may be executed by one processor or by cooperation of a plurality of processors included in an information processing system including at least one information processing apparatus. In the above-described example, the CPU 81 of the main body apparatus 2 may execute a predetermined program to perform the information process. A part of, or the entirety of, the above-described processes may be executed by a dedicated circuit included in the main body apparatus 2.

In the above-described variations, the exemplary embodiment may be realized by a system form of so-called cloud computing, or a system form of distributed wide area network or local area network. For example, in a system form of distributed local area network, the above-described processes may be executed by cooperation of a stationary information processing apparatus (stationary game apparatus) and a mobile information processing apparatus (mobile game apparatus). In such a system form, there is no particular limitation on which apparatus performs which of the above-described processes. In whichever manner the processes may be divided, the exemplary embodiment is realized.

The orders of processes, the set values, the conditions used for the determinations, and the like that are used in the information processing described above are merely illustrative. The exemplary embodiment is realized also other orders, other values, and other conditions.

The above-described program may be supplied to the main body apparatus 2 or the right controller 4 via an external storage medium such as an external memory or the like, or via a wired or wireless communication link. The program may be stored in advance on a non-volatile storage device located in the apparatus. Examples of the information storage medium on which the program may be stored may include CD-ROMs, DVDs, optical disk storage mediums similar thereto, flexible disks, hard disks, magneto-optical disks, magnetic tapes and the like, as well as non-volatile memories. Alternatively, the information storage medium on which the program may be stored may be a volatile memory. Such a storage medium is considered as a computer-readable storage medium. For example, a program stored on such a storage medium may be loaded on, and executed by, a computer or the like, so that various functions described above are provided.

While some exemplary systems, exemplary methods, exemplary devices, and exemplary apparatuses have been described in detail above, the above descriptions are merely illustrative in all respects, and do not limit the scope of the systems, the methods, the devices, and the apparatuses. It goes without saying that the systems, the methods, the devices, and the apparatuses may be improved and modified in various manners without departing from the spirit and scope of the appended claims. It is understood that the scope of the systems, the methods, the devices, and the apparatuses should be interpreted only by the scope of the appended claims. It is understood that the specific descriptions of the exemplary embodiment enable a person skilled in the art to carry out an equivalent scope thereto on the basis of the descriptions of the exemplary embodiment and general technological knowledge. It should be understood that the descriptions of the components and the like made in the specification in the singular form with the word "a" or "an" preceding the components do not exclude the plurals of the components. It should be understood that, unless otherwise stated, the terms used in the specification are used in their common meanings in the art. Thus, unless otherwise defined, all the jargons and the technical terms used in the specification have the same meanings as those generally understood by a person skilled in the art of the exemplary embodiment. If there is a contradiction, the specification (including definitions) takes precedence.

As described above, the exemplary embodiment is usable as an information processing system realized with a simple structure, a case, a cardboard member or the like.

What is claimed is:

1. An information processing system, comprising:
a game apparatus;
a game controller usable for an operation on the game apparatus and configured to transmit data to the game apparatus; and
a case to which the game controller is attachable;
wherein:
the game controller includes:
an inertia sensor;
an image capturing device; and
a computer configured to transmit, to the game apparatus, data generated based on a captured image captured by the image capturing device;
the case includes:
a three-dimensional case main body having a three-dimensional inner space;

a game controller carrying portion on which the game controller is allowed to be located while at least a part of the game controller is positioned inside the three-dimensional case main body, such that an image capturing direction of the image capturing device is directed toward the three-dimensional inner space of the case main body;

an image capturing target member located at a position, in the three-dimensional inner space of the case main body, at which an image of the image capturing target member is allowed to be captured by the image capturing device in the case where the game controller is located on the game controller carrying portion; and an operation portion moving the image capturing target member in the three-dimensional inner space of the three-dimensional case main body in accordance with an operation made from outside of the three-dimensional case main body, the image capturing device configured to capture the image of the image capturing target member as the operation portion moves the image capturing target member in the three-dimensional inner space; and the game apparatus includes a computer configured to receive the data transmitted from the game controller and execute a game process of controlling an entirety of an object in a virtual space in accordance with the data based on the output of the inertia sensor and controlling a part of the object in the virtual space in accordance with the position of the image capturing target member.

2. The information processing system according to claim 1, wherein:
the computer of the game controller further configured to at least calculate a position of the image capturing target member in the captured image captured by the image capturing device; and
the data transmitted to the game apparatus includes at least the position of the image capturing target member in the captured image.

3. The information processing system according to claim 1, wherein:
the game controller further includes an infrared light emitting device;
the game controller carrying portion allows the game controller to be located thereon such that the infrared light emitting device emits infrared light toward the inner space of the case main body;
the image capturing device is an infrared camera; and
the image capturing target member includes a retroreflective material.

4. An information processing system, comprising:
an information processing apparatus;
a data transmission device transmitting data to the information processing apparatus; and
a case to which the data transmission device is attachable; wherein:
the data transmission device includes:
an image capturing device; and
a computer transmitting, to the information processing apparatus, data generated based on a captured image captured by the image capturing device;
the case includes:
a case main body having an inner space;
a data transmission device carrying portion on which the data transmission device is allowed to be located while at least a part of the data transmission device is accommodated in the case main body, such that an image capturing direction of the image capturing device is directed toward the inner space of the case main body;

an image capturing target member located at a position, in the inner space of the case main body, at which an image of the image capturing target member is allowed to be captured by the image capturing device in the case where the data transmission device is located on the data transmission device carrying portion; and an operation portion moving the image capturing target member in the inner space of the case main body in accordance with an operation made from outside of the case main body; and the information processing apparatus includes a computer receiving the data transmitted from the data transmission device and executing an information process based on the received data, wherein the case further includes a securing portion securing the case to a body of a user.

5. The information processing system according to claim 4, wherein the securing portion is a shoulder belt usable by the user to carry the case on his/her back.

6. The information processing system according to claim 4, wherein:
the operation portion includes at least one string member connected with the image capturing target member;
the at least one string member is allowed to be pulled by a hand of the user in a state where the case is secured to the body of the user by the securing portion; and
the operation portion moves the image capturing target member, connected with the string member, in the inner space of the case main body, in response to the user pulling the string member.

7. The information processing system according to claim 6, wherein:
the case further includes a slide portion supporting the image capturing target member connected with the string member, such that the image capturing target is slidable in predetermined sliding directions in the inner space of the case main body; and
the operation portion is configured to move the image capturing target member, connected with the string member, in one direction among the sliding directions when the string member is pulled.

8. The information processing system according to claim 7, wherein the operation portion is configured to move the image capturing target member, connected with the string member, in another direction among the sliding directions that is opposite to the one direction when the string member is loosened after being pulled.

9. A case configured to allow a data transmission device, transmitting data generated based on a captured image captured by an image capturing device to at least another device, to be attached thereto, the case comprising:
a case main body having an inner space;
a data transmission device carrying portion on which the data transmission device is allowed to be located while at least a part of the data transmission device is positioned inside the case main body, such that an image capturing direction of the image capturing device is directed toward the inner space of the case main body;
an image capturing target member located at a position, in the inner space of the case main body, at which an image of the image capturing target member is allowed to be captured by the image capturing device in the case where the data transmission device is located on the data transmission device carrying portion;

an operation portion moving the image capturing target member in the inner space of the case main body in accordance with an operation made from outside of the case main body, the image capturing device configured to capture the image of the image capturing target member as the operation portion moves the image capturing target member in the inner space of the case main body;

a shoulder belt securing the case to a body of a user in a state where the case is carried by the user on his/her back; and a slide portion supporting the image capturing target member, such that the image capturing target is slidable in predetermined sliding directions in the inner space of the case main body, wherein the operation portion includes at least one string member connected with the image capturing target member, the at least one string member is allowed to be pulled by a hand of the user in a state where the case is secured to the body of the user by the shoulder belt, and the operation portion is configured to move the image capturing target member in one direction among the sliding directions when the string member is pulled and to move the image capturing target member in another direction among the sliding directions that is opposite to the one direction when the string member is loosened after being pulled.

10. The case according to claim 9, wherein the case main body, the data transmission device carrying portion, the image capturing target member and the slide portion are configured to be formed by folding at least one cardboard member.

11. A case configured to allow a data transmission device, transmitting data generated based on a captured image captured by an image capturing device to at least another device, to be attached thereto, the case comprising:

a case main body having an inner space;

a data transmission device carrying portion on which the data transmission device is allowed to be located while at least a part of the data transmission device is positioned inside the case main body, such that an image capturing direction of the image capturing device is directed toward the inner space of the case main body;

an image capturing target member located at a position, in the inner space of the case main body, at which an image of the image capturing target member is allowed to be captured by the image capturing device in the case where the data transmission device is located on the data transmission device carrying portion; and an operation portion moving the image capturing target member in the inner space of the case main body in accordance with an operation made from outside of the case main body, the image capturing device configured to capture the image of the image capturing target member as the operation portion moves the image capturing target member in the inner space of the case main body, wherein the case further includes a securing portion configured to secure the case to a body of a user.

12. The case according to claim 11, wherein the securing portion is a shoulder belt usable by the user to carry the case on his/her back.

13. The case according to claim 11, wherein:

the operation portion includes at least one string member connected with the image capturing target member;

the at least one string member is allowed to be pulled by a hand of the user in a state where the case is secured to the body of the user by the securing portion; and the operation portion moves the image capturing target member, connected with the string member, in the inner space of the case main body, in response to the user pulling the string member.

14. The information processing system according to claim 1, wherein the three-dimensional inner space is shielded against external light when the game controller is positioned inside the case main body.

15. The information processing system according to claim 1, wherein when the game controller is inserted inside the three-dimensional case main body, the three-dimensional case main body closes at the game controller carrying portion.

* * * * *